US007148173B2

(12) United States Patent
Lafuente et al.

(10) Patent No.: US 7,148,173 B2
(45) Date of Patent: Dec. 12, 2006

(54) CATALYTIC SYSTEMS FOR THE POLYMERIZATION AND COPOLYMERIZATION OF ALPHA-OLEFINS

(75) Inventors: Antonio Muñoz-Escalona Lafuente, Madrid (ES); Pilar Lafuente Cañas, Madrid (ES); Jose Sancho Royo, Madrid (ES); Begoña Peña Garcia, Madrid (ES); Carlos Martin Marcos, Torrejon de Ardoz (ES)

(73) Assignee: Repsol Quimica, S.A., Madrid (ES)

( * ) Notice: Subject to any disclaimer, the term of this patent is extended or adjusted under 35 U.S.C. 154(b) by 0 days.

(21) Appl. No.: 09/299,539

(22) Filed: Apr. 26, 1999

(65) Prior Publication Data

US 2003/0191013 A1 Oct. 9, 2003

(30) Foreign Application Priority Data

Apr. 27, 1998 (EP) ................. 98500101

(51) Int. Cl.
B01J 31/00 (2006.01)
B01J 37/00 (2006.01)
C08F 4/02 (2006.01)
C08F 4/60 (2006.01)
C08F 4/44 (2006.01)

(52) U.S. Cl. .................. 502/102; 502/103; 502/117; 502/158; 526/160; 526/943

(58) Field of Classification Search ................ 502/102, 502/103, 117, 158; 526/160, 943
See application file for complete search history.

(56) References Cited

U.S. PATENT DOCUMENTS

| 3,184,416 | A |   | 5/1965  | Mottus ................. 252/429 |
|-----------|---|---|---------|--------------------------------|
| 3,440,237 | A |   | 4/1969  | Mottus ................. 260/94.9 |
| 4,005,046 | A | * | 1/1977  | Chandra et al. .......... 252/428 |
| 4,394,294 | A | * | 7/1983  | Gryaznov et al. ......... 252/430 |
| 4,542,199 | A |   | 9/1985  | Kaminsky et al. ......... 526/160 |
| 4,939,217 | A |   | 7/1990  | Stricklen ................. 526/114 |
| 5,057,475 | A |   | 10/1991 | Canich et al. ............. 502/104 |
| 5,064,797 | A |   | 11/1991 | Stricklen ................. 502/111 |
| 5,071,808 | A |   | 12/1991 | Antberg et al. ........... 502/107 |
| 5,202,398 | A | * | 4/1993  | Antberg et al. ........... 502/120 |
| 5,332,706 | A | * | 7/1994  | Nowlin et al. ............. 502/107 |
| 5,391,789 | A |   | 2/1995  | Rohrmann ................. 556/11 |
| 5,416,228 | A |   | 5/1995  | Ewen et al. ................. 556/7 |
| 5,466,766 | A |   | 11/1995 | Patsidis et al. ............. 526/129 |
| 5,504,232 | A |   | 4/1996  | Winter et al. ............... 556/7 |
| 5,602,067 | A | * | 2/1997  | Nowlin et al. ............. 502/117 |
| 5,627,246 | A |   | 5/1997  | Langhauser et al. ....... 526/128 |
| 5,731,253 | A |   | 3/1998  | Sangokoya ................. 502/102 |
| 5,747,404 | A | * | 5/1998  | Nagy et al. ................. 502/117 |
| 5,753,769 | A |   | 5/1998  | Ueda et al. ................. 526/351 |
| 5,780,659 | A |   | 7/1998  | Schmid et al. ............. 556/11 |
| 5,824,620 | A | * | 10/1998 | Vega et al. ................. 502/117 |
| 5,846,895 | A | * | 12/1998 | Gila et al. ................. 502/107 |
| 5,861,352 | A |   | 1/1999  | Gila et al. ................. 502/155 |
| 5,892,079 | A |   | 4/1999  | Wilson, Jr. ................. 556/11 |
| 5,910,463 | A | * | 6/1999  | Ernst et al. ................. 502/107 |
| 5,914,044 | A |   | 6/1999  | Lindoy et al. ............. 210/670 |
| 5,955,625 | A |   | 9/1999  | Canich |
| 5,977,392 | A |   | 11/1999 | Royo et al. ................. 556/11 |
| 5,986,025 | A |   | 11/1999 | Huh et al. ................. 526/119 |
| 6,018,064 | A |   | 1/2000  | Llatas et al. ............... 502/117 |
| 6,087,293 | A |   | 7/2000  | Carnahan et al. ........... 502/158 |
| 6,114,555 | A |   | 9/2000  | Llinás et al. ............... 556/11 |
| 6,133,187 | A |   | 10/2000 | Vega et al. ................. 502/103 |
| 6,143,685 | A |   | 11/2000 | Llinas et al. ............... 502/152 |
| 6,268,518 | B1|   | 7/2001  | Resconi et al. ............. 556/43 |
| 6,825,369 | B1|   | 11/2004 | Stevens et al. ............. 556/7 |
| 2005/0065019 | A1| * | 3/2005 | Royo et al. ................. 502/155 |

FOREIGN PATENT DOCUMENTS

| DE | 10 22 382    |   | 1/1958  |
|----|--------------|---|---------|
| DE | 26 08 863 C2 |   | 8/1977  |
| DE | 37 18 888    | * | 12/1988 |
| DE | 38 40 772    | * | 6/1990  |
| EP | 0 206 794    |   | 12/1986 |
| EP | 0 260 130    |   | 3/1988  |
| EP | 0 277 004    |   | 8/1988  |
| EP | 0 293 815    |   | 12/1988 |
| EP | 0 295 312    |   | 12/1988 |
| EP | 0 314 797    |   | 5/1989  |
| EP | 0 323 716    |   | 7/1989  |
| EP | 0 336 593    |   | 10/1989 |
| EP | 0 361 866    |   | 4/1990  |
| EP | 0 367 503    |   | 5/1990  |
| EP | 0 368 644    |   | 5/1990  |
| EP | 0 372 414    |   | 6/1990  |

(Continued)

OTHER PUBLICATIONS

Yasuda et al., "Rare earth metal initiated polymerizations of polar and nonpolar monomers to give high molecular weight polymers with extremely narrow molecular weight polymers with extremely narrow molecular weight distribution," *Macromol. Chem. Phys.*, 196, pp. 2417-2441 (1995).

Plenio et al., "$n^5$-Complexes of cyclopentadienylsilylethers $(C_5H_4OSiR_3)$ and hydroxycyclopentadiene $(C_5H_4OH)$ with titanium and zirconium chlorides," *Journal of Organometallic Chemistry*, 544, pp. 133-137 (1997).

Wilkinson et al., "Bis-Cyclopentadienyl derivatives of some transition elements," *J. Am. Chem. Soc.*, vol. 75, p. 1010-1012 (1953).

Nugent et al., "Zirconium-Mediated Ring Construction from Dienes: Remarkable Effect of Ligands on Stereochemistry," *J. Am. Chem. Soc.*, vol. 111, pp. 6435-6437 (1989).

(Continued)

*Primary Examiner*—J. A. Lorengo
*Assistant Examiner*—J. Pasterczyk
(74) *Attorney, Agent, or Firm*—Ladas & Parry LLP

(57) ABSTRACT

Heterogeneous catalytic compositions obtained by reacting a porous inorganic support with an alumoxane and subsequently supporting at least one metallocene compound thereon. A process for polymerization of α-olefins in a slurry or in a gas phase, the process catalyzed by such heterogeneous catalytic compositions.

33 Claims, 1 Drawing Sheet

FOREIGN PATENT DOCUMENTS

Figure 1:
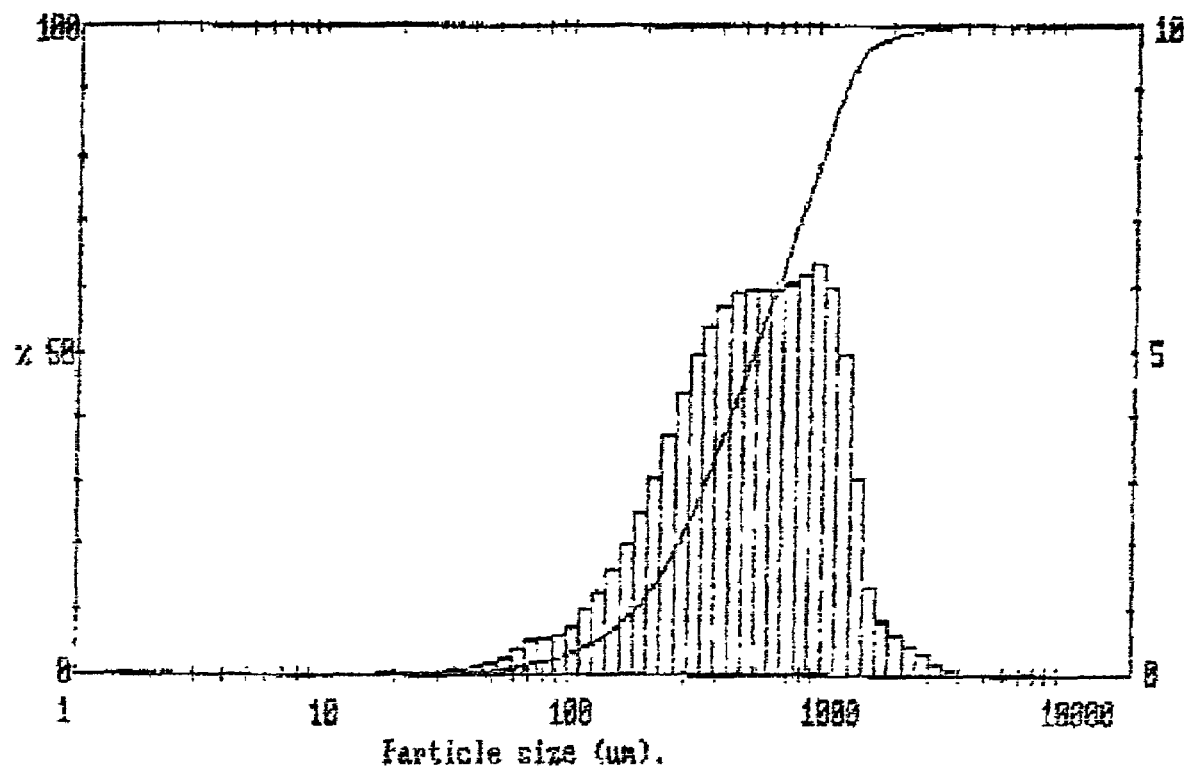

| | | | |
|---|---|---|---|
| EP | 0 416 815 B1 | | 3/1991 |
| EP | 0 420 436 | | 4/1991 |
| EP | 0 426 637 | | 5/1991 |
| EP | 0 474 391 | | 3/1992 |
| EP | 0 628 566 | * | 12/1994 |
| EP | 0 633 272 | | 1/1995 |
| EP | 0 668 295 | | 8/1995 |
| EP | 0 757 053 | | 2/1997 |
| EP | 0 757 992 | | 2/1997 |
| EP | 0 416 815 A2 | | 8/1997 |
| EP | 0 799 838 | * | 10/1997 |
| EP | 0 802 203 | | 10/1997 |
| EP | 0 839 833 A2 | | 5/1998 |
| EP | 0 839 836 | | 5/1998 |
| GB | 2 092 017 | * | 8/1982 |
| JP | 1 085 141 A | | 3/1989 |
| JP | 1085141 | * | 3/1989 ... 502/158 |
| SU | 828471 | * | 11/1983 ... 502/171 |
| SU | 828471 A | | 11/1983 |
| WO | 92/05203 | | 4/1992 |
| WO | 94/03506 | | 2/1994 |
| WO | 94/07928 | | 4/1994 |
| WO | 97/19959 | * | 6/1997 |

OTHER PUBLICATIONS

Kesti et al., "Homogeneous Ziegler-Natta Polymerization of Functionalized Monomers Catalyzed by Cationic Group IV Metallocenes," *J. Am. Chem. Soc.*, vol. 114, pp. 9679-9680 (1992).

Dubois, L.H., et al., "Dehydroxylated Silica Surfaces," *J. Am. Chem. Soc.*, vol. 115, pp. 1190-1191 (1993).

Blümel, J., "Reactions of Ethoxysilanes with Silica: A Solid-State NMR Study," *J. Am. Chem. Soc.* vol. 117, No. 7, pp. 2112-2113 (1995).

U.S. Appl. No. 08/961,347, filed Oct. 30, 1997, Royo et al.

U.S. Appl. No. 08/961,956, filed Oct. 31, 1997, Royo et al.

U.S. Appl. No. 09/300,302, filed Apr. 27, 1999, Llinas et al.

Chien, J.C.W., et al., "Olefin Copolymerization with Metallocene Catalysts. III. Metallocene/Methylaluminoxane Catalyst for Olefin Copolymerization," *Journal of Polymer Science, Part A: Polymer Chemistry*, vol. 29, pp. 1603-1607 (1991).

Chien, J.C.W., et al., "Olefin Copolymerization with Metallocene Catalysts. IV. Supported Metallocene/Methylaluminoxane Catalyzed Olefin Terpolymerization," *Journal of Polymer Science, Part A: Polymer Chemistry*, vol. 29, pp. 1609-1613 (1991).

Cihlár, J., et al., "Influence of Water on Ethylene Polymerization Catalyzed by Titanocene Systems," *Makromol. Chem.*, vol. 179, pp. 2553-2558 (1978).

Ciruelos, S., et al., "New Silyl-Substituted Cyclopentadienyl Titanium and Zirconium Complexes. X-ray Molecular Structures of [TiCl2{μ-[(n5-C5H4)SiMe2OsiMe2 (n5-C5H4)]}]," *Organometallics*, vol. 14, pp. 177-185 (1995).

Collins, S., et al., "Polymerization of Propylene Using Supported, Chiral, *ansa*-Metallocene Catalysts: Production of Polypropylene with Narrow Molecular Weight Distributions," *Macromolecules*, vol. 25, pp. 1780-1785 (1992).

Reichert, K.H., et al., "Zur Kinetik der Niederdruckpolymerisation von Äthylen mit löslichen Ziegler-Katalysatoren," *Die makromolekulare Chemie*, vol. 169, pp. 163-176 (1973).

"Group Notation Revised in Periodic Table," *Chemical & Engineering News*, vol. 63, No. 5, pp. 26-27 (Feb. 4, 1985).

Dias, H.V., et al., "Preparation of Group 4 metal complexes of a bulky amido-fluorenyl ligand," *Journal of Organometallic Chemistry*, vol. 508, pp. 91-99 (1996).

* cited by examiner

CATALYTIC SYSTEMS FOR THE POLYMERIZATION AND COPOLYMERIZATION OF ALPHA-OLEFINS

The present invention relates to a heterogeneous catalytic system and its use in olefin polymerization.

STATE OF THE ART

It is very well known that homogeneous catalytic compositions present a disadvantage: when they are used in suspension polymerization processes, a part of the produced polymer adheres to the reactor walls; this effect is technically called "reactor fouling". Besides, in most cases, the particle size of the obtained polymer is very small and the bulk density is low, thus the industrial production is reduced. In order to prevent the reactor from fouling and to control the size and the morphology of the polymer particles which are formed, the homogeneous system can be supported on an inorganic oxide.

In the last years different preparatory strategies have been used in order to reach this aim. EPA-206794 (Exxon) discloses a catalyst which comprises a carrier, a metallocene, and an alumoxane. The carrier is first treated with alumoxane and then the metallocene is added. EP-A-295312 (Mitsui) discloses a catalyst consisting of a carrier wherein alumoxane is precipitated and then the resulting material is impregnated with a metallocene. No additional cocatalyst is used in the polymerization process.

The first application claiming a process wherein the metallocene is reacted with the support surface is EP 293815 (HOECHST). The metallocene contains a SiOR group that reacts with the OH groups on the surface of the support.

EP 757053 (HOECHST) supports the metallocene by reacting the hydroxy groups of the inorganic support with a metallocene which contains a M-R-Z-Cl group, wherein M is Si, Ge or Sn and Z is B, Si, Ge or Sn. EP 757992 (REPSOL) discloses a catalyst comprising a metallocene which contains a Si—Cl group to react with the hydroxyls of the inorganic support.

Object of the present invention is the preparation of a supported catalyst for (co)polymerization of ethylene, whose activity is not decreased by the heterogeneization process and which results in a polymer having a very good morphology.

Thanks to the methods described in the present invention, heterogeneous catalysts can be obtained; they allow to effectively control the morphology and the distribution of particle sizes, with a regular growth of the polymer around the catalyst particles and without reactor fouling.

DETAILED DESCRIPTION OF THE INVENTION

The present invention relates to heterogeneous catalytic compositions obtained by reacting a specific class of metallocene compounds with a treated porous inorganic support, i.e. a support having on its surface an alumoxane.

According to the present invention the specific class of metallocene compounds is defined by general formulas I, II and III.

  I

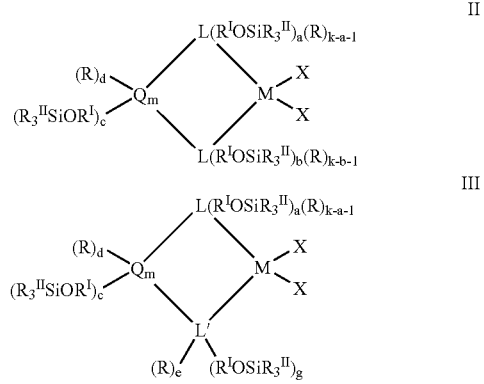

wherein:

L, equal to or different from each other, is selected from the group comprising: cyclopentadienyl, indenyl, tetrahydroindenyl, fluorenyl, octahydrofluorenyl and benzoindenyl;

each R is independently selected from hydrogen, $C_1$–$C_{20}$ alkyl, $C_3$–$C_{20}$ cycloalkyl, $C_6$–$C_{20}$ aryl, $C_3$–$C_{20}$ alkenyl, $C_7$–$C_{20}$ arylalkyl, $C_7$–$C_{20}$ alkylaryl, $C_8$–$C_{20}$ arylalkenyl, linear or branched, optionally substituted by 1 to 10 halogen atoms, or a group $SiR^{II}_3$; each $R^I$, equal to or different from each other, is a divalent aliphatic or aromatic hydrocarbon group containing from 1 to 20 carbon atoms, optionally containing from 1 to 5 heteroatoms of groups 14 to 16 of the periodic table of the elements and boron; preferably it is: $C_1$–$C_{20}$ alkylene, $C_3$–$C_{20}$cycloalkylene, $C_6$–$C_{20}$ arylene, $C_7$–$C_{20}$ alkenyl, $C_7$–$C_{20}$ arylalkylene, or alkylarylene, linear or branched, or a group $SiR^{II}_2$;

each $R^{II}$ is independently selected from $C_1$–$C_{20}$ alkyl, $C_3$–$C_{20}$ cycloalkyl, $C_6$–$C_{20}$ aryl, $C_3$–$C_{20}$ alkenyl, $C_1$–$C_{20}$ arylalkyl, $C_8$–$C_{20}$ arylalkenyl or $C_1$–$C_{20}$ alkylaryl, linear or branched; preferably $R^{II}$ is methyl, ethyl, isopropyl;

each Q is independently selected from B, C, Si, Ge, Sn; preferably it is C or Si;

M is a metal of group 3, 4 or 10 of the Periodic Table, Lanthanide or Actinide; preferably it is titanium, zirconium or hafnium;

each X is independently selected from: hydrogen, chlorine, bromine, $OR^{II}$, $NR^{II}_2$, $C_1$–$C_{20}$ alkyl or $C_6$–$C_{20}$ aryl; preferably it is chlorine, bromine;

L' is N or O;

k depends on the type of L; more specifically when L is cyclopentadienyl k is equal to 5, when L is indenyl k is equal to 7, when L is fluorenyl or benzoindenyl k is equal to 9, when L is tetrahydroindenyl k is equal to 11 and when L is octahydrofluorenyl, k is equal to 17;

z is equal to 0, 1 or 2; preferably z is 1;

x is equal to 1, 2 or 3; preferably x is 1;

y is equal to 1, 2 or 3;

x+y+z is equal to the valence of M;

m is an integer which can assume the values 1, 2, 3 or 4;

a and b are integers whose value ranges from 0 to k–1;

f is an integer whose value ranges from 1 to k;

g is an integer whose value ranges from 0 to 1;

c and e are equal to 0 or 1;

a+b+c is at least 1;

a+g+c is at least 1;

d is equal to 0, 1 or 2;

when Q is B, then c+d =1;

when Q is C, Si, Ge or Sn, then c+d=2;

when L' is N, then g+e=1;
when L' is O, then g=0 and e=0.

Non limitative examples of $R^I OSiR^{II}_3$ are:

$CH_2$—$CH_2$—$OSiMe_3$; $CH_2$—$CH_2$—$CH_2$—$OSiMe_3$; $CH_2$—O—$CH_2$—$OSiMe_3$; O—$CH_2$—$CH_2$—$OSiMe_3$; $SiMe_2$—$CH_2$—$CH_2$—$OSiMe_3$; $SiMe_2$—$CH_2$—$CH_2$—$CH_2$—$OSiMe_3$; $SiMe_2$—$CH_2$—$CH_2$—$CH_2$—$CH_2$—$OSiMe_3$; $CH_2$—$C_5H_5$—$CH_2$—$OSiMe_3$; $CH(C_2H_5)$—$CH_2$—$OSi(C_2H_5)_2Me$; $C(CH_3)_2$—$C(CH_3)_2$—$OSi(PhMe)_3$; $CH(CH_3)$—$CH(CH_3)$—O—$SiEtMe_2$; $SiMe_2$—$OSiMe_3$.

Preferably the group $R^I OSiR^{II}_3$ is selected from $CH_2$—$CH_2$—$OSiMe_3$, $CH_2$—$CH_2$—$CH_2$—$OSiMe_3$, $CH_2$—O—$CH_2$—$OSiMe_3$, O—$CH_2$—$CH_2$—$OSiMe_3$, $SiMe_2$—$CH_2$—$CH_2$—$OSiMe_3$, $SiMe_2$—$OSiMe_3$; $SiMe_2$—$CH_2$—$CH_2$—$CH_2$—$OSiMe_3$.

Preferred structures of compounds of formula I, II and III are the following:

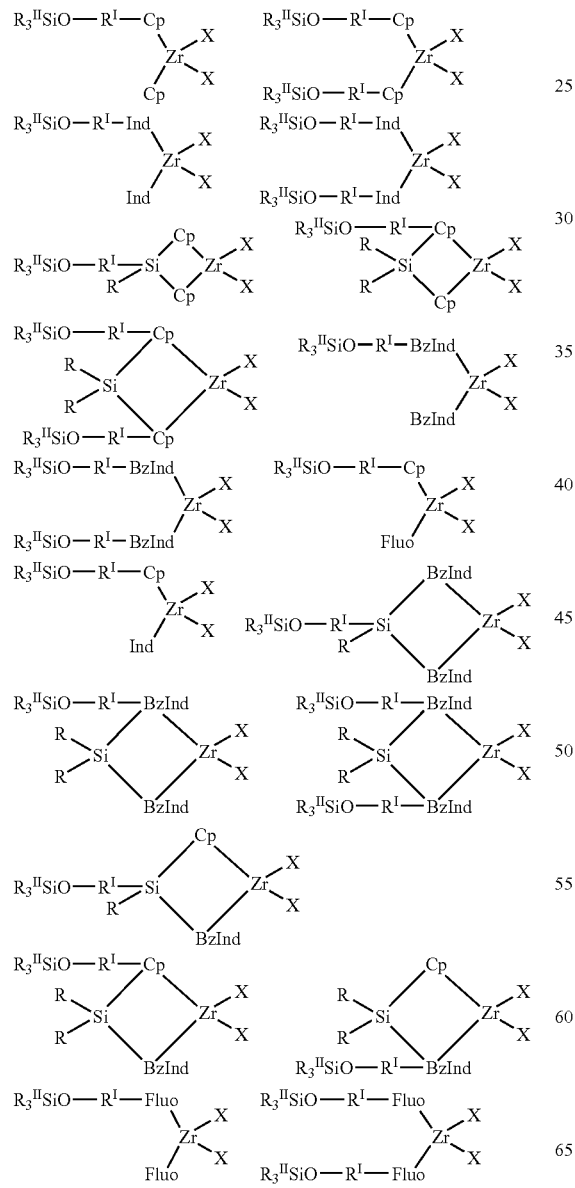

-continued

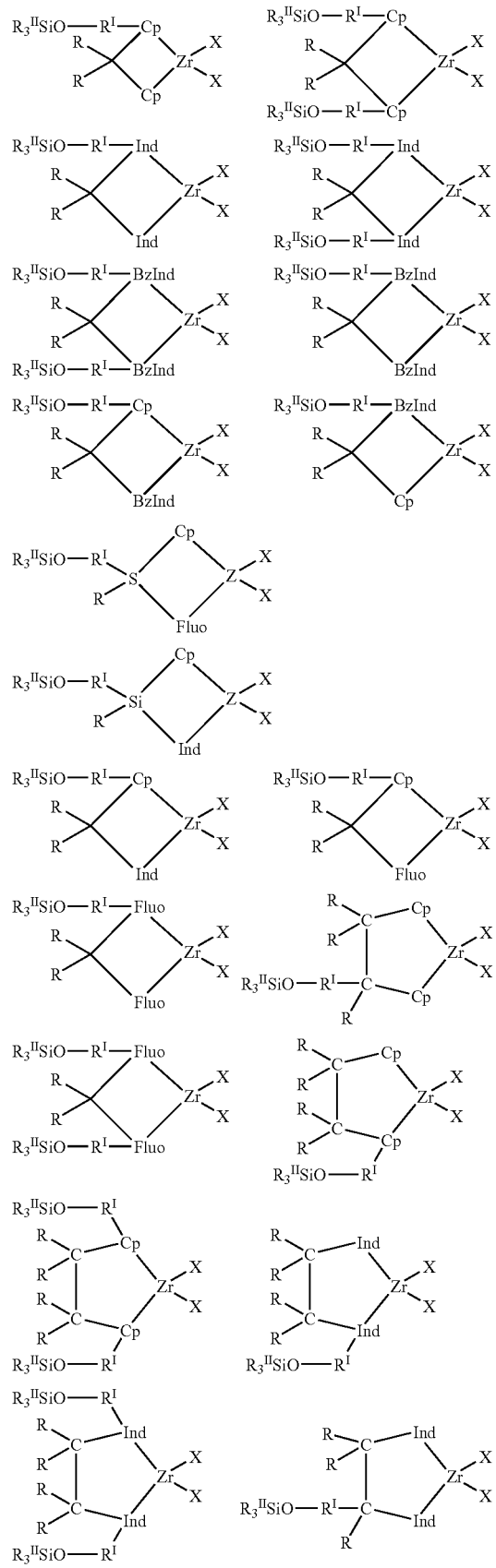

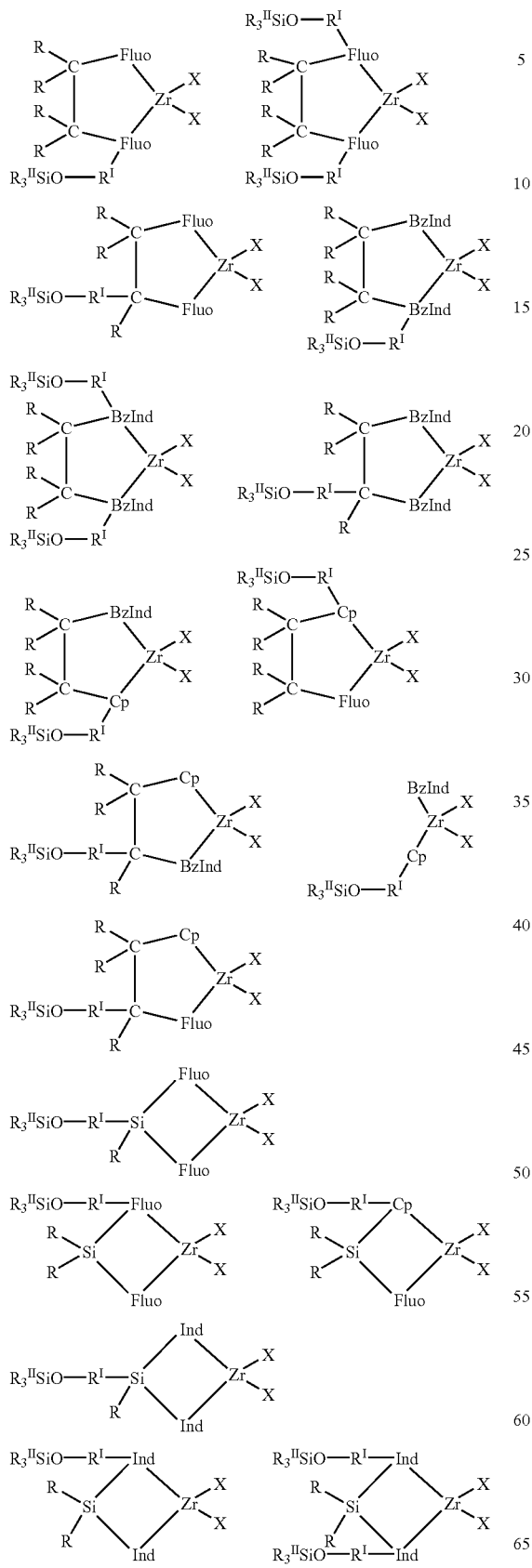

-continued

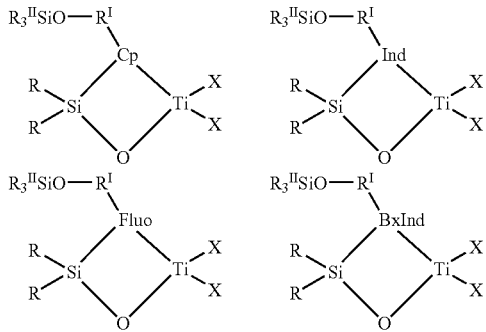

Wherein Cp, Ind, BzInd and Fluo indicate respectively a cyclopentadienyl, indenyl, benzoindenyl and fluorenyl ring optionally substituted by $C_1$–$C_{20}$ alkyl, $C_3$–$C_{20}$ cycloalkyl, $C_6$–$C_{20}$ aryl, $C_3$–$C_{20}$ alkenyl, $C_7$–$C_{20}$ arylalkyl, $C_8$–$C_{20}$ arylalkenyl or $C_7$–$C_{20}$ alkylaryl; the maximum number of substituents depends on the amount of hydrogen which can be substituted; R, $R^I$, $R^{II}$ and X have the above indicated meaning.

Preferred compounds for use in the present invention are the following:

bis(trimethylsiloxyethyl-cyclopentadienyl) zirconium dichloride;
(trimethylsiloxyethyl-cyclopentadienyl)(cyclopentadienyl) zirconium dichloride;
(trimethylsiloxyethyl-cyclopentadienyl)(indenyl) zirconium dichloride;
(trimethylsiloxyethyl-cyclopentadienyl)(2-methyl-indenyl) zirconium dichloride;
(trimethylsiloxyethyl-cyclopentadienyl)(fluorenyl) zirconium dichloride;
(trimethylsiloxyethyl-cyclopentadienyl)(9-methyl-fluorenyl) zirconium dichloride;
(trimethylsiloxyethyl-cyclopentadienyl)(pentamethylcyclopentadienyl) zirconium dichloride;
[1-(2-trimethylsiloxyethyl)indenyl](cyclopentadienyl) zirconium dichloride
[1-(2-methylsiloxyethyl)indenyl](pentamethyl cyclopentadienyl) zirconium dichloride
bis(trimethylsiloxypropyl-cyclopentadienyl) zirconium dichloride;
(trimethylsiloxypropyl-cyclopentadienyl)(cyclopentadienyl) zirconium dichloride;
(trimethylsiloxypropyl-cyclopentadienyl)(indenyl) zirconium dichloride;
(trimethylsiloxypropyl-cyclopentadienyl)(2-methyl-indenyl) zirconium dichloride;
(trimethylsiloxypropyl-cyclopentadienyl)(fluorenyl) zirconium dichloride;
(trimethylsiloxypropyl-cyclopentadienyl)(9-methyl-fluorenyl) zirconium dichloride;
(trimethylsiloxypropyl-cyclopentadienyl)(pentamethylcyclopentadienyl) zirconium dichloride;
[1-(3-trimethylsiloxypropyl)indenyl](cyclopentadienyl) zirconium dichloride;
bis(trimethylsiloxy-methoxy-cyclopentadienyl) zirconium dichloride;
(trimethylsioxy-methoxy-cyclopentadienyl)(cyclopentadienyl) zirconium dichloride;
(trimethylsiloxy-methoxy-cyclopentadienyl)(indenyl) zirconium dichloride;
(trimethylsiloxy-methoxy-cyclopentadienyl)(2-methyl-indenyl) zirconium dichloride;
(trimethylsiloxy-methoxy-cyclopentadienyl)(fluorenyl) zirconium dichloride;
(trimethylsiloxy-methoxy-cyclopentadienyl)(9-methyl-fluorenyl) zirconium dichloride;
(trimethylsiloxy-methoxy-cyclopentadienyl)(pentamethyl-cyclopentadienyl) zirconium dichloride;
bis(trimethylsiloxy-ethoxy-cyclopentadienyl) zirconium dichloride;
(trimethylsiloxy-ethoxy-cyclopentadienyl)(cyclopentadienyl) zirconium dichlorde;
(trimethylsiloxy-ethoxy-cyclopentadienyl)(1-indenyl) zirconium dichloride;
(trimethylsiloxy-ethoxy-cyclopentadienyl)(2-methyl-indenyl) zirconium dichloride;
(trimethylsiloxy-ethoxy-cyclopentadienyl)(fluorenyl) zirconium dichloride;
(trimethylsiloxy-ethoxy-cyclopentadienyl)(9-methyl-fluorenyl) zirconium dichloride;
(trimethyzsiloxy-ethoxy-cyclopentadienyl)(penytamethyl-cyclopentadienyl) zirconium dichdoride;
bis(trimethylsiloxy-ethyl-(dimethyl)silyl-cyclopentadienyl) zirconium dichloride;
(trimethylsiloxy-ethyl-cyclopentadienyl)(cyclopentadienyl) zirconium dichloride;
(trimethylsiloxy-propyl-(dimethyl)silyl-cyclopentadienyl)(cyclopentadienyl) zirconium dichloride;
(trimethylsiloxy-ethyl-(dimethyl)silyl-cyclopentadienyl)(indenyl) zirconium dichloride;
(trimethylsiloxy-ethyl-(dimethyl)silyl-cyclopentadienyl)(2-methyl-indenyl) zirconium dichloride;
(trimethylsiloxy-ethyl-(dimethyl)silyl-cyclopentadienyl)(fluorenyl) zirconium dichloride;
(trimethylsiloxy-ethyl-(dimethyl)silyl-cyclopentadienyl)(9-methyl-fluorenyl) zirconium dichloride;
(trimethylsiloxy-ethyl-(dimethyl)silyl-cyclopentadienyl)(pentamethylcyclopentadienyl) zirconium dichloride;
bis(trimethylsiloxy-(dimethyl)silyl-cyclopentadienyl) zirconium dichloride;
(trimethylsiloxy-(dimethyl)silyl-cyclopentadienyl)(cyclopentadienyl) zirconium dichloride;
dimethylsilandiylbis(2-trimethylsiloxyethyl-cyclopentadienyl) zirconium dichloride;
dimethylsilandiylbis(3-trimethylsiloxyethyl-cyclopentadienyl) zirconium dichloride;
dimethylsilandiyl(3-trimethylsiloxyethyl-cyclopentadienyl)(cyclopentadienyl)zirconium dichloride;
dimethylsilandiyl(2-trimethylsiloxyethyl-cyclopentadienyl)(1-indenyl) zirconium dichloride;
dimethylsilandiyl(3-trimethylsiloxyethyl-cyclopentadienyl)(1-indenyl) zirconium dichloride;
dimethylsilandiyl(1-(3-trimethylsiloxyethyl-indenyl))(ciclopentadienyl) zirconium dichloride;
dimethylsilandiyl(2-trimethylsiloxyethyl-cyclopentadienyl)(1-(2-methyl-indenyl)) zirconium dichloride;
dimethylsilandiyl(3-trimethylsiloxyethyl-cyclopentadienyl)(1-(2-methyl-indenyl)) zirconium dichloride;
dimethylsilandiyl(2-trimethylsiloxyethyl-cyclopentadienyl)(9-fluorenyl) zirconium dichloride;
dimethylsilandiyl(3-trimethylsiloxyethyl-cyclopentadienyl)(9-fluorenyl) zirconium dichloride;
dimethylsilandiyl(2-trimethylsiloxyethyl-cyclopentadienyl)(9-(2-methyl-fluorenyl)) zirconium dichloride;
dimethylsilandiyl(3-trimethylsiloxyethyl-cyclopentadienyl)(9-(2-methyl-fluorenyl)) zirconium dichloride;

dimethylsilandiyl(3-trimethylsiloxyethyl-cyclopentadienyl) (1-(2-methylbenzoindenyl)) zirconium dichloride;
dimethylsilandiylbis(2-trimethylsiloxypropyl-cyclopentadienyl) zirconium dichloride;
dimethylsilandiylbis(3-trimethylsiloxypropyl-cyclopentadienyl) zirconium dichloride;
dimethylsilandiyl(3-trimethylsiloxypropyl-cyclopentadienyl)(cyclopentadienyl) zirconium dichloride;
dimethylsilandiyl(1-(3-trimethylsiloxypropyl-indenyl))(cyclopentadienyl) zirconium dichloride;
dimethylsilandiyl(2-trimethylsiloxypropyl-cyclopentadienyl)(1-indenyl) zirconium dichloride;
dimethylsilandiyl(3-trimethylsiloxypropyl-cyclopentadienyl)(1-indenyl) zirconium dichloride;
dimethylsilandiyl(2-trimethylsiloxypropyl-cyclopentadienyl)(1-(2-methyl-indenyl)) zirconium dichloride;
dimethylsilandiyl(3-trimethylsiloxypropyl-cyclopentadienyl)(1-(2-methyl-indenyl)) zirconium dichloride;
dimethylsilandiyl(2-trimethylsiloxypropyl-cyclopentadienyl)(9-fluorenyl) zirconium dichloride;
dimethylsilandiyl(3-trimethylsiloxypropyl-cyclopentadienyl)(9-fluorenyl) zirconium dichloride;
dimethylsilandiyl(2-trimethylsiloxypropyl-cyclopentadienyl)(9-(2-methyl-fluorenyl)) zirconium dichloride;
dimethylsilandiyl(3-trimethylsiloxypropyl-cyclopentadienyl)(9-(2-methyl-fluorenyl)) zirconium dichloride;
dimethylsilandiyl(3-trimethylsiloxypropyl-cyclopentadienyl)(1-(2-methylbenzoindenyl)) zirconium dichloride;
dimethylsilandiylbis(2-trimethylsiloxy-methoxy-cyclopentadienyl) zirconium dichloride;
dimethylsilandiylbis(3-trimethylsiloxy-methoxy-cyclopentadienyl) zirconium dichloride;
dimethylsilandiyl(2-trimethylsiloxy-methoxy-cyclopentadienyl)(1-indenyl) zirconium dichloride;
dimethylsilandiyl(3-trimethylsiloxy-methoxy-cyclopentadienyl)(1-indenyl) zirconium dichloride;
dimethylsilandiyl(2-trimethylsiloxy-methoxy-cyclopentadienyl)(1-(2-methyl-indenyl)) zirconium dichloride;
dimethylsilandiyl(3-trimethylsiloxy-methoxy-cyclopentadienyl)(1-(2-methyl-indenyl)) zirconium dichloride;
dimethylsilandiyl(2-trimethylsiloxy-methoxy-cyclopentadienyl)(9-fluorenyl) zirconium dichloride;
dimethylsilandiyl(3-trimethylsiloxy-methoxy-cyclopentadienyl)(9-fluorenyl) zirconium dichloride;
dimethylsilandiyl(2-trimethylsiloxy-methoxy-cyclopentadienyl)(9-(2-methyl-fluorenyl)) zirconium dichloride;
dimethylsilandiyl(3-trimethylsiloxy-methoxy-cyclopentadienyl)(9-(2-methyl-fluorenyl)) zirconium dichloride;
dimethylsilandiylbis(2-trimethylsiloxy-ethoxy-cyclopentadienyl) zirconium dichloride;
dimethylsilandiylbis(3-trimethylsiloxy-ethoxy-cyclopentadienyl) zirconium dichloride;
dimethylsilandiyl(2-trimethylsiloxy-ethoxy-cyclopentadienyl)(1-indenyl) zirconium dichloride;
dimethylsilandiyl(3-trimethylsiloxy-ethoxy-cyclopentadienyl)(1-indenyl) zirconium dichloride;
dimethylsilandiyl(2-trimethylsiloxy-ethoxy-cyclopentadienyl)(1-(2-methyl-indenyl)) zirconium dichloride;
dimethylsilandiyl(3-trimethylsiloxy-ethoxy-cyclopentadienyl)(1-(2-methyl-indenyl)) zirconium dichloride;
dimethylsilandiyl(2-trimethylsiloxy-ethoxy-cyclopentadienyl)(9-fluorenyl) zirconium dichloride;
dimethylsilandiyl(3-trimethylsiloxy-ethoxy-cyclopentadienyl)(9-fluorenyl) zirconium dichloride;
dimethylsilandiyl(2-trimethylsiloxy-ethoxy-cyclopentadienyl)(9-(2-methyl-fluorenyl)) zirconium dichloride;
dimethylsilandiyl(3-trimethylsiloxy-ethoxy-cyclopentadienyl)(9-(2-methyl-fluorenyl)) zirconium dichloride;
dimethylsilandiylbis(2-(trimethylsiloxy-ethyl-(dimethyl)silyl)-cyclopentadienyl) zirconium dichloride;
dimethylsilandiylbis(3-(trimethylsiloxy-ethyl-(dimethyl)silyl)-cyclopentadienyl) zirconium dichloride;
dimethylsilandiyl(2-(trimethylsiloxy-ethyl-(dimethyl)silyl)-cyclopentadienyl)(1-indenyl) zirconium dichloride;
dimethylsilandiyl(3-(trimethylsiloxy-ethyl-(dimethyl)silyl)-cyclopentadienyl)(1-indenyl) zirconium dichloride;
dimethylsilandiyl(2-(trimethylsiloxy-ethyl-(dimethyl)silyl)-cyclopentadienyl)(1-(2-methyl-indenyl)) zirconium dichloride;
dimethylsilandiyl(3-(trimethylsiloxy-ethyl-(dimethyl)silyl)-cyclopentadienyl)(1-(2-methyl-indenyl)) zirconium dichloride;
dimethylsilandiyl(2-(trimethysiloxy-ethyl-(dimethyl)silyl)-cyclopentadienyl)(9-fluorenyl) zirconium dichloride;
dimethylsilandiyl(3-(trimethylsiloxy-ethyl-(dimethyl)silyl)-cyclopentadienyl)(9-fluorenyl) zirconium dichloride;
dimethylsilandiyl(2-trimethylsiloxy-ethyl-(dimethyl)silyl)-cyclopentadienyl(9-(2-methyl-fluorenyl)) zirconium dichloride;
dimethylsilandiyl(3-(trimethylsiloxy-ethyl-(dimethyl)silyl)-cyclopentadienyl)(9-(2-methyl-fluorenyl)) zirconium dichloride;
dimethylsilandiyl(3-(trimethylsiloxy-(dimethyl)silyl)-cyclopentadienyl)(1-indenyl) zirconium dichloride;
dimethylsilandiyl(3-(trimethylsiloxy-(dimethyl)silyl)-cyclopentadienyl)(1-(2-methylbenzoindenyl)) zirconium dichloride;
dimethylsilandiylbis(1-(3-trimethylsiloxy-(dimethyl)silyl)-indenyl) zirconium dichloride;
dimethylsilandiyl(1-(3-trimethylsiloxy-(dimethyl)silyl)-indenyl)(1-indenyl)zirconium dichloride;
isopropylidenebis(2-trimethylsiloxyethyl-cyclopentadienyl) zirconium dichloride;
isopropylidenebis(3-trimethylsiloxyethyl-cyclopentadienyl) zirconium dichloride;
isopropylidene(2-trimethylsiloxyethyl-cyclopentadienyl)(1-indenyl) zirconium dichloride;
isopropylidene(3-trimethylsiloxyethyl-cyclopentadienyl)(1-indenyl) zirconium dichloride;
isopropylidene(1-(3-trimethylsiloxyethyl-indenyl)(cyclopentadienyl) zirconium dichloride;
isopropylidene(2-trimethylsiloxyethyl-cyclopentadienyl)(1-(2-methyl-indenyl)) zirconium dichloride;
isopropylidene(3-trimethylsiloxyethyl-cyclopentadienyl)(1-(2-methyl-indenyl)) zirconium dichloride;
isopropylidene(2-trimethylsiloxyethyl-cyclopentadienyl)(9-fluorenyl) zirconium dichloride;
isopropylidene(3-trimethylsiloxyethyl-cyclopentadienyl)(9-fluorenyl) zirconium dichloride;
isopropylidene(2-trimethylsiloxyethyl-cyclopentadienyl)(9-(2-methyl-fluorenyl)) zirconium dichloride;
isopropylidene(3-trimethylsiloxyethyl-cyclopentadienyl)(9-(2-methyl-fluorenyl)) zirconium dichloride;
isopropylidene(3-trimethylsiloxyethyl-cyclopentadienyl)(1-(2methylbenzoindenyl)) zirconium dichloride;
isopropylidenebis(2-trimethylsiloxypropyl-cyclopentadienyl) zirconium dichloride;
isopropylidenebis(3-trimethylsiloxypropyl-cyclopentadienyl) zirconium dichloride;
isopropylidene(2-trimethylsiloxypropyl-cyclopentadienyl)(1-indenyl) zirconium dichloride;
isopropylidene(3-trimethylsiloxypropyl-cyclopentadienyl)(1-indenyl) zirconium dichloride;

isopropylidene(1-(3-trimethylsiloxypropyl-indenyl)(cicopentadienyl) zirconium dichloride;
isopropylidene(2-trimethylsiloxypropyl-cyclopentadienyl)(1-(2-methyl-indenyl)) zirconium dichloride;
isopropylidene(3-trimethylsiloxypropyl-cyclopentadienyl)(1-(2-methyl-indenyl)) zirconium dichloride;
isopropylidene(2-trimethylsiloxypropyl-cyclopentadienyl)(9-fluorenyl) zirconium dichloride;
isopropylidene(3-trimethylsiloxypropyl-cyclopentadienyl)(9-fluorenyl) zirconium dichloride;
isopropylidene(2-trimethylsiloxypropyl-cyclopentadienyl)(9-(2-methyl-fluorenyl) zirconium dichloride;
isopropylidene(3-trimethylsiloxypropyl-cyclopentadienyl)(9-(2-methyl-fluorenyl) zirconium dichloride;
isopropylidene(3-trimethylsiloxypropyl-cyclopentadienyl)(1(2methylbenzoidenyl)) zirconium dichloride;
isopropylidenebis(2-(trimethylsiloxy-methoxy)-cyclopentadienyl) zirconium dichloride;
isopropylidenebis(3-(trimethylsiloxy-methoxy)-cyclopentadienyl) zirconium dichloride;
isopropylidene(2-(trimethylsiloxy-methoxy)-cyclopentadienyl)(1-indenyl) zirconium dichloride;
isopropylidene(3-(trimethylsiloxy-methoxy)-cyclopentadienyl)(1-indenyl) zirconium dichloride;
isopropylidene(2-(trimethylsiloxy-methoxy)-cyclopentadienyl)(1-(2-methyl-indenyl)) zirconium dichloride;
isopropylidene(3-(trimethylsiloxy-methoxy)-cyclopentadienyl)(1-(2-methyl-indenyl)) zirconium dichloride;
isopropylidene(2-(trimethylsiloxy-methoxy)-cyclopentadienyl)(9-fluorenyl) zirconium dichloride;
isopropylidene(3-(trimethylsiloxy-methoxy)-cyclopentadienyl)(9-fluorenyl) zirconium dichloride;
isopropylidene(2-(trimethylsiloxy-methoxy)-cyclopentadienyl)(9-(2-methyl-fluorenyl)) zirconium dichloride;
isopropylidene(3-(trimethylsiloxy-methoxy)-cyclopentadienyl)(9-(2-methyl-fluorenyl)) zirconium dichloride;
isopropylidenebis(2-(trimethylsiloxy-ethoxy)-cyclopentadienyl) zirconium dichloride;
isopropylidenebis(3-(trimethylsiloxy-ethoxy)-cyclopentadienyl) zirconium dichloride;
isopropylidene(2-(trimethylsiloxy-ethoxy)-cyclopentadienyl)(1-indenyl) zirconium dichloride;
isopropylidene(3-(trimethylsiloxy-ethoxy)-cyclopentadienyl)(1-indenyl) zirconium dichloride;
isopropylidene(2-(trimethylsiloxy-ethoxy)-cyclopentadienyl)(1-(2-methyl-indenyl)) zirconium dichloride;
isopropylidene(3-(trimethylsiloxy-ethoxy)-cyclopentadienyl)(1-(2-methyl-indenyl)) zirconium dichloride;
isopropylidene(2-(trimethylsiloxy-ethoxy)-cyclopentadienyl)(9-fluorenyl) zirconium dichloride;
isopropylidene(3-(trimethylsiloxy-ethoxy)-cyclopentadienyl)(9-fiuorenyl) zirconium dichloride;
isopropylidene(2-(trimethylsiloxy-ethoxy)-cyclopentadienyl)(9-(2-methyl-fluorenyl)) zirconium dichloride;
isopropylidene(3-(trimethylsiloxy-ethoxy)-cyclopentadienyl)(9-(2-methyl-fluorenyl)) zirconium dichloride;
isopropylidenebis(2-(trimethylsiloxy-ethyl-(dimethyl)silyl)-cyclopentadienyl) zirconium dichloride;
isopropylidenebis(3-(trimethylsiloxy-ethyl-(dimethyl)silyl)-cyclopentadienyl) zirconium dichloride;
isopropylidene(2-(trimethylsiloxy-ethyl-(dimethyl)silyl)-cyclopentadienyl)(1-indenyl) zirconium dichloride;
isopropylidene(3-(trimethylsiloxy-ethyl-(dimethyl)silyl)-cyclopentadienyl)(1-indenyl) zirconium dichloride;
isopropylidene(2-(trimethylsiloxy-ethyl-(dimethyl)silyl)-cyclopentadienyl)(1-(2-methyl-indenyl)) zirconium dichloride;
isopropylidene(3-(trimethylsiloxy-ethyl-(dimethyl)silyl)-cyclopentadienyl)(1-(2-methyl-indenyl)) zirconium dichloride;
isopropylidene(2-(trimethylsiloxy-ethyl-(dimethyl)silyl)-cyclopentadienyl)(9-fluorenyl) zirconium dichloride;
isopropylidene(3-(trimethylsiloxy-ethyl-(dimethyl)silyl)-cyclopentadienyl)(9-fluorenyl) zirconium dichloride;
isopropylidene(2-(trimethylsiloxy-ethyl-(dimethyl)silyl)-cyclopentadienyl)(9-(2-methyl-fluorenyl)) zirconium dichloride;
isopropylidene(3-(trimethylsiloxy-ethyl-(dimethyl)silyl)-cyclopentadienyl)(9-(2-methyl-fluorenyl)) zirconium dichloride;
isopropylidene(3-(trimethylsiloxy-(dimethyl)silyl)-cyclopentadienyl)(1-indenyl) zirconium dichloride;
isopropylidene(3-(trimethylsiloxy-(dimethyl)silyl)-cyclopentadienyl)(1-(2-methylbenzoindenyl)) zirconium dichloride;
ethylidenebis(2-trimethylsiloxyethyl-cyclopentadienyl) zirconium dichloride;
ethylidenebis(3-trimethylsiloxyethyl-cyclopentadienyl) zirconium dichloride;
ethylidene(3-trimethylsiloxyethyl-cyclopentadienyl)(cyclopentadienyl) zirconium dichloride;
ethylidene(2-trimethylsiloxyethyl-cyclopentadienyl)(1-indenyl) zirconium dichloride;
ethylidene(3-trimethylsiloxyethyl-cyclopentadienyl)(1-indenyl) zirconium dichloride;
ethylidene(1-(3-trimethylsiloxyethyl-indenyl))(ciclopentadienyl) zirconium dichloride;
ethylidene(2-trimethylsiloxyethyl-cyclopentadienyl)(m-indenyl) zirconium dichloride;
ethylidene(3-trimethylsiloxyethyl-cyclopentadienyl)(1-(2-methyl-indenyl)) zirconium dichloride;
ethylidene(2-trimethylsiloxyethyl-cyclopentadienyl)(9-fluorenyl) zirconium dichloride;
ethylidene(3-trimethylsiloxyethyl-cyclopentadienyl)(9-fluorenyl) zirconium dichloride;
ethylidene(2-trimethylsiloxyethyl-cyclopentadienyl)(9-(2-methyl-fluorenyl)) zirconium dichloride;
ethylidene(3-trimethylsiloxyethyl-cyclopentadienyl)(9-(2-methyl-fluorenyl)) zirconium dichloride;
ethylidenebis(2-trimethylsiloxypropyl-cyclopentadienyl) zirconium dichloride;
ethylidenebis(3-trimethylsiloxypropyl-cyclopentadienyl) zirconium dichloride;
ethylidene(3-trimethylsiloxypropyl-cyclopentadienyl)(cyclopentadienyl) zirconium dichloride;
ethylidene(2-trimethylsiloxypropyl-cyclopentadienyl)(1-indenyl) zirconium dichloride;
ethylidene(3-trimethylsiloxypropyl-cyclopentadienyl)(1-indenyl) zirconium dichloride;
ethylidene(1-(3-trimethylsiloxypropyl-indenyl))(ciclopentadienyl) zirconium dichloride;
ethylidene(2-trimethylsiloxypropyl-cyclopentadienyl)(1-(2-methyl-indenyl)) zirconium dichloride;
ethylidene(3-trimethylsiloxypropyl-cyclopentadienyl)(1-(2-methyl-indenyl)) zirconium dichloride;
ethylidene(2-trimethylsiloxypropyl-cyclopentadienyl)(9-fluorenyl) zirconium dichloride;
ethylidene(3-trimethylsiloxypropyl-cyclopentadienyl)(9-fluorenyl) zirconium dichloride;
ethylidene(2-trimethylsiloxypropyl-cyclopentadienyl)(9-(2-methyl-fluorenyl)) zirconium dichloride;
ethylidene(3-trimethylsiloxypropyl-cyclopentadienyl)(9-(2-methyl-fluorenyl)) zirconium dichloride;

ethylidenebis(2-(trimethylsiloxy-methoxy)-cyclopentadienyl) zirconium dichloride;
ethylidenebis(3-(trimethylsiloxy-methoxy)-cyclopentadienyl) zirconium dichloride;
ethylidene(2-(trimethylsiloxymethoxy)cyclopentadienyl)(1-indenyl) zirconium dichloride;
ethylidene(3-(trimethylsiloxy-methoxy)-cyclopentadienyl)(1-indenyl) zirconium dichloride;
ethylidene(2-(trimethylsiloxy-methoxy)-cyclopentadienyl)(1-(2-methyl-indenyl)) zirconium dichloride;
ethylidene(3-(trimethylsiloxy-methoxy)-cyclopentadienyl)(1-(2-methyl-indenyl)) zirconium dichloride;
ethylidene(2-(trimethylsiloxy-methoxy)-cyclopentadienyl)(9-fluorenyl) zirconium dichloride;
ethylidene(3-(trimethylsiloxy-methoxy)-cyclopentadienyl)(9-fluorenyl) zirconium dichloride;
ethylidene(2-(trimethylsiloxy-methoxy)-cyclopentadienyl)(9-(2-methyl-fluorenyl)) zirconium dichloride;
ethylidene(3-(trimethylsiloxy-methoxy)-cyclopentadienyl)(9-(2-methyl-fluorenyl)) zirconium dichloride;
ethylidenebis(2-(trimethylsiloxy-ethoxy)-cyclopentadienyl) zirconium dichloride;
ethylidenebis(3-(trimethylsiloxy-ethoxy)-cyclopentadienyl) zirconium dichloride;
ethylidene(2-(trimethylsiloxy-ethoxy)-cyclopentadienyl)(1-indenyl) zirconium dichloride;
ethylidene(3-(trimethylsiloxy-ethoxy)-cyclopentadienyl)(1-indenyl) zirconium dichloride;
ethylidene(2-(trimethylsiloxy-ethoxy)-cyclopentadienyl)(1-(2-methyl-indenyl)) zirconium dichloride;
ethylidene(3-(trimethylsiloxy-ethoxy)-cyclopentadienyl)(1-(2-methyl-indenyl)) zirconium dichloride;
ethylidene(2-(trimethylsiloxy-ethoxy)-cyclopentadienyl)(9-fluorenyl) zirconium dichloride;
ethylidene(3-(trimethylsiloxy-ethoxy)-cyclopentadienyl)(9-fluorenyl) zirconium dichloride;
ethylidene(2-(trimethylsiloxy-ethoxy)-cyclopentadienyl)(9-(2-methyl-fluorenyl)) zirconium dichloride;
ethylidene(3-(trimethylsiloxy-ethoxy)-cyclopentadienyl)(9-(2-methyl-fluorenyl)) zirconium dichloride;
ethylidenebis(2-(trimethylsiloxy-ethyl-(dimethyl)silyl)-cyclopentadienyl) zirconium dichloride;
ethylidenebis(3-(trimethylsiloxy-ethyl-(dimethyl)silyl)-cyclopentadienyl) zirconium dichloride;
ethylidene(2-(trimethylsiloxy-ethyl-(dimethyl)silyl)-cyclopentadienyl)(1-indenyl) zirconium dichloride;
ethylidene(3-(trimethylsiloxy-ethyl-(dimethyl)silyl)-cyclopentadienyl)(1-indenyl) zirconium dichloride;
ethylidene(2-(trimethylsiloxy-ethyl-(dimethyl)silyl)-cyclopentadienyl)(1-(2-methyl-indenyl)) zirconium dichloride;
ethylidene(3-(trimethylsiloxy-ethyl-(dimethyl)silyl)-cyclopentadienyl)(1-(2-methyl-indenyl)) zirconium dichloride;
ethylidene(2-(trimethylsiloxy-ethyl-(dimethyl)silyl)-cyclopentadienyl)(9-fluorenyl) zirconium dichloride;
ethylidene(3-(trimethylsiloxy-ethyl-(dimethyl)silyl)-cyclopentadienyl)(9-fluorenyl) zirconium dichloride;
ethylidene(2-(trimethylsiloxy-ethyl-(dimethyl)silyl)-cyclopentadienyl)(9-(2-methyl-fluorenyl)) zirconium dichloride;
ethylidene(3-(trimethylsiloxy-ethyl-(dimethyl)silyl)-cyclopentadienyl)(9-(2-methyl-fluorenyl)) zirconium dichloride;
dimethylsilandiylbis(1-(2-trimethylsiloxyethyl-indenyl)) zirconium dichloride;
dimethylsilandiylbis(1-(3-trimethylsiloxyethyl-indenyl)) zirconium dichloride;
dimethylsilandiyl(1-(2-trimethylsiloxyethyl-indenyl))(1-indenyl) zirconium dichloride;
dimethylsilandiyl(1-(3-trimethylsiloxyethyl-indenyl))(1-indenyl) zirconium dichloride;
dimethylsilandiyl(1-(2-trimethylsiloxyethyl-indenyl))(1-(2-methyl-indenyl)) zirconium dichloride;
dimethylsilandiyl(1-(3-trimethylsiloxyethyl-indenyl))(1-(2-methyl-indenyl)) zirconium dichloride;
dimethylsilandiyl(1-(2-trimethylsiloxyethyl-indenyl))(9-fluorenyl) zirconium dichloride;
dimethylsilandiyl(1-(3-trimethylsiloxyethyl-indenyl))(9-fluorenyl) zirconium dichloride;
dimethylsilandiyl(1-(2-trimethylsiloxyethyl-indenyl))(9-(2-methyl-fluorenyl)) zirconium dichloride;
dimethylsilandiyl(1-(3-trimethylsiloxyethyl-indenyl))(9-(2-methyl-fluorenyl)) zirconium dichloride;
dimethylsilandiylbis(1-(2-trimethylsiloxypropyl-indenyl)) zirconium dichloride;
dimethylsilandiylbis(1-(3-trimethylsiloxypropyl-indenyl)) zirconium dichloride;
dimethylsilandiyl(1-(2-trimethylsiloxypropyl-indenyl))(1-indenyl) zirconium dichloride;
dimethylsilandiyl(1-(3-trimethylsiloxypropyl-indenyl))(1-indenyl) zirconium dichloride;
dimethylsilandiyl(1-(2-trimethylsiloxypropyl-indenyl))(1-(2-methyl-indenyl)) zirconium dichloride;
dimethylsilandiyl(1-(3-trimethylsiloxypropyl-indenyl))(1-(2-methyl-indenyl)) zirconium dichloride;
dimethylsilandiyl(1-(2-trimethylsiloxypropyl-indenyl))(9-fluorenyl) zirconium dichloride;
dimethylsilandiyl(1-(3-trimethylsiloxypropyl-indenyl))(9-fluorenyl) zirconium dichloride;
dimethylsilandiyl(1-(2-trimethylsiloxypropyl-indenyl))(9-(2-methyl-fluorenyl)) zirconium dichloride;
dimethylsilandiyl(1-(3-trimethylsiloxypropyl-indenyl))(9-(2-methyl-fluorenyl)) zirconium dichloride;
dimethylsilandiylbis(1-(2-trimethylsiloxy-methoxy-indenyl)) zirconium dichloride;
dimethylsilandiylbis(1-(3-trimethylsiloxy-methoxy-indenyl)) zirconium dichloride;
dimethylsilandiyl(1-(2-trimethylsiloxy-methoxy-indenyl))(1-indenyl) zirconium dichloride;
dimethylsilandiyl(1-(3-trimethylsiloxy-methoxy-indenyl))(1-indenyl) zirconium dichloride;
dimethylsilandiyl(1-(2-trimethylsiloxy-methoxy-indenyl))(1-(2-methyl-indenyl)) zirconium dichloride;
dimethylsilandiyl(1-(3-trimethylsiloxy-methoxy-indenyl))(1-(2-methyl-indenyl)) zirconium dichloride;
dimethylsilandiyl(1-(2-trimethylsiloxy-methoxy-indenyl))(9-fluorenyl) zirconium dichloride;
dimethylsilandiyl(1-(3-trimethylsiloxy-methoxy-indenyl))(9-fluorenyl) zirconium dichloride;
dimethylsilandiyl(1-(2-trimethylsiloxy-methoxy-indenyl))(9-(2-methyl-fluorenyl)) zirconium dichloride;
dimethylsilandiyl(1-(3-trimethylsiloxy-methoxy-indenyl))(9-(2-methyl-fluorenyl)) zirconium dichloride;
dimethylsilandiylbis(1-(2-trimethylsiloxy-ethoxy-indenyl)) zirconium dichloride;
dimethylsilandiylbis(1-(3-trimethylsiloxy-ethoxy-indenyl)) zirconium dichloride;
dimethylsilandiyl(1-(2-trimethylsiloxy-ethoxy-indenyl))(1-indenyl) zirconium dichloride;
dimethylsilandiyl(1-(3-trimethylsiloxy-ethoxy-indenyl))(1-indenyl) zirconium dichloride;
dimethylsilandiyl(1-(2-trimethylsiloxy-ethoxy-indenyl))(1-(2-methyl-indenyl)) zirconium dichloride;

dimethylsilandiyl(1-(3-trimethylsiloxy-ethoxy-indenyl))(1-(2-methyl-indenyl)) zirconium dichloride;
dimethylsilandiyl(1-(2-trimethylsiloxy-ethoxy-indenyl))(9-fluorenyl) zirconium dichloride;
dimethylsilandiyl(1-(3-trimethylsiloxy-ethoxy-indenyl))(9-fluorenyl) zirconium dichloride;
dimethylsilandiyl(1-(2-trimethylsiloxy-ethoxy-indenyl))(9-(2-methyl-fluorenyl)) zirconium dichloride;
dimethylsilandiyl(1-(3-trimethylsiloxy-ethoxy-indenyl))(9-(2-methyl-fluorenyl)) zirconium dichloride;
dimethylsilandiylbis(1-(2-trimethylsiloxy-ethyl-(dimethyl)silyl-indenyl)) zirconium dichloride;
dimethylsilandiylbis(1-(3-trimethylsiloxy-ethyl-(dimethyl)silyl-indenyl)) zirconium dichloride;
dimethylsilandiyl(1-(2-trimethylsiloxy-ethyl-(dimethyl)silyl-indenyl))(1-indenyl) zirconium dichloride;
dimethylsilandiyl(1-(3-trimethylsiloxy-ethyl-(dimethyl)silyl-indenyl))(1-indenyl) zirconium dichloride;
dimethylsilandiyl(1-(2-trimethylsiloxy-ethyl-(dimethyl)silyl-indenyl))(1-(2-methyl-indenyl)) zirconium dichloride;
dimethylsilandiyl(1-(3-trimethylsiloxy-ethyl-(dimethyl)silyl-indenyl))(1-(2-methyl-indenyl)) zirconium dichloride;
dimethylsilandiyl(1-(2-trimethylsiloxy-ethyl-(dimethyl)silyl-indenyl))(9-fluorenyl) zirconium dichloride;
dimethylsilandiyl(1-(3-trimethylsiloxy-ethyl-(dimethyl)silyl-indenyl))(9-fluorenyl) zirconium dichloride;
dimethylsilandiyl(1-(2-trimethylsiloxy-ethyl-(dimethyl)silyl-indenyl))(9-(2-methyl-fluorenyl)) zirconium dichloride;
dimethylsilandiyl(1-(3-trimethylsiloxy-ethyl-(dimethyl)silyl-indenyl))(9-(2-methyl-fluorenyl)) zirconium dichloride;
isopropylidenebis(1-(2-trimethylsiloxyethyl-indenyl)) zirconium dichloride;
isopropylidenebis(1-(3-trimethylsiloxyethyl-indenyl)) zirconium dichloride;
isopropylidene(1-(2-trimethylsiloxyethyl-indenyl))(1-indenyl) zirconium dichloride;
isopropylidene(1-(3-trimethylsiloxyethyl-indenyl))(1-indenyl) zirconium dichloride;
isopropylidene(1-(2-trimethylsiloxyethyl-indenyl))(1-(2-methyl-indenyl)) zirconium dichloride;
isopropylidene(1-(3-trimethylsiloxyethyl-indenyl))(1-(2-methyl-indenyl)) zirconium dichloride;
isopropylidene(1-(2-trimethylsiloxyethyl-indenyl))(9-fluorenyl) zirconium dichloride;
isopropylidene(1-(3-trimethylsiloxyethyl-indenyl))(9-fluorenyl) zirconium dichloride;
isopropylidene(1-(2-trimethylsiloxyethyl-indenyl))(9-(2-methyl-fluorenyl)) zirconium dichloride;
isopropylidene(1-(3-trimethylsiloxyethyl-indenyl))(9-(2-methyl-fluorenyl)) zirconium dichloride;
isopropylidenebis(1-(2-trimethylsiloxypropyl-indenyl)) zirconium dichloride;
isopropylidenebis(1-(3-trimethylsiloxypropyl-indenyl)) zirconium dichloride;
isopropylidene(1-(2-trimethylsiloxypropyl-indenyl))(1-indenyl) zirconium dichloride;
isopropylidene(1-(3-trimethylsiloxypropyl-indenyl))(1-indenyl) zirconium dichloride;
isopropylidene(1-(2-trimethylsiloxypropyl-indenyl))(1-(2-methyl-indenyl)) zirconium dichloride;
isopropylidene(1-(3-trimethylsiloxypropyl-indenyl))(1-(2-methyl-indenyl)) zirconium dichloride;
isopropylidene(1-(2-trimethylsiloxypropyl-indenyl))(9-fluorenyl) zirconium dichloride;
isopropylidene(1-(3-trimethylsiloxypropyl-indenyl))(9-fluorenyl) zirconium dichloride;
isopropylidene(1-(2-trimethylsiloxypropyl-indenyl))(9-(2-methyl-fluorenyl)) zirconium dichloride;
isopropylidene(1-(3-trimethylsiloxypropyl-indenyl))(9-(2-methyl-fluorenyl)) zirconium dichloride;
isopropylidenebis(1-(2-trimethylsiloxy-methoxy-indenyl)) zirconium dichloride;
isopropylidenebis(1-(3-trimethylsiloxy-methoxy-indenyl)) zirconium dichloride;
isopropylidene(1-(2-trimethylsiloxy-methoxy-indenyl))(1-indenyl) zirconium dichloride;
isopropylidene(1-(3-trimethylsiloxy-methoxy-indenyl))(1-indenyl) zirconium dichloride;
isopropylidene(1-(2-trimethylsiloxy-methoxy-indenyl))(1-(2-methyl-indenyl)) zirconium dichloride;
isopropylidene(1-(3-trimethylsiloxy-methoxy-indenyl))(1-(2-methyl-indenyl)) zirconium dichloride;
isopropylidene(1-(2-trimethylsiloxy-methoxy-indenyl))(9-fluorenyl) zirconium dichloride;
isopropylidene(1-(3-trimethylsiloxy-methoxy-indenyl))(9-fluorenyl) zirconium dichloride;
isopropylidene(1-(2-trimethylsiloxy-methoxy-indenyl))(9-(2-methyl-fluorenyl)) zirconium dichloride;
isopropylidene(1-(3-trimethylsiloxy-methoxy-indenyl))(9-(2-methyl-fluorenyl)) zirconium dichloride;
isopropylidenebis(1-(2-trimethylsiloxy-ethoxy-indenyl)) zirconium dichloride;
isopropylidenebis(1-(3-trimethylsiloxy-ethoxy-indenyl)) zirconium dichloride;
isopropylidene(1-(2-trimethylsiloxy-ethoxy-indenyl))(1-indenyl) zirconium dichloride;
isopropylidene(1-(3-trimethylsiloxy-ethoxy-indenyl))(1-indenyl) zirconium dichloride;
isopropylidene(1-(2-trimethylsiloxy-ethoxy-indenyl))(1-(2-methyl-indenyl)) zirconium dichloride;
isopropylidene(1-(3-trimethylsiloxy-ethoxy-indenyl))(1-(2-methyl-indenyl)) zirconium dichloride;
isopropylidene(1-(2-trimethylsiloxy-ethoxy-indenyl))(9-fluorenyl) zirconium dichloride;
isopropylidene(1-(3-trimethylsiloxy-ethoxy-indenyl))(9-fluorenyl) zirconium dichloride;
isopropylidene(1-(2-trimethylsiloxy-ethoxy-indenyl))(9-(2-methyl-fluorenyl)) zirconium dichloride;
isopropylidenebis(1-(3-trimethylsiloxy-ethoxy-indenyl))(9-(2-methyl-fluorenyl)) zirconium dichloride;
isopropylidenebis(1-(2-trimethylsiloxy-ethyl-(dimethyl)silyl-indenyl)) zirconium dichloride;
isopropylidene(1-(3-trimethylsiloxy-ethyl-(dimethyl)silyl-indenyl))(1-indenyl) zirconium dichloride;
isopropylidene(1-(2-trimethylsiloxy-ethyl-(dimethyl)silyl-indenyl))(1-indenyl) zirconium dichloride;
isopropylidene(1-(3-trimethylsiloxy-ethyl-(dimethyl)silyl-indenyl))(1-indenyl) zirconium dichloride;
isopropylidene(1-(2-trimethylsiloxy-ethyl-(dimethyl)silyl-indenyl))(1-(2-methyl-indenyl)) zirconium dichloride;
isopropylidene(1-(3-trimethylsiloxy-ethyl-(dimethyl)silyl-indenyl))(1-(2-methyl-indenyl)) zirconium dichloride;
isopropylidene(1-(2-trimethylsiloxy-ethyl-(dimethyl)silyl-indenyl))(9-fluorenyl) zirconium dichloride;
isopropylidene(1-(3-trimethylsiloxy-ethyl-(dimethyl)silyl-indenyl))(9-fluorenyl) zirconium dichloride;
isopropylidene(1-(2-trimethylsiloxy-ethyl-(dimethyl)silyl-indenyl))(9-(2-methyl-fluorenyl)) zirconium dichloride;
isopropylidene(1-(3-trimethylsiloxy-ethyl-(dimethyl)silyl-indenyl))(9-(2-methyl-fluorenyl)) zirconium dichloride;

ethylidenebis(1-(2-trimethylsiloxyethyl-indenyl)) zirconium dichloride;
ethylidenebis(1-(3-trimethylsiloxyethyl-indenyl)) zirconium dichloride;
ethylidene(1-(2-trimethylsiloxyethyl-indenyl))(1-indenyl) zirconium dichloride;
ethylidene(1-(3-trimethylsiloxyethyl-indenyl))(1-indenyl) zirconium dichloride;
ethylidene(1-(2-trimethylsiloxyethyl-indenyl))(1-(2-methyl-indenyl)) zirconium dichloride;
ethylidene(1-(3-trimethylsiloxyethyl-indenyl))(1-(2-methyl-indenyl)) zirconium dichloride;
ethylidene(1-(2-trimethylsiloxyethyl-indenyl))(9-fluorenyl) zirconium dichloride;
ethylidene(1-(3-trimethylsiloxyethyl-indenyl))(9-fluorenyl) zirconium dichloride;
ethylidene(1-(2-trimethylsiloxyethyl-indenyl))(9-(2-methyl-fluorenyl)) zirconium dichloride;
ethylidene(1-(3-trimethylsiloxyethyl-indenyl))(9-(2-methyl-fluorenyl)) zirconium dichloride;
ethylidenebis(1-(2-trimethylsiloxypropyl-indenyl)) zirconium dichloride;
ethylidenebis(1-(3-trimethylsiloxypropyl-indenyl)) zirconium dichloride;
ethylidene(1-(2-trimethylsiloxypropyl-indenyl))(1-indenyl) zirconium dichloride;
ethylidene(1-(3-trimethylsiloxypropyl-indenyl))(1-indeny) zirconium dichloride;
ethylidene(1-(2-trimethylsiloxypropyl-indenyl))(1-(2-methyl-indenyl)) zirconium dichloride;
ethylidene(1-(3-trimethylsiloxypropyl-indenyl))(1-(2-methyl-indenyl)) zirconium dichloride;
ethylidene(1-(2-trimethylsiloxypropyl-indenyl))(9-fluorenyl) zirconium dichloride;
ethylidene(1-(3-trimethylsiloxypropyl-indenyl))(9-fluorenyl) zirconium dichloride;
dichloride;
ethylidene(1-(2-trimethylsiloxypropyl-indenyl))(9-(2-methyl-fluorenyl) zirconium dichloride;
ethylidene(1-(3-trimethylsiloxypropyl-indenyl))(9-(2-methyl-fluorenyl) zirconium dichloride;
dichloride;
ethylidenebis(1-(2-trimethylsiloxy-methoxy-indenyl)) zirconium dichloride;
ethylidenebis(1-(3-trimethylsiloxy-methoxy-indenyl)) zirconium dichloride;
ethylidene(1-(2-trimethylsiloxy-methoxy-indenyl))(1-indenyl) zirconium dichloride;
ethylidene(1-(3-trimethylsiloxy-methoxy-indenyl))(1-indenyl) zirconium dichloride;
ethylidene(1-(2-trimethylsiloxy-methoxy-indenyl))(1-(2-methyl-indenyl)) zirconium dichloride;
ethylidene(1-(3-trimethylsiloxy-methoxy-indenyl))(1-(2-methyl-indenyl)) zirconium dichloride;
ethylidene(1-(2-trimethylsiloxy-methoxy-indenyl))(9-fluorenyl) zirconium dichloride;
ethylidene(1-(3-trimethylsiloxy-methoxy-indenyl))(9-fluorenyl) zirconium dichloride;
ethylidene(1-(2-trimethylsiloxy-methoxy-indenyl))(9-(2-methyl-fluorenyl)) zirconium dichloride;
ethylidene(1-(3-trimethylsiloxy-methoxy-indenyl))(9-(2-methyl-fluorenyl)) zirconium dichloride;
ethylidenebis(1-(2-trimethylsiloxy-ethoxy-indenyl)) zirconium dichloride;
ethylidenebis(1-(3-trimethylsiloxy-ethoxy-indenyl)) zirconium dichloride;
ethylidene(1-(2-trimethylsiloxy-ethoxy-indenyl))(1-indenyl) zirconium dichloride;
ethylidene(1-(3-trimethylsiloxy-ethoxy-indenyl))(1-indenyl) zirconium dichloride;
ethylidene(1-(2-trimethylsiloxy-ethoxy-indenyl))(1-(2-methyl-indenyl)) zirconium dichloride;
ethylidene(1-(3-trimethylsiloxy-ethoxy-indenyl))(1-(2-methyl-indenyl)) zirconium dichloride;
ethylidene(1-(2-trimethylsiloxy-ethoxy-indenyl))(9-fluorenyl) zirconium dichloride;
ethylidene(1-(3-trimethylsiloxy-ethoxy-indenyl))(9-fluorenyl) zirconium dichloride;
ethylidene(1-(2-trimethylsiloxy-ethoxy-indenyl))(9-(2-methyl-fluorenyl)) zirconium dichloride;
ethylidene(1-(3-trimethylsiloxy-ethoxy-indenyl))(9-(2-methyl-fluorenyl)) zirconium dichloride;
ethylidenebis(1-(2-trimethylsiloxy-ethyl-(dimethyl)silyl-indenyl)) zirconium dichloride;
ethylidenebis(1-(3-trimethylsiloxy-ethyl-(dimethyl)silyl-indenyl)) zirconium dichloride;
ethylidene(1-(2-trimethylsiloxy-ethyl-(dimethyl)silyl-indenyl))(1-indenyl) zirconium dichloride;
ethylidene(1-(3-trimethylsiloxy-ethyl-(dimethyl)silyl-indenyl))(1-indenyl) zirconium dichloride;
ethylidene(1-(2-trimethylsiloxy-ethyl-(dimethyl)silyl-indenyl))(1-(2-methyl -indenyl)) zirconium dichloride;
ethylidene(1-(3-trimethylsiloxy-ethyl-(dimethyl)silyl-indenyl))(1-(2-methyl-indenyl)) zirconium dichloride;
ethylidene(1-(2-trimethylsiloxy-ethyl-(dimethyl)silyl-indenyl))(9-fluorenyl) zirconium dichloride;
ethylidene(1-(3-trimethylsiloxy-ethyl-(dimethyl)silyl-indenyl))(9-fluorenyl) zirconium dichloride;
ethylidene(1-(2-trimethylsiloxy-ethyl-(dimethyl)silyl-indenyl))(9-(2-methyl-fluorenyl)) zirconium dichloride;
ethylidene(1-(3-trimethylsiloxy-ethyl-(dimethyl)silyl-indenyl))(9-(2-methyl-fluorenyl)) zirconium dichloride;
dimethylsilylenebis(9-(1-trimethylsiloxyethyl-fluorenyl)) zirconium dichloride;
dimethylsilylene(9-(1-trimethylsiloxyethyl-fluorenyl))(cyclopentadienyl) zirconium dichloride;
dimethylsilylene(9-(1-trimethylsiloxyethyl-fluorenyl))(1-(2-methyl-indenyl)) zirconium dichloride;
dimethylsilylene(9-(1-trimethylsiloxyethyl-fluorenyl))(1-indenyl) zirconium dichloride;
dimethylsilylene(9-(1-trimethylsiloxyethyl-fluorenyl))(9-(2-methyl-fluorenyl)) zirconium dichloride;
dimethylsilylenebis(9-(1-trimethylsiloxypropyl-fluorenyl)) zirconium dichloride;
dimethylsilylene(9-(1-trimethylsiloxypropyl-fluorenyl))(9-fluorenyl) zirconium dichloride;
dimethylsilylene(9-(1-trimethylsiloxypropyl-fluorenyl))(1-(2-methyl-indenyl)) zirconium dichloride;
dimethylsilylene(9-(1-trimethylsiloxypropyl-fluorenyl))(1-indenyl) zirconium dichloride;
dimethylsilylene(9-(1-trimethylsiloxypropyl-fluorenyl))(9-(2-methyl-fluorenyl)) zirconium dichloride;
dimethylsilylenebis(9-(1-trimethylsiloxy-methoxy-fluorenyl)) zirconium dichloride;
dimethylsilylene(9-(1-trimethylsiloxy-methoxy-fluorenyl))(9-fluorenyl) zirconium dichloride;
dimethylsilylene(9-(1-trimethylsiloxy-methoxy-fluorenyl))(1-(2-methyl-indenyl)) zirconium dichloride;
dimethylsilylene(9-(1-trimethylsiloxy-methoxy-fluorenyl))(1-indenyl) zirconium dichloride;
dimethylsilylene(9-(1-trimethylsiloxy-methoxy-fluorenyl))(9-(2-methyl-fluorenyl)) zirconium dichloride;

dimethylsilylenebis(9-(1-trimethylsiloxy-ethoxy-fluorenyl)) zirconium dichloride;
dimethylsilylene(9-(1-trimethylsiloxy-ethoxy-fluorenyl))(9-fluorenyl) zirconium dichloride;
dimethylsilylene(9-(1-trimethylsiloxy-ethoxy-fluorenyl))(1-(2-methyl-indenyl)) zirconium dichloride;
dimethylsilylene(9-(1-trimethylsiloxy-ethoxy-fluorenyl))(1-indenyl) zirconium dichloride;
dimethylsilylene(9-(1-trimethylsiloxy-ethoxy-fluorenyl))(9-(2-methyl-fluorenyl)) zirconium dichloride;
dimethylsilylenebis(9-(1-trimethylsiloxy-ethyl-(dimethyl)silyl-fluorenyl)) zirconium dichloride;
dimethylsilylene(9-(1-trimethylsiloxy-ethyl-(dimethyl)silyl-fluorenyl))(9-fluorenyl) zirconium dichloride;
dimethylsilylene(9-(1-trimethylsiloxy-ethyl-(dimethyl)silyl-fluorenyl))(1-(2-methyl-indenyl)) zirconium dichloride;
dimethylsilylene(9-(1-trimethylsiloxy-ethyl-(dimethyl)silyl-fluorenyl))(1-indenyl) zirconium dichloride;
dimethylsilylene(9-(1-trimethylsiloxy-ethyl-(dimethyl)silyl-fluorenyl))(9-(2-methyl-fluorenyl)) zirconium dichloride;
isopropylidenebis(9-(1-trimethylsiloxyethyl-fluorenyl)) zirconium dichloride;
isopropylidene(9-(1-trimethylsiloxyethyl-fluorenyl))(9-fluorenyl) zirconium dichloride;
isopropylidene(9-(1-trimethylsiloxyethyl-fluorenyl))(9-(2-methyl-indenyl)) zirconium dichloride;
isopropylidene(9-(1-trimethylsiloxyethyl-fluorenyl))(1-indenyl) zirconium dichloride;
isopropylidene(9-(1-trimethylsiloxyethyl-fluorenyl))(9-(2-methyl-fluorenyl)) zirconium dichloride;
isopropylidenebis(9-(1-trimethylsiloxypropyl-fluorenyl)) zirconium dichloride;
isopropylidene(9-(1-trimethylsiloxypropyl-fluorenyl))(9-fluorenyl) zirconium dichloride;
isopropylidene(9-(1-trimethylsiloxypropyl-fluorenyl))(1-(2-methyl-indenyl)) zirconium dichloride;
isopropylidene(9-(1-trimethylsiloxypropyl-fluorenyl))(1-indenyl) zirconium dichloride;
isopropylidene(9-(1-trimethylsiloxypropyl-fluorenyl))(9-(2-methyl-fluorenyl)) zirconium dichloride;
isopropylidenebis(9-(1-trimethylsiloxy-methoxy-fluorenyl)) zirconium dichloride;
isopropylidene(9-(1-trimethylsiloxy-methoxy-fluorenyl))(9-fluorenyl) zirconium dichloride;
isopropylidene(9-(1-trimethylsiloxy-methoxy-fluorenyl))(1-(2-methyl-indenyl)) zirconium dichloride;
isopropylidene(9-(1-trimethylsiloxy-methoxy-fluorenyl))(1-indenyl) zirconium dichloride;
isopropylidene(9-(1-trimethylsiloxy-methoxy-fluorenyl))(9-(2-methyl-fluorenyl)) zirconium dichloride;
isopropylidenebis(9-(1-trimethylsiloxy-ethoxy-fluorenyl)) zirconium dichloride;
isopropylidene(9-(1-trimethylsiloxy-ethoxy-fluorenyl))(9-fluorenyl) zirconium dichloride;
isopropylidene(9-(1-trimethylsiloxy-ethoxy-fluorenyl))(1-(2-methyl-indenyl)) zirconium dichloride;
isopropylidene(9-(1-trimethylsiloxy-ethoxy-fluorenyl))(1-indenyl) zirconium dichloride;
isopropylidene(9-(1-trimethylsiloxy-ethoxy-fluorenyl))(9-(2-methyl-fluorenyl)) zirconium dichloride;
isopropylidenebis(9-(1-trimethylsiloxy-ethyl-(dimethyl)silyl-fluorenyl)) zirconium dichloride;
isopropylidene(9-(1-trimethylsiloxy-ethyl-(dimethyl)silyl-fluorenyl))(9-fluorenyl) zirconium dichloride;
isopropylidene(9-(1-trimethylsiloxy-ethyl-(dimethyl)silyl-fluorenyl))(1-(2-methyl-indenyl)) zirconium dichloride;
isopropylidene(9-(1-trimethylsiloxy-ethyl-(dimethyl)silyl-fluorenyl))(1-indenyl) zirconium dichloride;
isopropylidene(9-(1-trimethylsiloxy-ethyl-(dimethyl)silyl-fluorenyl))(9-(2-methyl-fluorenyl)) zirconium dichloride;
ethylidenebis(9-(1-trimethylsiloxyethyl-fluorenyl)) zirconium dichloride;
ethylidene(9-(1-trimethylsiloxyethyl-fluorenyl))(9-fluorenyl) zirconium dichloride;
ethylidene(9-(1-trimethylsiloxyethyl-fluorenyl))(1-(2-methyl-indenyl)) zirconium dichloride;
ethylidene(9-(1-trimethylsiloxyethyl-fluorenyl))(1-indenyl) zirconium dichloride;
ethylidene(9-(1-trimethylsiloxyethyl-fluorenyl))(9-(2-methyl-fluorenyl)) zirconium dichloride;
ethylidenebis(9-(1-trimethylsiloxypropyl-fluorenyl)) zirconium dichloride;
ethylidene(9-(1-trimethylsiloxypropyl-fluorenyl))(9-fluorenyl) zirconium dichloride;
ethylidene(9-(1-trimethylsiloxypropyl-fluorenyl))(1-(2-methyl-indenyl)) zirconium dichloride;
ethylidene(9-(1-trimethylsiloxypropyl-fluorenyl))(1-indenyl) zirconium dichloride;
ethylidene(9-(1-trimethylsiloxypropyl-fluorenyl))(9-(2-methyl-fluorenyl)) zirconium dichloride;
ethylidenebis(9-(1-trimethylsiloxy-methoxy-fluorenyl)) zirconium dichloride;
ethylidene(9-(1-trimethylsiloxy-methoxy-fluorenyl))(9-fluorenyl) zirconium dichloride;
ethylidene(9-(1-trimethylsiloxy-methoxy-fluorenyl))(1-(2-methyl-indenyl)) zirconium dichloride;
ethylidene(9-(1-trimethylsiloxy-methoxy-fluorenyl))(1-indenyl) zirconium dichloride;
ethylidene(9-(1-trimethylsiloxy-methoxy-fluorenyl))(9-(2-methyl-fluorenyl)) zirconium dichloride;
ethylidenebis(9-(1-trimethylsiloxy-ethoxy-fluorenyl)) zirconium dichloride;
ethylidene(9-(1-trimethylsiloxy-ethoxy-fluorenyl))(9-fluorenyl) zirconium dichloride;
ethylidene(9-(1-trimethylsiloxy-ethoxy-fluorenyl))(1-(2-methyl-indenyl)) zirconium dichloride;
ethylidene(9-(1-trimethylsiloxy-ethoxy-fluorenyl))(1-indenyl) zirconium dichloride;
ethylidene(9-(1-trimethylsiloxy-ethoxy-fluorenyl))(9-(2-methyl-fluorenyl)) zirconium dichloride;
ethylidenebis(9-(1-trimethylsiloxy-ethyl-(dimethyl)silyl-fluorenyl)) zirconium dichloride;
ethylidene(9-(1-trimethylsiloxy-ethyl-(dimethyl)silyl-fluorenyl))(9-fluorenyl) zirconium dichloride;
ethylidene(9-(1-trimethylsiloxy-ethyl-(dimethyl)silyl-fluorenyl))(1-(2-methyl-indenyl)) zirconium dichloride;
ethylidene(9-(1-trimethylsiloxy-ethyl-(dimethyl)silyl-fluorenyl))(1-indenyl) zirconium dichloride;
ethylidene(9-(1-trimethylsiloxy-ethyl-(dimethyl)silyl-fluorenyl))(9-(2-methyl-fluorenyl)) zirconium dichloride;
trimethylsiloxyethyl(methyl)silandiylbis(cyclopentadienyl) zirconium dichloride;
trimethylsiloxyethyl(methyl)silandiylbis(9-fluorenyl) zirconium dichloride;
trimethylsiloxyethyl(methyl)silandiyl(cyclopentadienyl)(1-indenyl) zirconium dichloride;
trimethylsiloxyethyl(methyl)silandiyl(cyclopentadienyl)(1-(2-methyl-indenyl)) zirconium dichloride;
trimethylsiloxyethyl(methyl)silandiyl(cyclopentadienyl)(9-fluorenyl) zirconium dichloride;

trimethylsiloxyethyl(methyl)silndiyl(cyclopentadienyl)(9-(2-methyl-fluorenyl)) zirconium dichloride;
trimethylsiloxyethyl(methyl)silandiylbis(1-indenyl) zirconium dichloride;
trimethylsiloxyethyl(methyl)silandiyl(cyclopentadienyl)(1-(2-methylbenzoindenyl)) zirconium dichloride;
trimethylsiloxyethyl(methyl)silandiylbis(1-(2-methylbenzoindenyl)) zirconium dichloride;
trimethylsiloxypropyl(methyl)silandiylbis(cyclopentadienyl) zirconium dichloride;
trimethylsiloxypropyl(methyl)silandiylbis(9-fluorenyl) zirconium dichloride;
trimethylsiloxypropyl(methyl)silandiyl(cyclopentadienyl)(1-indenyl) zirconium dichloride;
trimethylsiloxypropyl(methyl)silandiyl(cyclopentadienyl)(1-(2-methyl-indenyl)) zirconium dichloride;
trimethylsiloxypropyl(methyl)silandiyl(cyclopentadienyl)(9-fluorenyl) zirconium dichloride;
trimethylsiloxypropyl(methyl)silandiyl(cyclopentadienyl)(9-(2-methyl-fluorenyl)) zirconium dichloride;
trimethylsiloxypropyl(methyl)silandiylbis(1-indenyl) zirconium dichloride;
trimethylsiloxypropyl(methyl)silandiyl(cyclopentadienyl)(1-(2-methylbenzoindenyl)) zirconium dichloride;
trimethylsiloxy-methoxy(methyl)silandiylbis(cyclopentadienyl) zirconium dichloride;
trimethylsiloxy-methoxy(methyl)silandiyl(cyclopentadienyl)(1-indenyl) zirconium dichloride;
trimethylsiloxy-methoxy(methyl)silandiyl(cyclopentadienyl)(1-(2-methyl-indenyl)) zirconium dichloride;
trimethylsiloxy-methoxy(methyl)silandiyl(cyclopentadienyl)(9-fluorenyl) zirconium dichloride;
trimethylsiloxy-methoxy(methyl)silandiyl(cyclopentadienyl)(9-(2-methyl-fluorenyl)) zirconium dichloride;
trimethylsiloxy-ethoxy(methyl)silandiylbis(cyclopentadienyl) zirconium dichloride;
trimethylsiloxy-ethoxy(methyl)silandiyl(cyclopentadienyl)(1-indenyl) zirconium dichloride;
trimethylsiloxy-ethoxy(methyl)silandiyl(cyclopentadienyl)(1-(2-methyl-indenyl)) zirconium dichloride;
trimethylsiloxy-ethoxy(methyl)silandiyl(cyclopentadienyl)(9-fluorenyl) zirconium dichloride;
trimethylsiloxy-ethoxy(methyl)silandiyl(cyclopentadienyl)(9-(2-methyl-fluorenyl)) zirconium dichloride;
trimethylsiloxy-ethyl-(dimethyl)silyl-(methyl)silandiylbis(cyclopentadienyl) zirconium dichloride;
trimethylsiloxy-ethyl-(dimethyl)silyl-(methyl)silandiyl(cyclopentadienyl)(1-indenyl) zirconium dichloride;
trimethylsiloxy-ethyl-(dimethyl)silyl-(methyl)silandiyl(cyclopentadienyl)(1-(2-methyl-indenyl)) zirconium dichloride;
trimethylsiloxy-ethyl-(dimethyl)silyl-(methyl)silandiyl(cyclopentadienyl)(9-fluorenyl) zirconium dichloride;
trimethylsiloxy-ethyl-(dimethyl)silyl-(methyl)silandiyl(cyclopentadienyl)(9-(2-methyl-fluorenyl)) zirconium dichloride;
trimethylsiloxy-methoxy(methyl)methylidenebis(cyclopentadienyl) zirconium dichloride;
trimethylsiloxy-methoxy(methyl)methylidene(cyclopentadienyl)(1-indenyl) zirconium dichloride;
trimethylsiloxy-methoxy(methyl)methylidene(cyclopentadienyl)(1-(2-methyl-indenyl)) zirconium dichloride;
trimethylsiloxy-methoxy(methyl)methylidene(cyclopentadienyl)(9-fluorenyl) zirconium dichloride;
trimethylsiloxy-methoxy(methyl)methylidenecyclopentadienyl)(9-(2-methyl-fluorenyl)) zirconium dichloride;
trimethylsiloxy-ethoxy-(methyl)methylidenebis(cyclopentadienyl) zirconium dichloride;
trimethylsiloxy-ethoxy-(methyl)methylidene(cyclopentadienyl)(1-indenyl) zirconium dichloride;
trimethylsiloxy-ethoxy-(methyl)methylidene(cyclopentadienyl)(1-(2-methyl-indenyl)) zirconium dichloride;
trimethylsiloxy-ethoxy-(methyl)methylidene(cyclopentadienyl)(9-fluorenyl) zirconium dichloride;
trimethylsiloxy-ethoxy-(methyl)methylidene(cyclopentadienyl)(9-(2-methyl-fluorenyl)) zirconium dichloride;
trimethylsiloxy-ethyl-(dimethyl)silyl-(methyl)methylidenebis(cyclopentadienyl) zirconium dichloride;
trimethylsiloxy-ethyl-(dimethyl)silyl-(methyl)methylidene(cyclopentadienyl)(1-indenyl) zirconium dichloride;
trimethylsiloxy-ethyl-(dimethyl)silyl-(methyl)methylidene(cyclopentadienyl)(1-(2-methyl-indenyl)) zirconium dichloride;
trimethylsiloxy-ethyl-(dimethyl)silyl-(methyl)methylidene(cyclopentadienyl)(9-fluorenyl) zirconium dichloride;
trimethylsiloxy-ethyl-(dimethyl)silyl-(methyl)methylidene(cyclopentadienyl)(9-(2-methyl-fluorenyl)) zirconium dichloride;
trimethylsiloxy-ethyl-(dimethyl)silyl-(methyl)methylidenebis(1-indenyl) zirconium dichloride;
1-trimethylsiloxyethyl-ethylidenebis(cyclopentadienyl) zirconium dichloride;
1-trimethylsiloxyethyl-ethylidene-1-(cyclopentadienyl)-2-(1-indenyl) zirconium dichloride;
1-trimethylsiloxyethyl-ethylidene-1-(cyclopentadienyl)-2-(1-(2-methyl-indenyl)) zirconium dichloride;
1-trimethylsiloxyethyl-ethylidene-1-(cyclopentadienyl)-2-(9-fluorenyl) zirconium dichloride;
1-trimethylsiloxyethyl-ethylidene-1-(cyclopentadienyl)-2-(9-(2-methyl-fluorenyl)) zirconium dichloride;
1-trimethylsiloxyethyl-ethylidenebis(1-indenyl) zirconium dichloride;
1-trimethylsiloxypropyl-ethylidenebis(cyclopentadienyl) zirconium dichloride;
1-trimethylsiloxypropyl-ethylidene-1-(cyclopentadienyl)-2-(1-indenyl) zirconium dichloride;
1-trimethylsiloxypropyl-ethylidene-1-(cyclopentadienyl)-2-(1-(2-methyl-indenyl)) zirconium dichloride;
1-trimethylsiloxypropyl-ethylidene-1-(cyclopentadienyl)-2-(9-fluorenyl) zirconium dichloride;
1-trimethylsiloxypropyl-ethylidene-1-(cyclopentadienyl)-2-(9-(2-methyl-fluorenyl)) zirconium dichloride;
1-trimethylsiloxypropyl-ethylidenebis(1-indenyl) zirconium dichloride;
1-trimethylsiloxy-methoxy-ethylidenebis(cyclopentadienyl) zirconium dichloride;
1-trimethylsiloxy-methoxy-ethylidene-1-(cyclopentadienyl)-2-(-indenyl) zirconium dichloride;
1-trimethylsiloxy-methoxy-ethylidene-1-(cyclopentadienyl)-2-(1-(2-methyl-indenyl)) zirconium dichloride;
1-trimethylsiloxy-methoxy-ethylidene-1-(cyclopentadienyl)-2-(9-fluorenyl) zirconium dichloride;
1-trimethylsiloxy-methoxy-ethylidene-1-(cyclopentadienyl)-2-(9-(2-methyl-fluorenyl)) zirconium dichloride;
1-trimethylsiloxy-ethoxy-ethylidenebis(cyclopentadienyl) zirconium dichloride;
1-trimethylsiloxy-ethoxy-ethylidene-1-(cyclopentadienyl)-2-(1-indenyl) zirconium dichloride;
1-trimethylsiloxy-ethoxy-ethylidene-1-(cyclopentadienyl)-2-(1-(2-methyl-indenyl)) zirconium dichloride;
1-trimethylsiloxy-ethoxy-ethylidene-1-(cyclopentadienyl)-2-(9-fluorenyl) zirconium dichloride;

1-trimethylsiloxy-ethoxy-ethylidene-1-(cyclopentadienyl)-2-(9-(2-methyl-fluorenyl)) zirconium dichloride;
1-trimethylsiloxy-ethyl-(dimethyl)silylethylenebis(cyclopentadienyl) zirconium dichloride;
1-trimethylsiloxy-ethyl-(dimethyl)silylethylidene-1-(cyclopentadienyl)-2-(1-indenyl) zirconium dichloride;
1-trimethylsiloxy-ethyl-(dimethyl)silylethylidene-1-(cyclopentadienyl)-2-(1-(2-methyl-indenyl)) zirconium dichloride
1-trimethylsiloxy-ethyl-(dimethyl)silylethylidene-1-(cyclopentadienyl)-2-(9-fluorenyl) zirconium dichloride;
1-trimethylsiloxy-ethyl-(dimethyl)silylethylidene-1-(cyclopentadienyl)-2-(9-(2-methyl-fluorenyl)) zirconium dichloride;
trimethylsiloxyethyl(methyl)silandiyl-(tertbutylamido)(cylopentadienyl) titanium dichloride;
trimethylsiloxyethyl(methyl)silandiyl-(tertbutylamido)(tetramethylcylopentadienyl) titanium dichloride;
trimethylsiloxyethyl(methyl)silandiyl-(tertbutylamido)(1-indenyl) titanium dichloride;
trimethylsiloxyethyl(methyl)silandiyl-(tertbutylamido)(1-(2-methyl-indenyl)) titanium dichloride;
trimethylsiloxyethyl(methyl)silandiyl-(tertbutylamido)(9-fluorenyl) titanium dichloride;
trimethylsiloxyethyl(methyl)silandiyl-(tertbutylamido)(9-(2-methyl-fluorenyl)) titanium dichloride;
trimethylsiloxyethyl(methyl)silandiyl-(tertbutylamido)(1-(2-methylbenzoindenyl) titanium dichloride;
(dimethyl)silandiyl-(tertbutylamido)(3-trimethylopetadenyl) titanium dichloride;
(dimethyl)silandiyl-(tertbutylamido)(1-(3-trimethylsiloxyethylindenyl) titanium dichloride;
(dimethyl)silandiyl-(2-trimethylsiloxyethylamido)(cylopentadienyl) titanium dichloride;
(dimethyl)silandiyl-(2-trimethylsiloxyethylamido)(tetramethylcylopentadienyl) titanium dichloride;
(dimethyl)silandiyl-(2-trimethylsiloxyethylamido)(1-indenyl) titanium dichloride;
(dimethyl)silandiyl-(2-trimethylsiloxyethylamido)(9-fluorenyl) titanium dichloride;
(dimethyl)silandiyl-(2-trimethylsiloxyethylamido)(1-(2-methylbenzoindenyl) titanium dichloride;
trimethylsiloxypropyl(methyl)silandiyl(tertbutylamido)-(cylopentadienyl) titanium dichloride;
trimethylsiloxypropyl(methyl)silandiyl-(tertbutylamido)(tetramethylcyclopentadienyl) titanium dichloride;
trimethylsiloxypropyl(methyl)silandiyl-(tertbutylamido)(1-indenyl) titanium dichloride;
trimethylsiloxypropyl(methyl)silandiyl-(tertbutylamido)(1-(2-methyl-indenyl)) titanium dichloride;
trimethylsiloxypropyl(methyl)silandiyl-(tertbutylamido)(9-fluorenyl) titanium dichloride;
trimethylsiloxypropyl(methyl)silandiyl-(tertbutylamido)(9-(2-methyl-fluorenyl)) titanium dichloride;
trimethylsiloxypropyl(methyl)silandiyl(tertbutylamido)-(1-(2-methylbenzoindenyl) titanium dichloride;
(dimethyl)silandiyl-(tertbutylamido)(3-(trimethylsiloxypropylcyclopentadienyl) titanium dichloride;
(dimethyl)silandiyl-(tertbutylamido)(1-(3-trimethylsiloxypropylindenyl) titanium dichloride;
(dimethyl)silandiyl-(3-trimethylsiloxypropylamido)(cylopentadienyl) titanium dichloride;
(dimethyl)silandiyl-(3-trimethylsiloxypropylamido)(tetramethylcyclopentadienyl) titanium dichloride;
(dimethyl)silandiyl-(3-trimethylsiloxypropylamido)(1-indenyl) titanium dichloride;
(dimethyl)silandiyl-(3-trimethylsiloxypropylamido)(9-fluorenyl) titanium dichloride;
(dimethyl)silandiyl-(3-trimethylsiloxypropylamido)(1-(2-methylbenzoindenyl) titanium dichloride;
trimethylsiloxy-methoxy(methyl)silandiyl-(tertbutylamido)(cylopentadienyl) titanium dichloride;
trimethylsiloxy-methoxy(methyl)silandiyl-(tertbutylamido)(tetramethylcyclopentadienyl) titanium dichloride;
trimethylsiloxy-methoxy(methyl)silandiyl-(tertbutylamido)(1-indenyl) titanium dichloride;
trimethylsiloxy-methoxy(methyl)silandiyl-(tertbutylamido)(1-(2-methyl-indenyl)) titanium dichloride;
trimethylsiloxy-methoxy(methyl)silandiyl-(tertbutylamido)(9-fluorenyl) titanium dichloride;
trimethylsiloxy-methoxy(methyl)silandiyl-(tertbutylamido)(9-(2-methyl-fluorenyl)) titanium dichloride;
trimethylsiloxy-ethoxy(methyl)silandiyl-(tertbutylamido)(cylopentadienyl) titanium dichloride;
trimethylsiloxy-ethoxy(methyl)silandiyl-(tertbutylamido)(tetramethylcyclopentadienyl) titanium dichloride;
trimethylsiloxy-ethoxy(methyl)silandiyl-(tertbutylamido)(1-indenyl) titanium dichloride;
trimethylsiloxy-ethoxy(methyl)silandiyl-(tertbutylamido)(1-(2-methyl-indenyl)) titanium dichloride;
trimethylsiloxy-ethoxy(methyl)silandiyl-(tertbutylamido)(9-fluorenyl) titanium dichloride;
trimethylsiloxy-ethoxy(methyl)silandiyl-(tertbutylamido)(9-(2-methyl-fluorenyl)) titanium dichloride;
trimethylsiloxy-ethyl-(dimethyl)silyl-(methyl)silandiyl(tertbutylamido)-(cylopentadienyl) titanium dichloride;
trimethylsiloxy-ethyl-(dimethyl)silyl-(methyl)silandiyl-(tertbutylamido)(tetramethylcyclopentadienyl) titanium dichloride;
trimethylsiloxy-ethyl-(dimethyl)silyl-(methyl)silandiyl-(tertbutylamido)(1-indenyl) titanium dichloride;
trimethylsiloxy-ethyl-(dimethyl)silyl-(methyl)silandiyl-(tertbutylamido)(1-(2-methyl-indenyl)) titanium dichloride;
trimethylsiloxy-ethyl-(dimethyl)silyl-(methyl)silandiyl-(tertbutylamido)(9-fluorenyl) titanium dichloride;
trimethylsiloxy-ethyl-(dimethyl)silyl-(methyl)silandiyl-(tertbutylamido)(9-(2-methyl-fluorenyl)) titanium dichloride;
trimethylsiloxyethyl-(methyl)methylene(tertbutylamido)(cylopentadienyl) titanium dichloride;
trimethylsiloxyethyl-(methyl)methylene(tertbutylamido)(tetramethylcyclopentadienyl) titanium dichloride;
trimethylsiloxyethyl-(methyl)methylene(tertbutylamido)(1-indenyl) titanium dichloride;
trimethylsiloxyethyl-(methyl)methylene(tertbutylamido)(1-(2-methyl-indenyl)) titanium dichloride;
trimethylsiloxyethyl-(methyl)methylene(tertbutylamido)(9-fluorenyl) titanium dichloride;
trimethylsiloxyethyl-(methyl)methylene(tertbutylamido)(9-(2-methyl-fluorenyl)) titanium dichloride;
trimethylsiloxypropyl-(methyl)methylene(tertbutylamido)(cylopentadienyl) titanium dichloride;
trimethylsiloxypropyl-(methyl)methylene(tertbutylamido)(tetramethylcyclopentadienyl) titanium dichloride;
trimethylsiloxypropyl-(methyl)methylene(tertbutylamido)(indenyl) titanium dichloride;
trimethylsiloxypropyl-(methyl)methylene(tertbutylamido)(2-methyl-indenyl) titanium dichloride;
trimethylsiloxypropyl-(methyl)methylene(tertbutylamido)(9-fluorenyl) titanium dichloride;
trimethylsiloxypropyl-(methyl)methylene(tertbutylamido)(2-methyl-fluorenyl) titanium dichloride;
trimethylsiloxy-methoxy(methyl)methylene(tertbutylamido)(cylopentadienyl) titanium dichloride;

trimethylsiloxy-methoxy(methyl)methylene(tertbutylamido)(tetramethylcyclopentadienyl) titanium dichloride;
trimethylsiloxy-methoxy(methyl)methylene(tertbutylamido)(1-indenyl) titanium dichloride;
trimethylsiloxy-methoxy(methyl)methylen(-tertbutylamido)(1-(2-methyl-indenyl)) titanium dichloride;
trimethylsiloxy-methoxy(methyl)methylen(-tertbutylamido)(9-fluorenyl) titanium dichloride;
trimethylsiloxy-methoxy(methyl)methylen(-tertbutylamido)(9-(2-methyl-fluorenyl)) titanium dichloride;
trimethylsiloxy-ethoxy-(methyl)methylene(tertbutylamido)(cylopentadienyl) titanium dichloride;
trimethylsiloxy-ethoxy-(methyl)methylene(tertbutylamido)(tetramethylcyclopentadienyl) titanium dichloride;
trimethylsiloxy-ethoxy-(methyl)methylen(tertbutylamido)(1-indenyl) titanium dichloride;
trimethylsiloxy-ethoxy-(methyl)methylen(tertbutylamido)(1-(2-methyl-indenyl)) titanium dichloride;
trimethylsiloxy-ethoxy-(methyl)methylen(tertbutylamido)(9-fluorenyl) titanium dichloride;
trimethylsiloxy-ethoxy-(methyl)methylen(tertbutylamido)(9-(2-methyl-fluorenyl)) titanium dichloride;
trimethylsiloxy-ethyl-(dimethyl)silyl-(methyl)methylene(tertbutylamido)(cylopentadienyl) titanium dichloride;
trimethylsiloxy-ethyl-(dimethyl)silyl(methyl)methylene(tertbutylamido) (tetramethylcyclopentadienyl) titanium dichloride;
trimethylsiloxy-ethyl-(dimethyl)silyl-(methyl)methilene(tertbutylamido)(1-indenyl) titanium dichloride;
trimethylsiloxy-ethyl-(dimethyl)silyl-(methyl)methilene(tertbutylamido)(1-(2-methyl-indenyl)) titanium dichloride;
trimethylsiloxy-ethyl-(dimethyl)silyl-(methyl)methilene(tertbutylamido)(9-fluorenyl) titanium dichloride;
trimethylsiloxy-ethyl-(dimethyl)silyl-(methyl)methylene(tertbutylamido)(9-(2-methyl-fluorenyl)) titanium dichloride;
trimethylsiloxyethyl(methyl)silandiyl-(tertbutylamido)(cylopentadienyl) zirconium dichloride;
trimethylsiloxyethyl(methyl)silandiyl-(tertbutylamido)(tetramethylcyclopentadienyl) zirconium dichloride;
trimethylsiloxyethyl(methyl)silandiyl-(tertbutylamido)(1-indenyl) zirconium dichloride;
trimethylsiloxyethyl(methyl)silandiyl-(tertbutylamido)(1-(2-methyl-indenyl)) zirconium dichloride;
trimethylsiloxyethyl(methyl)silandiyl-(tertbutylamido)(9-fluorenyl) zirconium dichloride;
trimethylsiloxyethyl(methyl)silandiyl-(tertbutylamido)(9-(2-methyl-fluorenyl)) zirconium dichloride;
trimethylsiloxyethyl(methyl)silandiyl-(tertbutylamido)(1-(2-methylbenzoindenyl) zirconium dichloride;
(dimethyl)silandiyl-(tertbutylamido)(3-(trimethylsiloxyethylcyclopentadienyl) zirconium dichloride;
(dimethyl)silandiyl-(tertbutylamido)(1-(3-trimethylsiloxyethylindenyl) zirconium dichloride;
(dimethyl)silandiyl-(2-trimethylsiloxyethylamido)(cylopentadienyl) zirconium dichloride;
(dimethyl)silandiyl-(2-trimethylsiloxyethylamido)(tetramethylcyclopentadienyl) zirconium dichloride;
(dimethyl)silandiyl-(2-trimethylsiloxyethylamido)(1-indenyl) zirconium dichloride;
(dimethyl)silandiyl-(2-trimethylsiloxyethylamido)(9-fluorenyl) zirconium dichloride;
(dimethyl)silandiyl-(2-trimethylsiloxyethylamido)(1-(2-methylbenzoindenyl) zirconium dichloride;
trimethylsiloxypropyl(methyl)silandiyl(tertbutylamido)-(cylopentadienyl) zirconium dichloride;
trimethylsiloxypropyl(methyl)silandiyl-(tertbutylamido)(tetramethylcyclopentadienyl) zirconium dichloride;
trimethylsiloxypropyl(methyl)silandiyl-(tertbutylamido)(1-indenyl) zirconium dichloride;
trimethylsiloxypropyl(methyl)silandiyl-(tertbutylamido)(1-(2-methyl-indenyl)) zirconium dichloride;
trimethylsiloxypropyl(methyl)silandiyl-(tertbutylamido)(9-fluorenyl) zirconium dichloride;
trimethylsiloxypropyl(methyl)silandiyl-(tertbutylamido)(9-(2-methyl-fluorenyl)) zirconium dichloride;
trimethylsiloxypropyl(methyl)silandiyl(tertbutylamido)-(1-(2-methylbenzoindenyl) zirconium dichloride;
(dimethyl)silandiyl-(tertbutylamido)(3-(trimethylsioxypropylcyclopentadienyl) zirconium dichloride;
(dimethyl)silandiyl-(tertbutylamido)(1-(3-trimethylsiloxypropylindenyl) zirconium dichloride;
(dimethyl)silandiyl-(3-trimethylsiloxypropylamido)(cylopentadienyl) zirconium dichloride;
(dimethyl)silandiyl-(3-trimethylsiloxypropylamido)(tetramethylcylopentadienyl) zirconium dichloride;
(dimethyl)silandiyl-(3-trimethylsiloxypropylamido)(1-indenyl) zirconium dichloride;
(dimethyl)silandiyl-(3-trimethylsiloxypropylamido)(9-fluorenyl) zirconium dichloride;
(dimethyl)silandiyl-(3-trimethylsiloxypropylamido)(1-(2-methylbenzoindenyl) zirconium dichloride;
trimethylsiloxy-methoxy(methyl)silandiyl-(tertbutylamido)(cylopentadienyl) zirconium dichloride;
trimethylsiloxy-methoxy(methyl)silandiyl-(tertbutylamido)(tetramethylcyclopentadienyl) zirconium dichloride;
trimethylsiloxy-methoxy(methyl)silandiyl-(tertbutylamido)(1-indenyl) zirconium dichloride;
trimethylsiloxy-methoxy(methyl)silandiyl-(tertbutylamido)(1-(2-methyl-indenyl)) zirconium dichloride;
trimethylsiloxy-methoxy(methyl)silandiyl-(tertbutylamido)(9-fluorenyl) zirconium dichlonide;
trimethylsiloxy-methoxy(methyl)silandiyl-(tertbutylamido)(9-(2-methyl-fluorenyl)) zirconium dichloride;
trimethylsiloxy-ethoxy(methyl)silandiyl-(tertbutylamido)(cylopentadienyl) zirconium dichloride;
trimethylsiloxy-ethoxy(methyl)silandiyl-(tertbutylamido)(tetramethylcyclopentadienyl) zirconium dichloride;
trimethylsiloxy-ethoxy(methyl)silandiyl-(tertbutylamido)(1-indenyl) zirconium dichloride;
trimethylsiloxy-ethoxy(methyl)silandiyl-(tertbutylamido)(1-(2-methyl-indenyl)) zirconium dichloride;
trimethylsiloxy-ethoxy(methyl)silandiyl-(tertbutylamido)(9-fluorenyl) zirconium dichloride;
trimethylsiloxy-ethoxy(methyl)silandiyl-(tertbutylamido)(9-(2-methyl-fluorenyl)) zirconium dichloride;
trimethylsiloxy-ethyl-(dimethyl)silyl-(methyl)silandiyl(tertbutylamido)-(cylopentadienyl) zirconium dichloride;
trimethylsiloxy-ethyl-(dimethyl)silyl-(methyl)silandiyl-(tertbutylamido)(tetramethylcyclopentadienyl) zirconium dichloride;
trimethylsiloxy-ethyl-(dimethyl)silyl-(methyl)silandiyl-(tertbutylamido)(1-indenyl) zirconium dichloride;
trimethylsiloxy-ethyl-(dimethyl)silyl-(methyl)silandiyl-(tertbutylamido)(1-(2-methyl-indenyl)) zirconium dichloride;
trimethylsiloxy-ethyl-(dimethyl)silyl-(methyl)silandiyl-(tertbutylamido)(9-fluorenyl) zirconium dichloride;
trimethylsiloxy-ethyl-(dimethyl)silyl-(methyl)silandiyl-(tertbutylamido)(9-(2-methyl-fluorenyl)) zirconium dichloride;
trimethylsiloxyethyl-(methyl)methylene(tertbutylamido)(cylopentadienyl) zirconium dichloride;

trimethylsiloxyethyl-(methyl)methylene(tertbutylamido)
(tetramethylcyclopentadienyl) zirconium dichloride;
trimethylsiloxyethyl-(methyl)methylene(tertbutylamido)(1-
indenyl) zirconium dichloride;
trimethylsiloxyethyl-(methyl)methylene(tertbutylamido)(1-
(2-methyl-indenyl)) zirconium dichloride;
trimethylsiloxyethyl-(methyl)methylene(tertbutylamido)(9-
fluorenyl) zirconium dichloride;
trimethylsiloxyethyl-(methyl)methylene(tertbutylamido)(9-
(2-methyl-fluorenyl)) zirconium dichloride;
trimethylsiloxypropyl-(methyl)methylene(tertbutylamido)
(cylopentadienyl) zirconium dichloride;
trimethylsiloxypropyl-(methyl)methylene(tertbutylamido)
(tetramethylcyclopentadienyl) zirconium dichloride;
trimethylsiloxypropyl-(methyl)methylene(tertbutylamido)
(indenyl) zirconium dichloride;
trimethylsiloxypropyl-(methyl)methylene(tertbutylamido)
(2-methyl-indenyl) zirconium dichloride;
trimethylsiloxypropyl-(methyl)methylene(tertbutylamido)
(9-fluorenyl) zirconium dichloride;
trimethylsiloxypropyl-(methyl)methylene(tertbutylamido)
(2-methyl-fluorenyl) zirconium dichloride;
trimethylsiloxy-methoxymmethyl)methylene(tertbutyla-
mido)(cylopentadienyl) zirconium dichloride;
trimethylsiloxy-methoxy(methyl)methylene(tertbutyla-
mido)(tetramethylcyclopentadienyl) zirconium dichloride;
trimethylsiloxy-methoxy(methyl)methylen(tertbutylamido)
(1-indenyl) zirconium dichloride;
trimethylsiloxy-methoxy(methyl)methylen(-tertbutylamido)
(1-(2-methyl-indenyl)) zirconium dichloride;
trimethylsiloxy-methoxy(methyl)methylen(-tertbutylamido)
(9-fluorenyl) zirconium dichloride;
trimethylsiloxy-methoxy(methyl)methylen(-tertbutylamido)
(9-(2-methyl-fluorenyl)) zirconium dichloride;
trimethylsiloxy-ethoxy-(methyl)methylene(tertbutylamido)
(cylopentadienyl) zirconium dichloride;
trimethylsiloxy-ethoxy-(methyl)methylene(tertbutylamido)
(tetramethylcyclopentadienyl) zirconium dichloride;
trimethylsiloxy-ethoxy-(methyl)methylen(tertbutylamido)
(1-indenyl) zirconium dichloride;
trimethylsiloxy-ethoxy-(methyl)methylen(tertbutylamido)
(1-(2-methyl-indenyl)) zirconium dichloride;
trimethylsiloxy-ethoxy-(methyl)methylen(tertbutylamido)
(9-fluorenyl) zirconium dichloride;
trimethylsiloxy-ethoxy-(methyl)methylen(tertbutylamido)
(9-(2-methyl-fluorenyl)) zirconium dichloride;
trimethylsiloxy-ethyl-(dimethyl)silyl-(methyl)methylene
(tertbutylamido)(cylopentadienyl) zirconium dichloride;
trimethylsiloxy-ethyl-(dimethyl)silyl(methyl)methylene
(tertbutylamido)(tetramethylcyclopentadienyl) zirconium
dichloride;
trimethylsiloxy-ethyl-(dimethyl)silyl-(methyl)methilene
(tertbutylamido)(1-indenyl) zirconium dichloride;
trimethylsiloxy-ethyl-(dimethyl)silyl-(methyl)methilene
(tertbutylamido)(1-(2-methyl-indenyl)) zirconium dichloride;
trimethylsiloxy-ethyl-(dimethyl)silyl-(methyl)methilene
(tertbutylamido)(9-fluorenyl) zirconium dichloride;
trimethylsiloxy-ethyl-(dimethyl)silyl-(methyl)methilene
(tertbutylamido)(9-(2-methyl-fluorenyl)) zirconium
dichloride;
trimethylsiloxyethyl(methyl)silandiyl-oxo(cylopentadienyl)
titanium dichloride;
trimethylsiloxyethyl(methyl)silandiyl-oxo-(tetramethylcy-
clopentadienyl) titanium dichloride;
trimethylsiloxyethyl(methyl)silandiyl-oxo(1-indenyl) titanium dichloride;
trimethylsiloxyethyl(methyl)silandiyl-oxo(1-(2-methyl-indenyl)) titanium dichloride;
trimethylsiloxyethyl(methyl)silandiyl-oxo(9-fluorenyl) titanium dichloride;
trimethylsiloxyethyl(methyl)silandiyl-oxo(9-(2-methyl-fluorenyl)) titanium dichloride;
trimethylsiloxypropyl(methyl)silandiyl-oxo(cylopentadienyl) titanium dichloride;
trimethylsiloxypropyl(methyl)silandiyl-oxo(tetramethylcyclopentadienyl) titanium dichloride;
trimethylsiloxypropyl(methyl)silandiyl-oxo(1-indenyl) titanium dichloride;
trimethylsiloxypropyl(methyl)silandiyl-oxo(1-(2-methyl-indenyl)) titanium dichloride;
trimethylsiloxypropyl(methyl)silandiyl-oxo(9-fluorenyl) titanium dichloride;
trimethylsiloxypropyl(methyl)silandiyl-oxo(9-(2-methyl-fluorenyl)) titanium dichloride;
trimethylsiloxy-methoxy(methyl)silandiyl-oxo(cylopentadienyl) titanium dichloride;
trimethylsiloxy-methoxy(methyl)silandiyl-oxo(tetramethyl-cyclopentadienyl) titanium dichloride;
trimethylsiloxy-methoxy(methyl)silandiyl-oxo(1-indenyl) titanium dichloride;
trimethylsiloxy-methoxy(methyl)silandiyl-oxo(1-(2-methyl-indenyl)) titanium dichloride;
trimethylsiloxy-methoxy(methyl)silandiyl-oxo(9-fluorenyl) titanium dichloride;
trimethylsiloxy-methoxy(methyl)silandiyl-oxo(9-(2-methyl-fluorenyl)) titanium dichloride;
trimethylsiloxy-ethoxy(methyl)silandiyl-oxo(cylopentadienyl) titanium dichloride;
trimethylsiloxy-ethoxy(methyl)silandiyl-oxo(tetramethylcyclopentadienyl) titanium dichloride;
trimethylsiloxy-ethoxy(methyl)silandiyl-oxo(1-indenyl) titanium dichloride;
trimethylsiloxy-ethoxy(methyl)silandiyl-oxo(1-(2-methyl-indenyl)) titanium dichloride;
trimethylsiloxy-ethoxy(methyl)silandiyl-oxo(9-fluorenyl) titanium dichloride;
trimethylsiloxy-ethoxy(methyl)silandiyl-oxo(9-(2-methyl-fluorenyl)) titanium dichloride;
trimethylsiloxy-ethyl-(dimethyl)silyl-(methyl)silandiyl-oxo
(cylopentadienyl) titanium dichloride;
trimethylsiloxy-ethyl-(dimethyl)silyl-(methyl)silandiyl-oxo
(tetramethylcyclopentadienyl) titanium dichloride;
trimethylsiloxy-ethyl-(dimethyl)silyl-(methyl)silandiyl-oxo
(1-indenyl) titanium dichloride;
trimethylsiloxy-ethyl-(dimethyl)silyl-(methyl)silandiyl-oxo
(1-(2-methyl-indenyl)) titanium dichloride;
trimethylsiloxy-ethyl-(dimethyl)silyl-(methyl)silandiyl-oxo
(fluorenyl) titanium dichloride;
trimethylsiloxy-ethyl-(dimethyl)silyl-(methyl)silandiyl-oxo
(9-methylfluorenyl) titanium dichloride;

The metallocene compounds according to the invention can be prepared according to the methods disclosed in EP 839836 which is herewith enclosed by reference.

Supports useful in the preparation of the heterogeneous catalyst of the invention are inorganic oxides, such as: silica, alumina, silica alumina, aluminium phosphates and mixtures thereof, which result in supported catalysts with contents in transition metal between 0.01 and 3% by weight, preferably between 0.1 and 1%.

The inorganic oxide, before treatment with the metallocene, is treated in such a way that it has deposited on its surface an alumoxane. Alumoxanes suitable for the preparation of the support are those represented by the formulas:

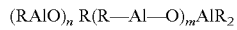

wherein R is alkyl or aryl group containing from 1 to 20 carbon atoms; n ranges from 1 to 40, preferably from 5 to 20 and m ranges from 3 to 40 preferably from 3 to 20.

Generally, in the preparation of alumoxane from, for example, aluminum trimethyl and water, a mixture of linear and cyclic compounds are obtained. The alumoxane can be prepared in a variety of ways. For example, they are prepared by contacting water with a solution of aluminum trialkyl, such as, for example aluminum trimethyl, in a suitable organic solvent such as benzene or an aliphatic hydrocarbon.

The treatment of the inorganic porous support can be done according to any method known in the art. For example the alumoxane can be deposited onto the surface of the inorganic support by dissolving the alumoxane into a suitable solvent and adding the inorganic support into the solution, or it can be deposited onto the surface of the porous support by precipitation in the presence of the support.

It is also possible to form the alumoxane directly on the surface of the porous support by reacting an aluminum alkyl with the hydration water present onto the support surface.

A method that can be fit for preparing supported catalysts according to this invention consists in the impregnation, under anhydrous conditions and inert atmosphere, of the solution of any metallocene of formula I, II or III, or a mixture thereof, on the treated supporting material at a proper temperature, preferably between −20° C. and 90° C. The supported catalyst that contains the metallocene can be obtained through filtration and washing with a proper solvent, preferably an aliphatic or aromatic hydrocarbon without polar groups.

Another method that can properly be used consists in depositing the metallocene on the treated support by using a solution of the compound that has to be heterogenized, eliminating the solvent through evaporation and then warming the solid residue at a temperature between 25 and 150° C. Besides, the resulting residue, obtained by this process, can be subjected to washing and subsequent filtration.

The supported catalyst does not require addition of alumoxane or ionizing compound to the reactor, but only a certain amount of aluminium trialkyl. This fact constitutes a further clear advantage in view of most polymerization process which require large amounts of aluminoxane.

The most proper polymerization procedure can change according to the chosen type of polymerization process (suspension, gas phase, solution or in bulk).

For the polymerization in suspension, the cocatalyst can previously be mixed with the supported solid catalyst, can be added to the polymerization medium before the supported catalyst, or both operations can be sequentially realized.

The process consists in putting in contact the monomer, or, in certain cases, the monomer and the comonomer, with a catalytic composition according to the present invention, that includes at least one supported metallocene complex of formula I, II or III, at a proper temperature and pressure.

Examples of olefins that can be polymerized are ethylene, propylene, 1-butene, 1-hexene, 1-octene, 4-methyl-1-pentene and cyclic olefins.

Suitable olefins that can be used as comonomers to obtain ethylene copolymers are alfa-olefins such as propylene, butene, hexene, octene, 4-methyl-1-pentene and cyclic olefins and can be used in proportions from 0,1 to 70% by weight of the total of the monomers. In the case of homopolymerization of ethylene, the density of polymers ranges between 0,950 and 0,965 g/cm$^3$; in the case of copolymerization of ethylene, the density is as low as 0,900 g/cm$^3$.

To control the molecular weight of the obtained polymers, hydrogen can optionally be used as a chain transfer agent in such proportions that the hydrogen partial pressure, with respect to the olefin one, be from 0,01 to 50%.

In the particular case of the polymerization technique known as suspension process or controlled particle morphology process, the used temperature will be between 30° and 100° C., the same which is typically used in gas phase.

The used pressure changes according to the polymerization technique; it ranges from atmospheric pressure to 350 MPa.

It has been surprisingly found that the presence of the group —OSiR$^{II}_3$ is essential in order to obtain excellent results in term of catalyst activity. If a group Si—Cl is present on the metallocene instead of the group R$^I$OSiR$^{II}_3$, the result is clearly inferior. Although it is not yet possible to describe exactly the interaction taking place between alumoxane and trialkylsililoxy group, it seems very clear that it results in a catalyst presenting unique balance between activity of the catalyst and morphology of the obtained polymer, even better than the results disclosed in patent EP 839836.

The activity of the catalyst according to the invention has been measured in homogeneous catalysis and onto silica impregnated with MAO. The same conditions have been used for metallocenes containing a Si—Cl group and for metallocenes which do not contain a functional group which can react with silica. Table I shows that the metallocene according to the invention is slightly less active under homogeneous condition than the corresponding non-functionalized metallocene, but it becomes much more active when supported onto treated silica. The same conclusions apply when comparing the metallocene according to the invention with the metallocene containing a Si—Cl group.

The following examples are described in order to better understand the invention. The materials, the chemical compounds and the conditions used in these examples are illustrative and do not limit the scope of the invention.

EXAMPLES

Example 1

Preparation of
[(3-trimethylsiloxypropyl)methylsilylen] bis indenyl
zirconium dichloride Preparation of
(3-trimethylsiloxypropyl)methyldichlorosilane A 500 ml Schlenk flask equipped with a stir-bar, a reflux condenser and a rubber septum was charged under nitrogen with 103.3 g of HSiMe$_2$Cl and 5 drops of a 0.1M solution of the platinum Pt(0) 2,4,6,8-tetramethyl -2,4,6,8-tetravinyl-cyclotetrasiloxane complex (a product sold by Aldrich Chemical Co) at room temperature. To this solution 100 g of Me$_3$SiO—CH$_2$—CH=CH$_2$ was added during 30 minutes. After the addition was completed, the reaction mixture was gradually heated at 40° C. and maintained at this temperature under stirring for 2 hours, and finally heated at 60° C. for another 5 hours. The desired product can be isolated by distillation under vacuum (10 mbar) at 75° C. Yield 84% $^1$H NMR (CDCl$_3$): 0.120 (s, 9H, Si(Me)$_3$), 0.810 (s, 6H, SiMe), 1.120–1.190 (m,CH$_2$), 1.695–1.792 (m, 2H, CH$_2$), 3.597 (t, 2H, CH$_2$).

Preparation of (3-trimethylsiloxypropyl)methyl bis indenyl silane

A 500 ml Schlenk flask equipped with a stir-bar, and a rubber septum was charged under nitrogen with 200 ml of ethyl ether and 34.8 g freshly distilled indene. To this solution 120 ml 2.5M BuLi solution in hexane was slowly added at 0° C., under stirring. The resulting mixture was stirred for 1 hour at 0° C. and subsequently for 2 more hours at room temperature. The obtained red solution is again cooled to 0° C. and a solution of 39.9 g of Me$_3$SiO (CH$_2$)$_3$Si(Me)Cl$_2$ in 100 ml is slowly added (1 hour). After a 2 hours stirring, the temperature is allowed to rise and the reaction mixture is stirred for 6 more hours at room temperature. All the solvents are removed under low pressure, and the residue extracted with 300 ml of hexane and the inorganic salts filtered. All the volatiles were again removed, first under low pressure (10 mbar) and then at 80° C. under higher vacuum (0.01 mbar). The desired product was obtained pure by short path distillation of the residue at 0.001 mbar and 160° C., as a mixture of rac and meso isomers. $^1$H NMR (CDCl$_3$) (mixture of all isomers): (−0.3740)–(−0.138)–0.087 (s, 3H, SiMe), 0.085–0.091–0.095(s, 9H, Si(Me)$_3$), 0.320–0.651–0.950–1.183–1.34 (br m 4H —CH2-CH2), 3,280–3.349–3.425 (t, 2H, CH$_2$—O), 3.651–3.680 (s, 2H, C$_9$H$_7$), 6.361–6.422–6.610–6.954 (4H, m, C$_9$H$_6$), 7.229–7.310–7.531 (m, 8H, C$_9$H$_6$). MS: m/z(%)=404 M$^+$(1%); 288.7(31%); 246.7(100%); 230.7(30%); 114.7(17%); 72.8(20%).

Preparation of [(3-trimethylsiloxypropyl)methylsilylen] bis indenyl zirconium dichloride A 250 ml Schlenk flask equipped with a stir-bar and a rubber septum was charged under nitrogen with 75 ml of ethyl ether and 9.14 g of Me$_3$SiO(CH$_2$)$_3$ Si(Me)(C$_9$H$_7$)$_2$. To this solution 17.2 ml of a 2.5 M solution of n-BuLi in hexane was slowly added under stirring at 0° C. After the addition was completed, the reaction mixture was stirred 2 hours at room temperature. The solvent was removed and the residue suspended in 75 ml of toluene.

The above prepared suspension was added to a suspension of ZrCl$_4$.2Et$_2$O in 100 ml toluene at 0° C., and stirred for 1 hour. The temperature was allowed to rise and the reaction mixture stirred for 5 more hours. The final suspension was filtered through Celite™ and the solvent removed under low pressure until an orange red viscous oil was obtained. The addition of hexane yielded a yellow orange solid shown to be the desired product as a mixture of rac and meso isomers. The rac isomer can be obtained pure by extraction of the meso isomer from the original mixture with additional hexane.

$^1$H NMR (CDCl$_3$) (mixture of all isomers): 0.157 (s, 9H, SiMe$_3$), 0.986–1.152–1.400 (s, 3H, Si(Me)), 0.986–1.652–1.783–2.0546 (m, 4H, —CH$_2$—CH$_2$), 3,.836 (t, 2H, CH$_2$—O), 6.131–6.158 (2H, m, C$_9$H$_7$), 6.952–6.968 (m, 2H, C$_9$H$_6$), 7.124–7.413–7.457–7.622 (m, 8H, C$_9$H$_6$).

Example 2

Preparation of [(1,1-dimethyl-1-sila-4-trimetylsiloxybutyl) cyclopentadienyl]cyclopentadienyl zirconium dichloride Preparation of (3-trimethylsiloxypropyl)dimethylchlorosilane A 500 ml Schlenk flask equipped with a stir-bar, a reflux condenser and a rubber septum was charged under nitrogen with 94.6 g of HSiMe$_2$Cl and 5 drops of a 0.1 M solution of the platinum complex Pt(0) 2,4,6,8-tetramethyl-2,4,6,8-tetravinylcyclotetrasiloxane complex (a product sold by Aldrich Chemical Co) at room temperature. To this solution 131 g of Me$_3$SiO—CH$_2$—CH=CH$_2$ was added during 30 minutes. After the addition the reaction mixture was gradually heated at 40° C. and mantained at this temperature under stirring for 2 hours, and finally heated at 60° C. for another 5 hours. The desired product can be isolated by distillation under vacuum (25 mbar) at 84° C. Yield 80%. $^1$H NMR (CDCl$_3$): 0.125 (s, 9H, SiMe$_3$), 0.413 (s, 6H, SiMe$_2$), 0.798–0.890 (m, 2H, CH$_2$), 1.595–1.720 (m, 2H, CH$_2$), 3.585 (t, 2H, CH$_2$).

Preparation of (1,1-dimethyl-1-sila-4-trimethylsiloxybutyl)cyclopentadiene

A 1L Schlenk flask equipped with a stir-bar and a rubber septum was charged under nitrogen with 89 g (0.396 mol) of Me$_3$SiO(CH$_2$)$_3$Si(Me)$_2$Cl and 200 ml of dry hexane. To this solution 250 ml of a solution of THF containing 0.396 mol of C$_5$H$_5$Na was added under stirring at 0° C. After the addition the reaction mixture was maintained at this temperature for 1 hour. The temperature was allowed to raise to 23° C. and the mixture was stirred for 8 more hours. The final suspension was filtered, subsequently, the volatiles were removed at reduced pressure. The product was isolated from the residue by distillation at 65–68° C. and 1 mbar as a mixture of double bond isomers. $^1$H NMR (CDCl$_3$): −0.03 (s, 6H, Si(Me)$_2$), 0.2 (s, 9H, Si(Me)$_3$), 0.52–0.68 (m, 2H, CH$_2$), 1.59 (m, 2H, CH$_2$), 3.45 br (1H C$_5$H$_4$), 3.55 (t,2H, CH$_2$—O), 6.45–6–7 (m, 4H, C$_5$H$_4$).

Preparation of [(1,1-dimethyl-1-sila-4-trimethylsiloxybutyl)cyclopentadienyl] cyclopenta-dienyl zirconium dichloride A 250 ml Schlenk flask equipped with a stir-bar and a rubber septum was charged under nitrogen with 14 g (0.0396 mol) of (C$_5$H$_5$)ZrCl$_3$.DME_and 100 ml of dry hexane. To this solution 0.0396 mol of Me$_3$SiO(CH$_2$)$_3$ Si(Me)$_2$C$_5$H$_4$K in 50 ml THF was slowly added at 0° C., under stirring. The resulting mixture was stirred for 1 hour at 0° C. and subsequently for 6 more hours at room temperature. All the solvents were removed under reduced pressure and the solid residue was extracted with hexane and filtered. The solution was again partially evaporated and cooled at −20° C. to give white crystals (Yield 45%). $^1$H NMR (CDCl$_3$): 0.125 (s, 9H, Si(Me)$_3$), 0.333 (s, 6H, Si(Me)$_2$), 0.688–0.722 (m, 2H, CH$_2$), 1.504–1.538 (m, 2H, CH$_2$), 3.520 (t, 2H, CH$_2$), 6.479 (s, 5H, C$_5$H$_5$), 6.570 (m, 2H, C$_5$H$_4$), 6.725 (m, 2H, C$_5$H$_4$).

Example 3

Preparation of [1-(3-trimethylsiloxypropyl)indenyl] cyclopentadienyl zirconium dichloride

Preparation of [3-(3 trimethylsiloxypropyl)indene]

A solution of 25.3 g (230 mmol) of LiInd in 250 ml of THF was slowly added to a solution of 48.5 g (230 mmol) of 3-bromo-1-trimethylsiloxypropane, prepared according to EP 0 839 836, in 250 ml of THF at room temperature. A red solution was immediately formed. The mixture was stirred at room temperature for 12 h and then the solvent was removed under vacuum, the residue was treated with hexane and the supernatant solution was filtered. The removal of the hexane led to a green oil. This oil was distilled in order to obtain a pale yellow oil. ($T_b$: 89–91° C., 1 mm Hg). (21.5 g, 87.4 mmol, yield: 38%). $^1$H-NMR (CDCl$_3$): 7.52 (m, 1H); 7.45 (m, 1H); 7.36 (m, 1H); 7.24 (m, 1H); 6.28 (m, 1H); 3.74 (m, 2H); 3.39 (m, 2H); 2.65 (m, 2H); 1.99 (m, 2H); 0.20 (s, 9H).

Preparation of lithium [1-(3-trimethylsiloxypropyl)indenide]

To 1.5 g (6.1 mmol) of [3-(3-trimethylsiloxypropyl)indene] in ether at −78° C, 2.44 ml (6.1 mmol) of a 2.5 M butyllithium solution in hexane was added. The immediate formation of a white solid was observed. The mixture was maintained under stirring for 2 h. Then, the solvent was removed under vacuum and the residue was washed twice with 25 ml of hexane to give a brown solid. (1.3 g, 5.2 mmol, yield 85%).

Preparation of [1-(3-trimethylsiloxypropyl)indenyl] cyclopentadienyl zirconium dichloride To a suspension of 1.0 g (4 mmol) of cyclopentadienyl zirconium trichloride in ether at 0° C., a suspension of 1.0 g (4 mmol) of lithium [1-(3-trimethylsiloxypropyl)indenide] in ether was added. The formation of a yellowish solid was observed immediately. The mixture was stirred for 12 h, then the supernatant solution was filtered and the volatiles were removed under vacuum to give a yellow oily-solid. This solid was washed with hexane to give a yellow powder, which was characterized as [1-(3-trimethylsiloxypropyl)indenyl]cyclopentadienyl zirconium dichloride (0.85 (m, 2H); 7.30 (m, 2H); 6.70 (m, 1H); 6.45 (m, 1H); 6.13 (s, 5H); 3.65 (m, 2H); 3.04 (dm, 2H); 1.92 (m, 2H); 0.17 (s, 9H).

Example 4

Preparation of dimethylsilylen [3-(2-trimethylsiloxyethyl)cyclopenadienyl] indenyl zirconium dichloride

Preparation of (2-trimethylsiloxyethylcyclopentadienyl) indenyl dimethyl silane To a suspension of 0.63 g (26.3 mmol) of HNa in THF at −78° C., a solution of 6.3 g (26.3 mmol) of cyclopentadienylindenyldimethylsilane in THF was added. Immediately a purple solution was formed. Then, the volatiles were removed and the residue was washed with hexane to give a pink solid. The solid was solved again in THF and a solution of 5.2 g (26.3 mmol) of 2-bromo-1-trimethylsiloxyethane in THF was added at room temperature. A white suspension was formed immediately. The mixture was stirred for 12 h, and then the solvents were removed and the residue was treated with hexane and the supernatant solution was filtered. The removal of the hexane led to a brown oil. This oil was distilled in order to obtain a yellow-orange oil, which was characterized as a mixture of position isomers of (2-trimethylsiloxyethylindenyl) cyclopentadienyl dimethyl silane. ($T_b$: 170–175° C.; 1 mm Hg), (3.9 g, 11 mmol, yield: 42%). $^1$H-RMN(CDCl$_3$): 7.54–7.42 (m, 2H); 7.31–7.12 (m, 2H); 6.95 (m, 1H); 6.91 (m, 1H); 6.72 (m, 1H); 6.61 (m, 1H); 6.60–6.42 (m, 3H); 3.78 (m, 2H); 3.62 (m, 1H); 3.42 (m, 2H); 2.62 (m, 2H); 0.17 (m, 15 H).

Preparation of dimethylsilylen [3-(2-trimethylsiloxyethyl)cyclopentadienyl] indenyl zirconium dichloride To a solution of 1.4 g (35 mmol) of HK in THF at room temperature, a solution of 6.2 g (17.5 mmol) of (2-trimethylsiloxyethylindenyl) cyclopentadienyl dimethyl silane in THF is added. Immediately, a purple solution was formed. Then, the solution was added to a suspension of 4.1 g (17.5 mmol) of zirconium tetrachloride in toluene at −78° C. The formation of a yellow suspension was observed. The mixture was stirred for 12 h and then the solvents were evaporated, the residue was treated with hexane and the supernatant solution was filtered and stored at −35° C. A yellow mycrocristalline solid was obtained, which was characterized as a mixture in a ratio 50:50 of two stereoisomers. (5.8 g, 11.3 mmol, yield: 65%). $^1$H-NMR (CDCl$_3$): 7.75 (m, 2H, Isomer a and b); 7.52 (m, 1H, Isomer a); 7.41 (m, 1H, Isomer b); 7.12 (m, 4H, Isomer a and b); 6.51 (m, 1H, Isomer b); 6.48 (m, 1H, Isomer a); 6.22 (m, 1H, Isomer a); 6.11 (m, 1H, Isomer b); 5.90 (m, 1H, Isomer a); 5.83 (m, 1H, Isomer b); 5.57 (m, 1H, Isomer b); 5.54 (m, 1H, Isomer a); 3.78 (m, 2H, Isomer b); 3.67 (m, 2H, Isomer a); 2.88 (m, 2H, Isomer b); 2.70 (dm, 2H, Isomer a); 1.03 (s, 3H, Isomer b); 1.02 (s, 3H, Isomer a); 0.82 (s, 3H, Isomer a); 0.80 (s, 3H, Isomer b); 0.10 (s, 9H, Isomer b); 0.08 (s, 9H, Isomer a); $^{13}$C-NMR (CDCl$_3$): 141.0, 138.7, 135.1, 135.0, 127.8, 127.2, 126.3, 126.1, 125.8, 124.1, 123.7, 123.6, 119.2, 119.1, 117.6, 117.4, 116.2, 115.7, 115.6, 112.3, 112.2, 105.5, 104.7, 89.8, 89.7, 62.3, 62.2, 33.3, 33.2, −0.51, −2.34, −2.35, −4.62, −4.63.

Example 5

Preparation of dimethylsilylen [3-(2-trimethylsiloxyethyl)cyclopentadienyl] cyclopentadienyl zirconium dichloride

Preparation of (2-trimethylsiloxyethylcyclopentadienyl) cyclopentadienyl dimethyl silane A solution of 11.5 g (61 mmol) of biscyclopentadienyidimethylsilane in THF was added to a suspension of 1.3 g (55 mmol) of HK in THF at −78° C. A purple solution was immediately formed. Then, the volatiles were removed and the residue was washed with hexane to give a pink solid. The solid was solved again in THF and a solution of 10.8 g (55 mmol) of 2-bromo-1-trimethylsiloxyethane in THF was added at room temperature. A pink suspension was immediately formed. The mixture was stirred for 12 h, and then the solvents were removed, the residue was treated with hexane and the supernatant solution was filtered. The removal of the hexane led to a reddish oil. This oil was distilled in order to obtain a yellow oil, which was characterized as a mixture of position isomers of (2-trimethylsiloxyethylcyclopentadienyl) dimethyl cyclopentadienyl silane ($T_b$: 135–140° C.; 1 mm Hg), (8.7 g, 28.6 mmol, yield: 52%). $^1$H-RMN(CDCl$_3$): 6.82–6.40 (m, 7H); 3.82 (m, 2H); 3.10 (m, 2H); 2.73 (m, 2H); 0.20 (s, 15 H).

Preparation of dimethylsilylen [3-(2-trimethylsiloxyethyl)cyclopentadienyl] cyclopentadienyl zirconium dichloride 4.24 ml (10.6 mmol) of a 2.5 M butyllithium solution in hexane was added to a solution of 1.6 g (5.3 mmol) of (2-trimethylsiloxyethylcyclopentadienyl) cyclopentadienyl dimethyl silane in ether at room temperature. The immediate formation of a white solid was observed. After 2 h the mixture was added to a suspension of 1.2 g (5.3 mmol) of zirconium tetrachloride in toluene at −78° C. The formation of a yellow suspension was observed. The mixture was stirred for 12 h and then the solvents were evaporated, the residue was treated with hexane and the supernatant solution was filtered. The removal of the hexane led to a green solid, which was recrystallized in hexane at −35° C. to give a green powder, which is characterized as dimethylsilylen [3-(2-trimethylsiloxyethyl)cyclopentadienyl] cyclopentadienyl zirconium dichloride (0.4 g, 0.86 mmol, yield: 16%). $^1$H-NMR (CDCl$_3$): 7.05 (m, 1H); 6.96 (m, 1H); 6.67 (m, 1H); 5.98 (m, 1H); 5.92 (m, 1H); 5.86 (m, 1H); 5.60 (m, 1H) 3.80 (m, 2H); 2.88 (m, 2H); 0.72 (s, 3H); 0.77 (s, 3H); 0.10 (s, 9 H). $^{13}$C-NMR (CDCl$_3$): 138.9, 127.3, 126.7, 126.6, 114.5, 113.5, 113.3, 112.9, 107.1, 107.0, 62.6, 34.4, 1.1, −3.5, −3.6.

Example 6

Preparation of [1-(2-trimethylsiloxyethyl)indenyl] cyclopentadienyl zirconium dichloride Preparation of [3-(2-trimethylsiloxyethyl)indene]

A solution of 43.1 g (392 mmol) of LiInd in 250 ml of THF was slowly added to a solution of 82.7 g (392 mmol) of 2-bromo-1-trimethylsiloxyethane, prepared according to EP 0 839 836, in 250 ml of THF at 0° C. An orange solution is immediately formed. The mixture was stirred at room temperature for 12 h and then the solvent was removed under vacuum, the residue was treated with hexane and the supernatant solution was filtered. The removal of the hexane led to a dark brown oil. This oil was distilled in order to obtain a pale yellow oil. ($T_b$: 84–86° C., 1 mm Hg). (41.8 g, 180 mmol, yield: 46%). $^1$H-NMR (CDCl$_3$): 7.52 (m, 1H); 7.45 (m, 1H); 7.36 (m, 1H); 7.25 (m, 1H); 6.31 (m, 1H); 3.96 (m, 2H); 3.40 (m, 2H); 2.90 (m, 2H); 0.19 (s, 9H).

Preparation of lithium [1-(2-trimethylsiloxyethyl)indenide]

10.3 ml (16.4 mmol) of a 1.6 M butyllithium solution in hexane was added to 3.8 g (16.4 mmol) of [3-(2-trimethylsiloxyethyl)indene] in ether at −78° C. The immediate formation of a white solid was observed. The mixture was maintained under stirring for 2 h. Then the solvent was removed under vacuum and the residue was washed twice with 25 ml of hexane to give a white solid. (3.6 g, 15 mmol, yield: 91.5%).

Preparation of [1-(2-trimethylsiloxyethyl)indenyl] cyclopentadienyl zirconium dichloride A suspension of 3.9 g (16.4 mmol) of lithium [1-(2-trimethylsiloxyethyl)indenide] in ether was added to a suspension of 5.8 g (16.4 mmol) of cyclopentadienyl zirconium trichloride complex with dimethoxyethane in 100 ml of ether at 0° C. The formation of a yellowish solid was immediately observed. The mixture was stirred for 12 h, then the supernatant solution was filtered and the volatiles were removed under vacuum to give a yellow oily-solid. This solid was washed with hexane to give a yellow powder, which was characterized as [1-(2- trimethylsiloxyethyl)indenyl] cyclopentadienyl zirconium dichloride (3.3 g, 7.2 mmol, yield: 44%). $^1$H-NMR (CDCl$_3$): 7.65 (m, 2H); 7.29 (m, 2H); 6.67 (m, 1H); 6.46 (m, 1H); 6.12 (s, 5H); 3.87 (m, 2H); 3.20 (dm, 2H); 0.05 (s, 9H). $^{13}$C-NMR (CDCl$_3$): 127.2, 125.3, 125.2, 125.0, 124.9, 124.1, 116.1, 97.8, 97.7, 62.3, 31.3, −0.8.

Example 7

Preparation of [1-(2-trimethylsiloxyethyl)indenyl] pentamethylcyclopentadienyl zirconium dichloride Preparation of [1-(2-tdmethylsiloxyethyl)indenyl] pentamethylcyclopentadienyl zirconium dichloride A suspension of 1.5 g (6.5 mmol) of lithium [1-(2-trimethylsiloxyethyl)indenide] in ether was added to a suspension of 2.2 g (6.5 mmol) of pentamethylcyclopentadienyl zirconium trichloride in 100 ml of ether at 0° C. After 30 minutes, the formation of a white solid was the volatiles were removed under vacuum to give a yellow oily-solid. This solid was recrystallized in hexane to give a mycrocristalline yellow solid, which was characterized as [1-(2-trimethylsiloxyethyl)indenyl]pentamethylcyclopentadienyl zirconium dichloride (1.7 g, 3.2 mmol, yield: 49%). $^1$H-NMR (CDCl$_3$): 7.65 (m, 1H); 7.33 (m, 1H); 7.25 (m, 2H); 6.08 (m, 1H); 5.92 (m, 1H); 3.72 (dm, 2H); 3.28 (m, 1H); 2.72 (m, 1H); 2.04 (s, 15H); 0.03 (s, 9H). $^{13}$C-NMR (CDCl$_3$): 131.4; 127.1; 126.7; 125.2; 125.1; 124.2; 123.5; 122.6; 116.1; 97.0; 62.6; 32.1; 12.5; −0.6.

Preparation of Suported Functionalized Metallocenes

Example 8

Heterogenization of (3-trimethylsiloxypropycyclopentadienyl)(cyclopentadienyl) zirconium dichloride on Silica Modified with MAO In a flask of 250 ml of capacity it was weighed 5 g of silica modified with MAO commercialized by Witco with a 24.7% weight of Al and it was added 120 ml of toluene. Then, it was added a solution in toluene of (3-trimethylsiloxipropylcyclopentadienyl) (cyclopentadienyl) zirconium dichloride (0.255 mmol of Zr). The reaction mixture was maintained under mechanic stirring at room temperature. After 2 hours of reaction the resulting solid was isolated by filtration and washed with consecutive fractions of toluene at 70° C. up to a total volume of 500 ml. The solid was finally dried under vacuum for 24 hours. The Zr and Al content in the catalyst was determined by ICP and it was 0.29% and 19.4% by weight respectively.

Comparative Example 9

Heterogenization of (chlorodimethylsilylcyclopentadienyl)(cyclopentadienyl) zirconium dichloride on silica modified with MAO In a flask of 250 ml of capacity it was weighed 5 g of silica modified with MAO commercialized by Witco with a 24.7% weight of Al and it was added 120 ml of toluene. Then, it was added a solution in toluene of (chlorodimethylsilylcyclopentadienyl) (cyclopentadienyl) zirconium dichloride (0.255 mmol of Zr). The reaction mixture was maintained under mechanic stirring at room temperature. After 2 hours of reaction the resulting solid was isolated by filtration and washed with consecutive fractions of toluene at 700° C. up to a total volume of 500 ml. The solid was finally dried under vacuum for 24 hours. The Zr and Al content in the catalyst was determined by ICP and it was 0.40% and 20.7% by weight respectively.

Comparative Example 10

Heterogenization of (chloromethylsilandiyl)bis(cyclopentadienyl) zirconium dichiolide on Silica Modified with MAO In a flask of 250 ml of capacity it was weighed 5 g of silica modified with MAO commercialized by Witco with a 24.7% weight of Al and it was added 120 ml of toluene. Then, it was added a solution in toluene of (chloromethylsilandiyl) bis(cyclopentadienyl) zirconium dichloride (0.255 mmol of Zr). The reaction mixture was maintained under mechanic stirring at room temperature. After 2 hours of reaction the resulting solid was isolated by filtration and washed with consecutive fractions of toluene at 700° C. up to a total volume of 500 ml. The solid was finally dried under vacuum for 24 hours. The Zr and Al content in the catalyst was determined by ICP and it was 0.36% and 18.1% by weight respectively.

Example 11

Heterogenization of (3-trimethylsiloxypropyl)methylsilylen]bis(1-indenyl) zirconium dichloride on Silica Modified with MAO In a flask of 250 ml of capacity it was weighted 3 g of silica modified with MAO commercialized by Witco with a 23% by weight of Al and it was added 120 ml of toluene. Then, it was added a solution in toluene of [(3-trimethylsiloxypropyl)methylsilylen]bis(1- indenyl) zirconium dichloride (0.2 mmol of Zr). The reaction mixture was maintained under mechanic stirring at room temperature. After 2 hours of reaction the resulting solid was isolated by filtration and washed with consecutive fractions of toluene up to a total volume of 250 ml. The solid was finally dried under vacuum for 24 hours. The Zr and Al content in the catalyst was determined by ICP and it was 0.41% and 22% by weight respectively.

Example 12

Heterogenization of [(1,1-dimethyl-1-sila-4-trimethylsiloxybutyl)-cyclopentadienyl]cyclopentadienyl zirconium dichloride on Silica Modified with MAO In a flask of 250 ml of capacity it was weighted 3 g of silica modified with MAO commercialized by Witco with a 23% by weight of Al and it was added 120 ml of toluene. Then, it was added a solution in toluene of [(1,1-dimethyl-1-sila-4-tdmethylsiloxybutyl)- cyclopentadienyl]cyclopentadienyl zirconium dichloride (0.33 mmol of Zr). The reaction mixture was maintained under mechanic stirring at room temperature. After 2 hours of reaction the resulting solid was isolated by filtration and washed with consecutive fractions of toluene up to a total volume of 250 ml. The solid was finally dried under vacuum for 24 hours. The Zr and Al content in the catalyst was determined by ICP and it was 0.99% and 22.4% by weight respectively.

Example 13

Heterogenization of [1-(3-trimethylsiloxypropyl) indenyl](cyclopentadienyl) zirconium dichloride on Silica Modified with MAO In a flask of 250 ml of capacity it was weighted 3 g of silica modified with MAO commercialized by Witco with a 23% by weight of Al and it was added 120 ml of toluene. Then, it was added a solution in toluene of [1-(3-trimethylsilosypropyl)indenyl](cyclopentadienyl) zirconium dichloride (0.140 mmol of Zr). The reaction mixture was maintained under mechanic stirring at room temperature. After 2 hours of reaction the resulting solid was isolated by filtration and washed with consecutive fractions of toluene up to a total volume of 250 ml. The solid was finally dried under vacuum for 24 hours. The Zr and Al content in the catalyst was determined by ICP and it was 0.59% and 27% by weight respectively.

Example 14

Heterogenization of dimethylsilylen(trimethylsiloxyethyl-3cyclopentadienyl)(1-indenyl) zirconium dichloride on Silica Modified with MAO In a flask of 250 ml of capacity it was weighted 3 g of silica modified with MAO commercialized by Witco with a 24.7% by weight of Al and it was added 120 ml of toluene. Then, it was added a solution in toluene of dimethylsilylen (tdmethylsiloxyethyl-3-cyclopentadienyl)(1-indenyl) zirconium dichloride (0.152 mmol of Zr). The reaction mixture was maintained under mechanic stirring at room temperature. After 2 hours of reaction the resulting solid was isolated by filtration and washed with consecutive fractions of toluene at 70° C. up to a total volume of 500 ml. The solid was finally dried under vacuum for 24 hours. The Zr and Al content in the catalyst was determined by ICP and it was 0.35% and 20% by weight respectively.

Example 15

Heterogenization of dimethylsilylen(trimethylsiloxyethyl-3cyclopentadienyl)(cyclopentadienyl) zirconium dichloride on Silica Modified with MAO In a flask of 250 ml of capacity it was weighted 3.2 g of silica modified with MAO commercialized by Witco with a 24.7% by weight of Al and it was added 120 ml of toluene. Then, it was added a solution in toluene of dimethylsilylen (trimethylsiloxyethyl-3 cyclopentadienyl)(cyclopentadienyl) zirconium dichloride (0.096 mmol of Zr). The reaction mixture was maintained under mechanic stirring at room temperature. After 2 hours of reaction the resulting solid was isolated by filtration and washed with consecutive fractions of toluene up to a total volume of 500 ml. The solid was finally dried under vacuum for 24 hours. The Zr and Al content in the catalyst was determined by ICP and it was 0.24% and 23% by weight respectively.

Example 16

Heterogenization of [1-(2-trimethylsiloxyethyl)Indenyl](cyclopentadienyl) zirconium dichloride on Silica Modified with MAO In a flask of 250 ml of capacity it was weighted 3.7 g of silica modified with MAO commercialized by Witco with a 24.7% by weight of Al and it was added 120 ml of toluene. Then, it was added a solution in toluene of [1-(2-trimethylsiloxyethyl)lndenyl](cyclopentadienyl) zirconium dichloride (0.111 mmol of Zr). The reaction mixture was maintained under mechanic stirring at room temperature. After 2 hours of reaction the resulting solid was isolated by filtration and washed with consecutive fractions of toluene up to a total volume of 500 ml. The solid was finally dried under vacuum for 24 hours. The Zr and Al content in the catalyst was determined by ICP and it was 0.23% and 23% by weight respectively.

Preparation of Supported Non-Functionalized Metallocenes

Comparative Example 17

Heterogenization of biscyclopentadienyl zirconium dichloride on Silica Modified with MAO In a flask of 250 ml of capacity it was weighed 5 g of silica modified with MAO commercialized by Witco with a 24.7% weight of Al and it was added 120 ml of toluene. Then, it was added a solution in toluene of biscyclopentadienyl zirconium dichloride (0.255 mmol of Zr). The reaction mixture was maintained under mechanic stirring at room temperature. After 2 hours of reaction the resulting solid was isolated by filtration and washed with consecutive fractions of toluene at 70° C. up to a total volume of 500 ml. The solid was finally dried under vacuum for 24 hours. The Zr and Al content in the catalyst was determined by ICP and it was 0.36% and 18.4% by weight respectively.

Example 18

Heterogenization of (trimethylsilylcyclopentadienyl)(cyclopentadienyl) zirconium dichloride on Silica Modified with MAO In a flask of 250 ml of capacity it was weighed 5 g of silica modified with MAO commercialized by Witco with a 24.7% weight of Al and it was added 120 ml of toluene. Then, it was added a solution in toluene of (trimethylsilylcyclopentadienyl)(cyclopentadienyl) zirconium dichloride (0.255 mmol of Zr). The reaction mixture was maintained under mechanic stirring at room temperature. After 2 hours of reaction the resulting solid was isolated by filtration and washed with consecutive fractions of toluene at 70° C. up to a total volume of 500 ml. The solid was finally dried under vacuum for 24 hours. The Zr and Al content in the catalyst was determined by ICP and it was 0.4% and 21.2% by weight respectively.

Example 19

Heterogenization of (dimethylsilandiyl)bis(cyclopentadienyl) zirconium dichloride on Silica Modified with MAO In a flask of 250 ml of capacity it was weighed 5 g of silica modified with MAO commercialized by Witco with a 24.7% weight of Al and it was added 120 ml of toluene. Then, it was added a solution in toluene of (dimethylsilandiyl)bis(cyclopentadienyl) zirconium dichloride (0.255 mmol of Zr). The reaction mixture was maintained under mechanic stirring at room temperature. After 2 hours of reaction the resulting solid was isolated by filtration and washed with consecutive fractions of toluene at 70° C. up to a total volume of 500 ml. The solid was finally dried under vacuum for 24 hours. The Zr and Al content in the catalyst was determined by ICP and it was 0.37% and 20.8% by weight respectively.

Polymerization with Functionalized Soluble Catalysts

Comparative Example 20

Copolymerization of ethylene/1-hexene

The reactions of copolymerization of ethylene/1-hexene were carried out in a reactor Büchi of 1.3 liters of capacity, under anhydrous conditions. The reactor, charged with 600 ml of dry heptane, was conditioned at 70° C. and pressurized with ethylene up to 4 atm. Then, it was added 20 ml of 1-hexene, 2.7 ml of a solution of MAO 10% in toluene (commercialized by Witco) and finally 0.42 ml of a solution $4.7 \times 10^{-3}$ M in toluene of (3-trimethylsiloxi propyl cyclopentadienyl)(cyclopentadienyl) zirconium dichloride (0.002 mmol of Zr). The polymerization reaction was maintained at 70° C. and a pressure of 4 atm for 15 minutes. At the end of the reaction, the reactor was depressurized and the obtained product was treated with acidified methanol. It was obtained 10.4 g of polyethylene (activity $5.2 \times 10^6$ g PE/mol M×h× atm) with a Mw of 172.800, MWD of 4 and a comonomer content of 1.77% molar.

Comparative Example 21

Polymerization of ethylene

The polymerization reaction of ethylene was carried out in a reactor Büchi of 1.3 liters of capacity, under anhydrous conditions. The reactor, charged with 600 ml of dry heptane, was conditioned at 70° C. and pressurized with ethylene up to 4 atm. Then, it was added 1.1 ml of a solution of MAO 10% in toluene (commercialized by Witco) and 0.28 ml of a solution $2.8 \times 10^{-3}$ M in toluene of (chlorodimethylsilylcyclopentadienyl)(cyclopentadienyl) zirconium dichloride (0.0008 mmol of Zr). The polymerization reaction was maintained at 70° C. and a pressure of 4 atm for 15 minutes. At the end of the reaction, the reactor was depressurized and the obtained product was treated with acidified methanol. It was obtained 8.1 g of polyethylene (activity $10.0 \times 10^6$ g PE/mol M×h×atm) with a Mw of 288.300 and MWD 2.2.

Comparative Example 22

Polymerization of ethylene

The polymerization reaction of ethylene was carried out by following the method and the conditions described in example 21, but it was added 5.3 ml of a solution of MAO 10% in toluene (commercialized by Witco) and 0.93 ml of a solution $4.3 \times 10^{-3}$ M in toluene of (chloromethylsilandiyl) bis (cyclopentadienyl) zirconium dichloride (0.004 mmol of Zr). The polymerization reaction was maintained at 70° C. and a pressure of 4 atm for 15 minutes. At the end of the reaction, the reactor was depressurized and the obtained product was treated with acidified methanol. It was obtained 5.1 g of polyethylene (activity $1.3 \times 10^6$ g PE/mol M×h×atm) with a Mw of 162.000.

Comparative Example 23

The polymerization reaction of ethylene was carried out in a reactor Büchi of 1.3 liters of capacity, under anhydrous conditions. The reactor, charged with 600 ml of dry heptane, was conditioned at 70° C. and pressurized with ethylene up to 4 atm. Then, it was added 26.7 ml of a solution of MAO 1.5 M in Toluene, 10 ml of 1-hexene and 5.3 ml of a solution in toluene ($1.5 \times 10^{-3}$ M) of [1-(2-methylsiloxyethyl)Indenyl](pentamethyl cyclopentadienyl) zirconium dichloride (0.008 mmol of Zr). The polymerization reaction was maintained at 70° C. and a pressure of 4 atm for 15 minutes. At the end of the reaction, the reactor was depressurized and the obtained product was treated with acidified methanol. It was obtained 7.3 g of polyethylene (activity $9.2 \times 10^5$ g PE/mol M×h×atm) with an Mw of 215.400 and a comonomer content of 0.7% molar.

Polymerization with Non-Functionalized Soluble Catalysts

Comparative Example 24

Copolymerization of ethylene/1-hexene

The reaction of copolymerization of ethylene with 1-hexene was carried out by following the method and the conditions described in example 20, but it was added 2.7 ml of a solution of MAO 10% in toluene commercialized by Witco and finally 0.7 ml of a solution in toluene ($2.7 \times 10^{-3}$ M) of biscyclopentadienyl zirconium dichloride (0.002 mmol of Zr). The polymerization reaction was maintained at 70° C. and a pressure of 4 atm for 15 minutes. At the end of the reaction, the reactor was depressurized and the obtained product was treated with acidified methanol. It was obtained 16 g of polyethylene (activity $8.0 \times 10^6$ g PE/mol M×h×atm) with a Mw of 59.300, MWD 2.4 and a comonomer content of 1.08% molar.

Comparative Example 25

Polymerzation of ethylene

The polymerization reaction of ethylene was carried out by following the method and the conditions described in example 21, but it was added 1.1 ml of a solution of MAO 10% in toluene (commercialized by Witco) and then 0.3 ml of a solution in toluene ($3.0 \times 10^{-3}$ M) of (trimethylsilylcyclopentadienyl)(cyclopentadienyl) zirconium dichloride (0.0008 mmol of Zr). The polymerization reaction was maintained at 70° C. and a pressure of 4 atm for 15 minutes. At the end of the reaction, the reactor was depressurized and the obtained product was treated with acidified methanol. It was obtained 13.5 g of polyethylene (activity $16.9 \times 10^6$ g PE/mol M×h×atm) with a Mw of 319.200 and MWD 2.3.

Comparative Example 26

Polymerization of ethylene

The polymerization reaction of ethylene was carried out by following the method and the conditions described in example 21, but it was added 5.3 ml of a solution of MAO 10% in toluene commercialized by Witco and finally 0.87 ml of a solution in toluene ($4.6 \times 10^{-3}$ M) of (dimethylsilandiyl) bis(cyclopentadienyl) zirconium dichloride (0.004 mmol of Zr). The polymerization reaction was maintained at 70° C. and a pressure of 4 atm for 15 minutes. At the end of the reaction, the reactor was depressurized and the obtained product was treated with acidified methanol. It was obtained 11.7 g of polyethylene (activity $2.90 \times 10^6$ g PE/mol M×h×atm) with a Mw of 64.500 and MWD 3.5.

Polymerization with Functionalized Supported Catalysts

Example 27

Copolymerization of ethylene/1-hexene

The reactions of copolymerization of ethylene with 1-hexene were carried out in a reactor Büchi of 1.3 liters of capacity, under anhydrous conditions. The reactor, charged with 600 ml of dry heptane, was conditioned at 70° C. and pressurized with ethylene up to a pressure of 3.5 atm, then it was added 20 ml of 1-hexene, 1.7 ml of a solution of TIBA 1.34 M in heptane and it was finally added, through a overpressure of ethylene of 0.5 atm, 0.179 g (0.0057 mmol of Zr) of the catalyst prepared according to example 8. The polymerization reaction was maintained at 70° C. and a pressure of 4 atm for 15 minutes. At the end of the reaction, the reactor was depressurized and the obtained product was treated with acidified methanol. It was obtained 13.8 g of polyethylene (activity $2.4 \times 10$ g PE/mol M×h×atm) with a Mw of 178.600, a MWD of 2.4 and a comonomer content of 2.27% molar.

Example 28

Polymerization of ethylene

The reactions of polymerization of ethylene were carried out in a reactor Büchi of 1.3 liters of capacity, under anhydrous conditions. The reactor, charged with 600 ml of dry heptane, was conditioned at 70° C. and pressurized with ethylene up to a pressure of 3.5 atm. Later, it was added 1.7 ml of a solution of TIBA 1.34 M in heptane and it was finally added, through a overpressure of ethylene of 0.5 atm, 0.130 g (0.0057 mmol of Zr) of the catalyst described in example 9. The polymerization reaction was maintained at 70° C. and a pressure of 4 atm for 15 minutes. At the end of the reaction, the reactor was depressurized and the obtained product was treated with acidified methanol. It was obtained 6 g of polyethylene (activity $1.1 \times 10^6$ g PE/mol M×h×atm) with a Mw of 378.500 and MWD 2.6.

Example 29

Polymerzation of ethylene

The polymerization reaction of ethylene was carried out by following the method and the conditions described in example 28, but it was added 2.4 ml of a solution of TIBA 1.34 M in heptane and 0.203 g (0.008 mmol of Zr) of the catalyst described in example 10. The polymerization reaction was maintained at 70° C. and a pressure of 4 atm for 15 minutes. At the end of the reaction, the reactor was depressurized and the obtained product was treated with acidified methanol. It was obtained 2.5 g of polyethylene (activity $0.32 \times 10^6$ g PE/mol M×h×atm) with a Mw of 159.600 and MWD 5.3.

Example 30

The reaction of copolymerization of ethylene with 1-hexene was carried out in an autoclave of a capacity of 2 liters, under anhydrous conditions. The reactor, charged with 1 l of dry isobutane, 49.6 ml of 1-hexene and 0.83 ml of a solution of TIBA 0.61 M in heptane, was conditioned at a temperature of 85° C. Later, it was added 0.033 g (0.0015 mmol of Zr) of the catalyst prepared according to example 11 and the reactor was pressurized with ethylene up to a total pressure of 40 atm. The copolymerization reaction was maintained at 85° C. and at a pressure of 40 atm for 60 minutes. At the end of the reaction, the reactor was depressurized and it was obtained 255.4 g of polyethylene (activity $4.3 \times 10^6$ g PE/mol M×h×atm) with a Mw of 311.200, MWD of 7.9, a comonomer content of 1.27% molar (hexene), and 0.17% molar (butene). The powder bulk density was 0.38 g/cc.

Example 31

The copolymerization reaction of ethylene/1-hexene was carried out by following the method and the conditions described in example 30, but it was added 141.5 ml of 1-hexene and 7.7 ml of a solution of TIBA 0.61 M in heptane. Later, it was added 0.071 g (0.0077 mmol of Zr) of the catalyst prepared according to example 12 and the reactor was pressurized with ethylene up to a total pressure of 40 atm. The copolymerization reaction was maintained at 85° C. and at a pressure of 40 atm for 60 minutes. At the end of the reaction, the reactor was depressurized and it was obtained 181 g of polyethylene (activity $0.6 \times 10^6$ g PE/mol M×h×atm), with a comonomer content of 1.1% molar and a bulk density of 0.39 g/cc.

Example 32

The copolymerization reaction of ethylene/1-hexene was carried out by following the method and the conditions described in example 30, but it was added 141.5 ml of 1-hexene and 0.74 ml of a solution of TIBA 0.61 M in heptane. Later, it was added 0.034 g (0.0022 mmol of Zr) of the catalyst prepared according to example 13 and the reactor was pressurized with ethylene up to a total pressure of 40 atm. The copolymerization reaction was maintained at 85° C. and at a pressure of 40 atm for 60 minutes. At the end of the reaction, the reactor was depressurized and it was obtained 95.4 g of polyethylene (activity $1.1 \times 10^6$ g PE/mol M×h×atm), with a comonomer content of 0.7% molar and a bulk density of 0.37 g/cc.

Example 33

The polymerization reaction of ethylene was carried out in a reactor Buchi of 1.3 liters of capacity, under anhydrous conditions. The reactor, charged with 600 ml of dry heptane, was conditioned at 90° C. and pressurized with ethylene up to 4 atm. Then, it was added 9.4 ml of a solution of TIBA 0.64 M in heptane, and 0.391 g (0.015 mmol of Zr) of the catalyst prepared according to example 14. The polymerization reaction was maintained at 90° C. and a pressure of 4 atm for 30 minutes. At the end of the reaction, the reactor was depressurized and the obtained product was treated with acidified methanol. It was obtained 1.6 g of polyethylene (activity $5.3 \times 10^4$ g PE/mol M×h×atm).

Example 34

The copolymerization reaction of ethylene/1-hexene was carried out by following the method and the conditions described in example 33, but it was added 9.4 ml of a solution of TIBA 0.64 M, 10 ml of 1-hexene. Then, it was added 0.540 g (0.014 mmol of Zr) of the catalyst prepared according to example 15. The polymerization reaction was maintained at 90° C. and a pressure of 4 atm for 15 minutes. At the end of the reaction, the reactor was depressurized and the obtained product was treated with acidified methanol. It was obtained 2.9 g of polyethylene (activity $2.0 \times 10^9$ PE/mol M×h×atm) with a comonomer content of 2.0% molar.

Example 35

The copolymerization reaction of ethylene/1-hexene was carried out by following the method and the conditions described in example 33, but it was added 3.6 ml of a solution of TIBA 0.64 M, 10 ml of 1-hexene. Then, it was added 0.226 g (0.0057 mmol of Zr) of the catalyst prepared according to example 16 The polymerization reaction was maintained at 90° C. and a pressure of 4 atm for 15 minutes. At the end of the reaction, the reactor was depressurized and the obtained product was treated with acidified methanol. It was obtained 1.1 g of polyethylene (activity $2 \times 10^5$ g PE/mol M×h×atm) with a comonomer content of 1.2% molar.

Polymerization with Non-Functionalized Supported Catalysts

Example 36

Copolymerization of ethylene/1-hexene

The reaction of copolymerization of ethylene with 1-hexene was carried out by following the method and the conditions described in example 27, but it was added 0.144 g (0.0057 mmol of Zr) of the catalyst described in example 17. The polymerization reaction was maintained at 70° C. and a pressure of 4 atm for 15 minutes. At the end of the reaction, the reactor was depressurized and the obtained product was treated with acidified methanol. It was obtained 2.8 g of polyethylene (activity $0.5 \times 10^6$ g PE/mol M×h×atm) with a Mw of 157.900, (MWD) of 3.7 and a comonomer content of 1.53% molar.

Comparative Example 37

Polymerization of ethylene

The polymerization reaction of ethylene was carried out by following the method and the conditions described in example 28, but it was added 0.130 g (0.0057 mmol of Zr) of the catalyst described in example 18. The polymerization reaction was maintained at 70° C. and a pressure of 4 atm for 15 minutes. At the end of the reaction, the reactor was depressurized and the obtained product was treated with acidified methanol. It was obtained 6.2 g of polyethylene (activity $1.1 \times 10^6$ g PE/mol M×h×atm) with a Mw of 327.600 and MWD 2.3.

Comparative Example 38

Polymerization of ethylene

The polymerization reaction of ethylene was carried out by following the method and the conditions described in example 28, but it was added 2.4 ml of a solution of TIBA 1.34 M in heptane and 0.179 g (0.008 mmol of Zr) of the catalyst prepared according to example 19. The polymerization reaction was maintained at 70° C. and a pressure of 4 atm for 15 minutes. At the end of the reaction, the reactor was depressurized and the obtained product was treated with acidified methanol. It was obtained 2.4 g of polyethylene (activity $0.3 \times 10^6$ g PE/mol M×h×atm) with a Mw of 86.900 and MWD 4.7.

Comparative Example 39

Copolymerzation of ethylene/1-hexene in Autoclave

The reaction of copolymerization of ethylene with 1-hexene was carried out in an autoclave of a capacity of 2 liters, under anhydrous conditions. The reactor, charged with 1 l of dry isobutane, 124 ml of 1-hexene and 0.6 ml of a solution of TIBA 1.34 M in heptane, was conditioned at a temperature of 90° C. Later, it was added 0.1 g (0.003 mmol of Zr) of the catalyst prepared according to example 8 and the reactor was pressurized with ethylene up to a total pressure of 40 atm. The copolymerization reaction was maintained at 90° C. and at a pressure of 40 atm for 60 minutes. At the end of the reaction, the reactor was depressurized and it was obtained 365 g of polyethylene (activity $5 \times 10^6$ g PE/mol M×h×atm) with a Mw of 135.000, MWD of 2, a comonomer content of 1% molar, an bulk density of 0.3 g/cc, a particle medium size of 0.6 mm and a distribution of particles sizes as it is shown in FIG. 1.

TABLE I

| TYPE OF CATALYST | EXAMPLE | METALLOCENE | ACTIVITY × $10^6$ |
|---|---|---|---|
| Homogeneous | 20 | Me₃SiO-(chain)-Cp₂ZrCl₂ structure | 5.2 |
| Heterogeneous | 27 | | 2.4 |
| Homogeneous | — | TMSO-(chain)-SiMe-(bis-indenyl)ZrCl₂ structure | — |
| Heterogeneous | 30 | | 4.3 |
| Homogeneous | — | TMSO-(chain)-SiMe₂-Cp₂ZrCl₂ structure | — |
| Heterogeneous | 31 | | 0.6 |
| Homogeneous | — | Me₃SiO-(chain)-(indenyl)(Cp)ZrCl₂ structure | — |
| Heterogeneous | 32 | | 1.1 |

TABLE I-continued

| TYPE OF CATALYST | EXAMPLE | METALLOCENE | ACTIVITY × $10^6$ |
|---|---|---|---|
| Homogeneous | — | | — |
| Heterogeneous | 33 | | 0.053 |
| Homogeneous | — | | — |
| Heterogeneous | 34 | | 0.2 |
| Homogeneous | — | | — |
| Heterogeneous | 35 | | 0.2 |
| Homogeneous | 23 | | 0.9 |
| Heterogeneous | — | | |

TABLE I-continued

| TYPE OF CATALYST | EXAMPLE | METALLOCENE | ACTIVITY × 10⁶ |
|---|---|---|---|
| Homogeneous | 24 | 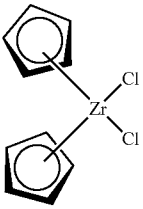 | 8.0 |
| Heterogeneous | 36 | | 0.49 |
| Homogeneous | 21 | | 10 |
| Heterogeneous | 28 | | 1.1 |
| Homogeneous | 25 | 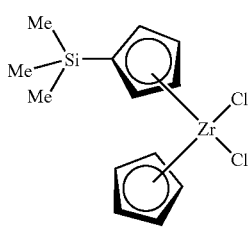 | 16.9 |
| Heterogeneous | 37 | | 1.1 |
| Homogeneous | 22 | 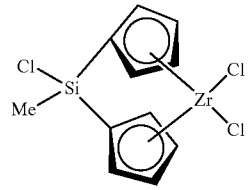 | 1.3 |
| Heterogeneous | 29 | | 0.32 |
| Homogeneous | 26 | 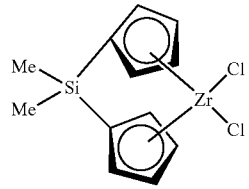 | 2.9 |
| Heterogeneous | 38 | | 0.3 |

TMSO = Trimethylsiloxy

The invention claimed is:

1. A heterogeneous catalytic composition obtained by reacting a nonfunctionalized porous inorganic support with an alumoxane and subsequently supporting at least one metallocene compound thereon, wherein the metallocene compound is defined by formula I, II, or III:

    I

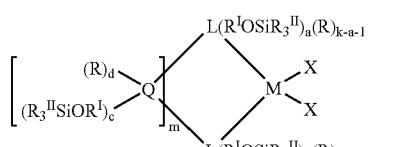
    II

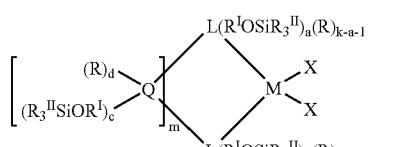
    III wherein:
the L groups are equal to or different from each other, wherein each L is selected from the group consisting of cyclopentadienyl, indenyl, tetrahydroindenyl, fluorenyl, octahydrofluorenyl, and benzoindenyl;
each R is independently hydrogen, linear or branched $C_1$–$C_{20}$ alkyl, linear or branched $C_3$–$C_{20}$ cycloalkyl, linear or branched $C_6$–$C_{20}$ aryl, linear or branched $C_3$–$C_{20}$ alkenyl, linear or branched $C_7$–$C_{20}$ arylalkyl, linear or branched $C_7$–$C_{20}$ alkylaryl, linear or branched $C_8$–$C_{20}$ arylalkenyl, or a group $SiR^{II}3$, wherein the $C_1$–$C_{20}$ alkyl, the $C_3$–$C_{20}$ cycloalkyl, the $C_6$–$C_{20}$ aryl, the $C_3$–$C_{20}$ alkenyl, the $C_6$–$C_{20}$ arylalkyl, the $C_7$–$C_{20}$ alkylaryl, and the $C_8$–$C_{20}$ arylalkenyl are optionally substituted with 1 to 10 halogen atoms;

the $R^I$ groups are equal to or different from each other, wherein each $R^I$ is a divalent aliphatic or aromatic hydrocarbon group containing from 1 to 20 carbon atoms, optionally containing from 1 to 5 heteroatoms of groups 14 to 16 of the Periodic Table of the Elements, and optionally containing boron; wherein the —OSiRII3 group in the formula I is directly bonded to a carbon atom in the $R^I$;

each $R^{II}$ is independently linear or branched $C_1$–$C_{20}$ alkyl, linear or branched $C_3$–$C_{20}$ cycloalkyl, linear or branched $C_6$–$C_{20}$ aryl, linear or branched $C_3$–$C_{20}$ alkenyl, linear or branched $C_7$–$C_{20}$ arylalkyl, linear or branched $C_8$–$C_{20}$ arylalkenyl, or linear or branched $C_7$–$C_{20}$ alkylaryl;

each Q is independently B, C, Si, Ge, or Sn;

M is a lanthanide, an actinide, or a metal of group 3, 4, or 10 of the Periodic Table of the Elements, and M has a valence;

each X is independently hydrogen, chlorine, bromine, ORII, NRII2, $C_1$–$C_{20}$ alkyl, or $C_6$–$C_{20}$ aryl;

L' is N or O;

when L is cyclopentadienyl, k is equal to 5; when L is indenyl, k is equal to 7; when L is fluorenyl or benzoindenyl, k is equal to 9;

when L is tetrahydroindenyl, k is equal to 11; and when L is octahydrofluorenyl, k is equal to 17;

z is equal to 0, 1, or 2;

x is equal to 1, 2, or 3;

y is equal to 1, 2, or 3;

x+y+z is equal to the valence of M;

m is equal to 1, 2, 3 or 4;

a is an integer whose value ranges from 0 to k−1;

b is an integer whose value ranges from 0 to k−1;

f is an integer whose value ranges from 1 to k;

g is equal to 0 or 1;

c is equal to 0 or 1;

e is equal to 0 or 1;

a+b+c is at least 1;

a+g+c is at least 1;

d is equal to 0, 1, or 2;

when Q is B, then c+d=1;

when Q is C, Si, Ge, or Sn, then c+d=2;

when L' is N, then g+e=1; and when L' is 0, then g=0 and e=0.

2. The heterogeneous catalytic system composition according to claim 1 wherein the group $R^IOSiR^{II}_3$ is $CH_2$—$CH_2$—$OSiMe_3$, $CH_2$—$CH_2$—$CH_2$—$OSiMe_3$, $CH_2$—O—$CH_2$—$OSiMe3$, O—$CH_2$—$CH_2$—$OSiMe_3$, $SiMe_2$—$CH_2$—$CH_2$—$OSiMe_3$, $SiMe_2$—$OSiMe_3$, or $SiMe_2$—$CH2$—$CH_2$—$CH_2$—$OSiMe_3$.

3. The heterogeneous catalytic system composition according to claim 1 wherein M is titanium, zirconium, or hafnium.

4. The heterogeneous catalytic system composition according to claim 1 wherein the alumoxane is represented by a formula:

$(RAlO)_n$ or $R(R—Al—O)_{mAlR2}$ wherein R is an alkyl or an aryl group containing from 1 to 20 carbon atoms; n ranges from 1 to 40; and m ranges from 3 to 40.

5. The heterogeneous catalytic system composition according to claim 1 wherein the inorganic support is selected from the group consisting of silica, alumina, silica alumina, aluminum phosphates, and mixtures thereof.

6. The heterogeneous catalytic system composition according to claim 1, wherein M is comprising a transition metal, and wherein the transition metal comprises between 0.01 and 3% by weight of the catalytic composition catalyst system.

7. The heterogeneous catalytic system composition according to claim 6 wherein the transition metal comprises between 0.1 and 1% by weight of the catalytic composition.

8. A process for polymerization of alpha olefins in a slurry or in a gas phase, comprising the step of contacting monomers of the alpha olefins in the presence of the heterogeneous catalytic composition of claim 1.

9. The heterogeneous catalytic composition as claimed in claim 2, wherein M is titanium, zirconium, or hafnium.

10. The heterogeneous catalytic composition as claimed in claim 1, wherein each $R^I$ is linear or branched $C_1$–$C_{20}$ alkylene, linear or branched $C_3$–$C_{20}$ cycloalkylene, linear or branched $C_6$–$C_{20}$ arylene, linear or branched $C_7$–$C_{20}$ alkenyl, linear or branched $C_7$–$C_{20}$, linear or branched arylalkylene, linear or branched alkylarylene, or a group SiRII2.

11. The heterogeneous catalytic composition as claimed in claim 1, wherein $R^{II}$ is methyl, ethyl, or isopropyl.

12. The heterogeneous catalytic composition as claimed in claim 2, wherein $R^{II}$ is methyl, ethyl, or isopropyl.

13. The heterogeneous catalytic composition as claimed in claim 2, wherein the inorganic support is selected from the group consisting of silica, alumina, silica alumina, aluminum phosphates, and mixtures thereof.

14. The heterogeneous catalytic composition as claimed in claim 12, wherein M is titanium, zirconium, or hafnium.

15. The heterogeneous catalytic composition as claimed in claim 2, wherein the alumoxane is represented by a formula:

$(RAlO)_n$ or $R(R—Al—O)_mAlR_2$, wherein R is an alkyl or an aryl group containing from 1 to 20 carbon atoms; n ranges from 1 to 40; and m ranges from 3 to 40.

16. The heterogeneous catalytic composition as claimed in claim 3, wherein the alumoxane is represented by a formula:

$(RAlO)_n$ or $R(R—Al—O)_mAlR_2$, wherein R is an alkyl or an aryl group containing from 1 to 20 carbon atoms; n ranges from 1 to 40; and m ranges from 3 to 40.

17. The heterogeneous catalytic composition as claimed in claim 12, wherein the alumoxane is represented by a formula:

$(RAlO)_n$ or $R(R—Al—O)_mAlR_2$, wherein R is an alkyl or an aryl group containing from 1 to 20 carbon atoms; n ranges from 1 to 40; and m ranges from 3 to 40.

18. The heterogeneous catalytic composition as claimed in claim 2, wherein the inorganic support is selected from the group consisting of silica, alumina, silica alumina, aluminum phosphates, and mixtures thereof.

19. The heterogeneous catalytic composition as claimed in claim 1, wherein m is equal to 1 or 2.

20. A heterogeneous catalytic system obtained by reacting a porous inorganic support selected from the group consisting of silica, alumina, silica alumina, aluminum phosphates, and mixtures thereof with an alumoxane, and then subsequently supporting at least one metallocene compound thereon, wherein the metallocene compound is defined by formula I, II, or III:

$$(LR_k)_z[LR_{k-f}(R^I OSiR^{II}_3)_f]_x MX_y, \qquad \text{I}$$

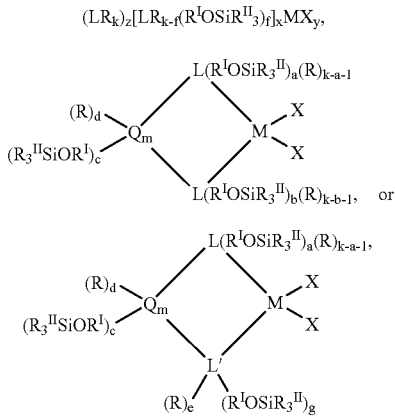

wherein:
- the L groups are equal to or different from each other, wherein each L is selected from the group consisting of cyclopentadienyl, indenyl, tetrahydroindenyl, fluorenyl, octahydrofluorenyl, and benzoindenyl;
- each R is independently hydrogen, linear or branched $C_1$–$C_{20}$ alkyl, linear or branched $C_3$–$C_{20}$ cycloalkyl, linear or branched $C_6$–$C_{20}$ aryl, linear or branched $C_3$–$C_{20}$ alkenyl, linear or branched $C_7$–$C_{20}$ arylalkyl, linear or branched $C_7$–$C_{20}$ alkylaryl, linear or branched $C_8$–$C_{20}$ arylalkenyl, or a group $SiRII3$, wherein the $C_1$–$C_{20}$ alkyl, the $C_3$–$C_{20}$ cycloalkyl, the $C_6$–$C_{20}$ aryl, the $C_3$–$C_{20}$ alkenyl, the $C_7$–$C_{20}$ arylalkyl, the $C_7$–$C_{20}$ alkylaryl, and the $C_8$–$C_{20}$ arylalkenyl are optionally substituted with 1 to 10 halogen atoms;
- the $R^I$ groups are equal to or different from each other, wherein each $R^I$ is a divalent aliphatic or aromatic hydrocarbon group containing from 1 to 20 carbon atoms, optionally containing from 1 to 5 heteroatoms of groups 14 to 16 of the Periodic Table of the Elements, and optionally containing boron; wherein the —OSiRII3 group in the formula I is directly bonded to a carbon atom in the $R^I$; each $R^{II}$ is independently linear or branched $C_1$–$C_{20}$ alkyl, linear or branched $C_3$–$C_{20}$ cycloalkyl, linear or branched $C_6$–$C_{20}$ aryl, linear or branched $C_3$–$C_{20}$ alkenyl, linear or branched $C_7$–$C_{20}$ arylalkyl, linear or branched $C_8$–$C_{20}$ arylalkenyl, or linear or branched $C_7$–$C_{20}$ alkylaryl;
- each Q is independently B, C, Si, Ge, or Sn;
- M is a lanthanide, an actinide, or a metal of group 3, 4, or 10 of the Periodic Table of the Elements, and M has a valence;
- each X is independently hydrogen, chlorine, bromine, ORII, NRII2, $C_1$–$C_{20}$ alkyl, or $C_6$–$C_{20}$ aryl;
- L' is N or O;
- when L is cyclopentadienyl, k is equal to 5; when L is indenyl, k is equal to 7; when L is fluorenyl or benzoindenyl, k is equal to 9; when L is tetrahydroindenyl, k is equal to 11; and when L is octahydrofluorenyl, k is equal to 17;
- z is equal to 0, 1, or 2;
- x is equal to 1, 2, or 3;
- y is equal to 1, 2, or 3;
- x+y+z is equal to the valence of M;
- m is equal to 1, 2, 3 or 4;
- a is an integer whose value ranges from 0 to k−1;
- b is an integer whose value ranges from 0 to k−1;
- f is an integer whose value ranges from 1 to k;
- g is equal to 0 or 1;
- c is equal to 0 or 1;
- e is equal to 0 or 1;
- a+b+c is at least 1;
- a+g+c is at least 1;
- d is equal to 0, 1, or 2;
- when Q is B, then c+d=1;
- when Q is C, Si, Ge, or Sn, then C+d=2;
- when L' is N, then g+e =1; and
- when L' is O, then g=0 and e=0.

21. A process for polymerization of alpha olefins in a slurry or in a gas phase, comprising the step of contacting monomers of the alpha olefins in the presence of the heterogeneous catalytic composition of claim 20.

22. The heterogeneous catalytic system claimed in claim 20, wherein the supported metallocene compound is selected from the group consisting of:
- [(3-trimethylsiloxypropyl)methylsilylen]bis indenyl zirconium dichloride;
- [(1,1-dimethyl-1-sila-4-trimethylsiloxybutyl)cyclopentadienyl]cyclopentadienyl zirconium dichloride;
- [1-(3-trimethylsiloxypropyl)indenyl]cyclopentadienyl zirconium dichloride;
- dimethylsilylen [3-(2-trimethylsiloxyethyl)cyclopentadienyl]indenyl zirconium dichloride;
- dimethylsilylen [3-(2-trimethylsiloxyethyl)cyclopentadienyl]cyclopentadienyl zirconium dichloride;
- [1-(2-trimethylsiloxyethyl)indenyl]cyclopentadienyl zirconium dichioride;
- [1-(2-trimethylsiloxyethyl)indenyl]pentamethylcyclopentadienyl zirconium dichloride;
- (3-trimethylsiloxypropycyclopentadienyl)(cyclopentadienyl) zirconium dichloride;
- (3-trimethylsiloxypropyl)methylsilylen]bis(1-indenyl) zirconium dichloride;
- [(1,1-dimethyl-1-sila-4-trimethylsiloxybutyl)-cyclopentadienyl]cyclopentadienyl zirconium dichloride;
- dimethylsilylen(trimethylsiloxyethyl-3-cyclopentadienyl) (1-indenyl) zirconium dichloride; and
- dimethylsilylen(trimethylsiloxyethyl-3-cyclopentadienyl) (cyclopentadienyl) zirconium dichloride.

23. The heterogeneous catalytic system claimed in claim 21, wherein m is equal to 1.

24. The heterogeneous catalytic system claimed in claim 20, wherein, prior to being reacted with the alumoxane and prior to supporting the metallocene compound, the inorganic support is not functionalized.

25. The heterogeneous catalytic system as claimed in claim 20, wherein m is equal to 1 or 2.

26. The heterogeneous catalytic system claimed in claim 20, wherein each $R^I$ in the formula I is a divalent or aromatic hydrocarbon group containing from 1 to 20 carbon atoms, wherein each $R^I$ in the formula I does not contain any boron.

27. The heterogeneous catalytic system claimed in claim 20, wherein the supported metallocene compound is selected from the group consisting of:

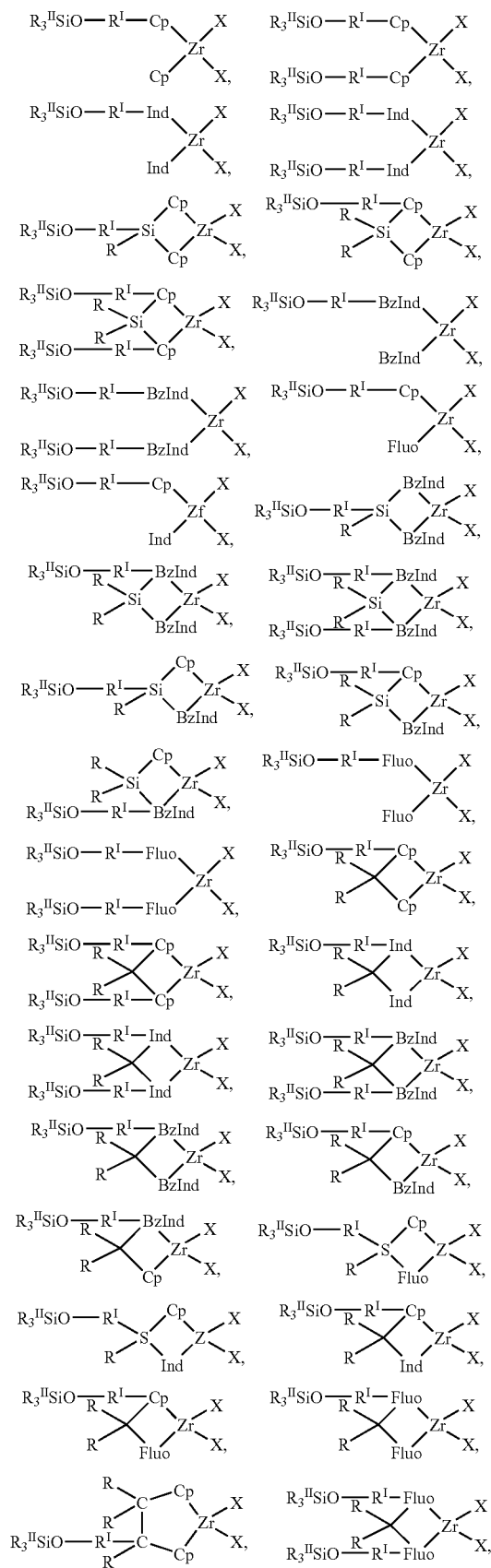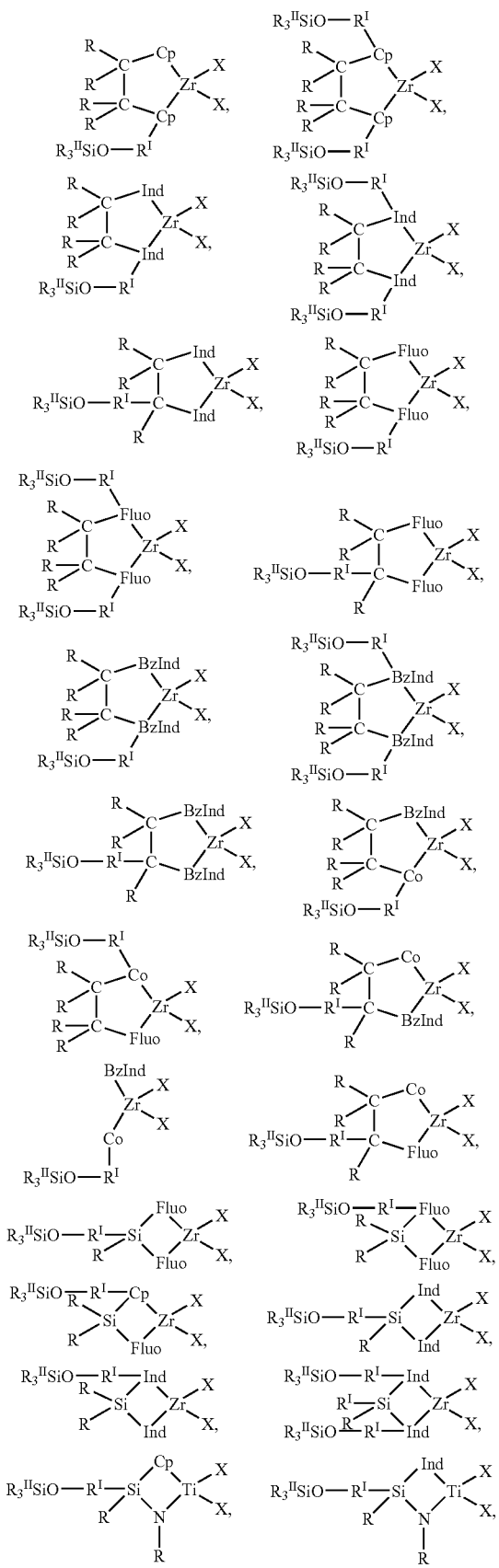

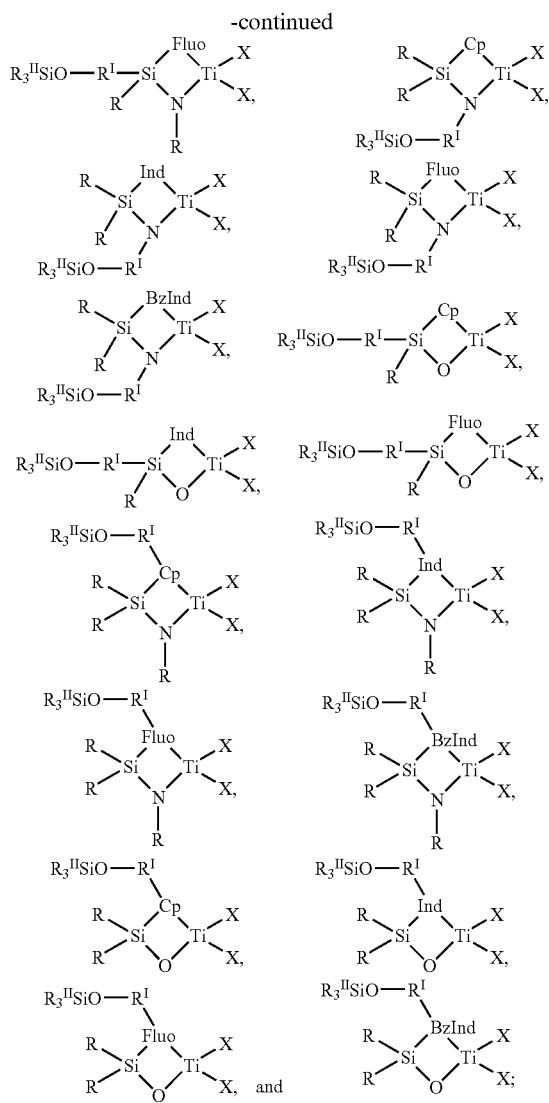

wherein Cp is a cyclopentadienyl ring that is optionally substituted with $C_1$–$C_{20}$ alkyl, $C_3$–$C_{20}$ cycloalkyl, $C_6$–$C_{20}$ aryl, $C_3$–$C_{20}$ alkenyl, $C_7$–$C_{20}$ arylalkyl, $C_8$–$C_{20}$ arylalkenyl, or $C_7$–$C_{20}$ alkyaryl;

wherein Ind is an indenyl ring that is optionally substituted with $C_1$–$C_{20}$ alkyl, $C_3$–$C_{20}$ cycloalkyl, $C_6$–$C_{20}$ aryl, $C_3$–$C_{20}$ alkenyl, $C_7$–$C_{20}$ arylalkyl, $C_8$–$C_{20}$ arylalkenyl, or $C_7$–$C_{20}$ alkyaryl;

wherein BzInd is a benzoindenyl ring that is optionally substituted with $C_1$–$C_{20}$ alkyl, $C_3$–$C_{20}$ cycloalkyl, $C_6$–$C_{20}$ aryl, $C_3$–$C_{20}$ alkenyl, $C_7$–$C_{20}$ arylalkyl, $C_8$–$C_{20}$ arylalkenyl, or $C_7$–$C_{20}$ alkyaryl;

and wherein Fluo is a fluorenyl ring that is optionally substituted with $C_1$–$C_{20}$ alkyl, $C_3$–$C_{20}$ cycloalkyl, $C_6$–$C_{20}$ aryl, $C_3$–$C_{20}$ alkenyl, $C_7$–$C_{20}$ arylalkyl, $C_8$–$C_{20}$ arylalkenyl, or $C_7$–$C_{20}$ alkyaryl.

28. The heterogeneous catalytic system claimed in claim 20, wherein the supported metallocene compound is selected from the group consisting of:

bis(trimethylsiloxyethyl-cyclopentadienyl) zirconium dichloride;
(trimethylsiloxyethyl-cyclopentadienyl)(cyclopentadienyl) zirconium dichloride;
(trimethylsiloxyethyl-cyclopentadienyl)(indenyl) zirconium dichloride;
(trimethylsiloxyethyl-cyclopentadienyl)(2-methyl-indenyl) zirconium dichloride;
(trimethylsiloxyethyl-cyclopentadienyl)(fluorenyl) zirconium dichloride;
(trimethylsiloxyethyl-cyclopentadienyl)(9-methyl-fluorenyl) zirconium dichloride;
(trimethylsiloxyethyl-cyclopentadienyl)(pentamethylcyclopentadienyl) zirconium dichloride;
[1-(2-trimethylsiloxyethyl)indenyl](cyclopentadienyl) zirconium dichloride;
[1-(2-methylsiloxyethyl)indenyl](pentamethyl cyclopentadienyl) zirconium dichloride;
bis(trimethylsiloxypropyl-cyclopentadienyl) zirconium dichloride;
(trimethylsiloxypropyl-cyclopentadienyl)(cyclopentadienyl) zirconium dichloride;
(trimethylsiloxypropyl-cyclopentadienyl)(indenyl) zirconium dichloride;
(trimethylsiloxypropyl-cyclopentadienyl)(2-methyl-indenyl) zirconium dichloride;
(trimethylsiloxypropyl-cyclopentadienyl)(fluorenyl) zirconium dichloride;
(trimethylsiloxypropyl-cyclopentadienyl)(9-methyl-fluorenyl) zirconium dichloride;
(trimethylsiloxypropyl-cyclopentadienyl)(pentamethyl-cyclopentadienyl) zirconium dichloride;
[1-(3-trimethylsiloxypropyl)indenyl](cyclopentadienyl) zirconium dichloride;
bis(trimethylsiloxy-methoxy-cyclopentadienyl) zirconium dichloride;
(trimethylsioxy-methoxy-cyclopentadienyl)(cyclopentadienyl) zirconium dichloride
(trimethylsiloxy-methoxy-cyclopentadienyl)(indenyl) zirconium dichloride;
(trimethylsiloxy-methoxy-cyclopentadienyl)(2-methyl-indenyl) zirconium dichloride;
(trimethylsiloxy-methoxy-cyclopentadienyl)(fluorenyl) zirconium dichloride;
(trimethylsiloxy-methoxy-cyclopentadienyl)(9-methyl-fluorenyl) zirconium dichloride;
(trimethylsiloxy-methoxy-cyclopentadienyl)(pentamethylcyclopentadienyl) zirconium dichloride;
bis(trimethylsiloxy-ethoxy-cyclopentadienyl) zirconium dichloride;
(trimethylsiloxy-ethoxy-cyclopentadienyl)(cyclopentadienyl) zirconium dichloride
(trimethylsiloxy-ethoxy-cyclopentadienyl)(1-indenyl) zirconium dichloride;
(trimethylsiloxy-ethoxy-cyclopentadienyl)(2-methyl-indenyl) zirconium dichloride;
(trimethylsiloxy-ethoxy-cyclopentadienyl)(fluorenyl) zirconium dichloride;
(trimethylsiloxy-ethoxy-cyclopentadienyl)(9-methyl-fluorenyl) zirconium dichloride;
(trimethyzsiloxy-ethoxy-cyclopentadienyl)(pentamethyl-cyclopentadienyl) zirconium dichdoride;
bis(trimethylsiloxy-ethyl-(dimethyl)silyl-cyclopentadienyl) zirconium dichloride;
(trimethylsiloxy-ethyl-cyclopentadienyl)(cyclopentadienyl) zirconium dichloride;
(trimethylsiloxy-propyl-(dimethyl)silyl-cyclopentadienyl)(cyclopentadienyl) zirconium dichloride;
(trimethylsiloxy-ethyl-(dimethyl)silyl-cyclopentadienyl)(indenyl) zirconium dichloride;

(trimethylsiloxy-ethyl-(dimethyl)silyl-cyclopentadienyl)
(2-methyl-indenyl) zirconium dichloride;
(trimethylsiloxy-ethyl-(dimethyl)silyl-cyclopentadienyl)
(fluorenyl) zirconium dichloride;
(trimethylsiloxy-ethyl-(dimethyl)silyl-cyclopentadienyl)
(9-methyl-fluorenyl) zirconium dichloride;
(trimethylsiloxy-ethyl-(dimethyl)silyl-cyclopentadienyl)
(pentamethylcyclopentadienyl) zirconium dichloride;
bis(trimethylsiloxy-(dimethyl)silyl-cyclopentadienyl) zirconium dichloride;
(trimethylsiloxy-(dimethyl)silyl-cyclopentadienyl)(cyclopentadienyl) zirconium dichloride;
dimethylsilandiylbis(2-trimethylsiloxyethyl-cyclopentadienyl) zirconium dichloride;
dimethylsilandiylbis(3-trimethylsiloxyethyl-cyclopentadienyl) zirconium dichloride;
dimethylsilandiyl(3-trimethylsiloxyethyl-cyclopentadienyl)(cyclopentadienyl)zirconium dichloride;
dimethylsilandiyl(2-trimethylsiloxyethyl-cyclopentadienyl)(1-indenyl) zirconium dichloride;
dimethylsilandiyl(3-trimethylsiloxyethyl-cyclopentadienyl)(1-indenyl) zirconium dichloride;
dimethylsilandiyl(1-(3-trimethylsiloxyethyl-indenyl))(ciclopentadienyl) zirconium dichloride;
dimethylsilandiyl(2-trimethylsiloxyethyl-cyclopentadienyl)(1-(2-methyl-indenyl)) zirconium dichloride;
dimethylsilandiyl(3-trimethylsiloxyethyl-cyclopentadienyl)(1-(2-methyl-indenyl)) zirconium dichloride;
dimethylsilandiyl(2-trimethylsiloxyethyl-cyclopentadienyl)(9-fluorenyl) zirconium dichloride;
dimethylsilandiyl(3-trimethylsiloxyethyl-cyclopentadienyl)(9-fluorenyl) zirconium dichloride;
dimethylsilandiyl(2-trimethylsiloxyethyl-cyclopentadienyl)(9-(2-methyl-fluorenyl)) zirconium dichloride;
dimethylsilandiyl(3-trimethylsiloxyethyl-cyclopentadienyl)(9-(2-methyl-fluorenyl)) zirconium dichloride;
dimethylsilandiyl(3-trimethylsiloxyethyl-cyclopentadienyl)(1-(2-methylbenzoindenyl)) zirconium dichloride;
dimethylsilandiylbis(2-trimethylsiloxypropyl-cyclopentadienyl) zirconium dichloride;
dimethylsilandiylbis(3-trimethylsiloxypropyl-cyclopentadienyl) zirconium dichloride;
dimethylsilandiyl(3-trimethylsiloxypropyl-cyclopentadienyl)(cyclopentadienyl) zirconium dichloride;
dimethylsilandiyl(1-(3-trimethylsiloxypropyl-indenyl))(ciclopentadienyl) zirconium dichloride;
dimethylsilandiyl(2-trimethylsiloxypropyl-cyclopentadienyl)(1-indenyl) zirconium dichloride;
dimethylsilandiyl(3-trimethylsiloxypropyl-cyclopentadienyl)(1-indenyl) zirconium dichloride;
dimethylsilandiyl(2-trimethylsiloxypropyl-cyclopentadienyl)(1-(2-methyl-indenyl)) zirconium dichloride;
dimethylsilandiyl(3-trimethylsiloxypropyl-cyclopentadienyl)(1-(2-methyl-indenyl)) zirconium dichloride;
dimethylsilandiyl(2-trimethylsiloxypropyl-cyclopentadienyl)(9-fluorenyl) zirconium dichloride;
dimethylsilandiy(3-trimethylsiloxypropyl-cyclopentadienyl)(9-fluorenyl) zirconium dichloride;
dimethylsilandiyl(2-trimethylsiloxypropyl-cyclopentadienyl)(9-(2-methyl-fluorenyl)) zirconium dichloride;
dimethylsilandiyl(3-trimethylsiloxypropyl-cyclopentadienyl)(9-(2-methyl-fluorenyl)) zirconium dichloride;
dimethylsilandiyl(3-trimethylsiloxypropyl-cyclopentadienyl)(1-(2-methylbenzoindenyl)) zirconium dichloride;
dimethylsilandiylbis(2-trimethylsiloxy-methoxy-cyclopentadienyl) zirconium dichloride;
dimethylsilandiylbis(3-trimethylsiloxy-methoxy-cyclopentadienyl) zirconium dichloride;
dimethylsilandiyl(2-trimethylsiloxy-methoxy-cyclopentadienyl)(1-indenyl) zirconium dichloride;
dimethylsilandiyi(3-trimethylsiloxy-methoxy-cyclopentadienyl)(1-indenyl) zirconium dichloride;
dimethylsilandiyl(2-trimethylsiloxy-methoxy-cyclopentadienyl)(1-(2-methyl-indenyl)) zirconium dichloride;
dimethylsilandiyl(3-trimethylsiloxy-methoxy-cyclopentadienyl)(1-(2-methyl-indenyl)) zirconium dichloride;
dimethylsilandiyl(2-trimethylsiloxy-methoxy-cyclopentadienyl)(9-fluorenyl) zirconium dichloride;
dimethylsilandiyl(3-trimethylsiloxy-methoxy-cyclopentadienyl)(9-fluorenyl) zirconium dichloride;
dimethylsilandiyl(2-trimethylsiloxy-methoxy-cyclopentadienyl)(9-(2-methyl-fluorenyl)) zirconium dichloride;
dimethylsilandiyl(3-trimethylsiloxy-methoxy-cyclopentadienyl)(9-(2-methyl-fluorenyl)) zirconium dichloride;
dimethylsilandiylbis(2-trimethylsiloxy-ethoxy-cyclopentadienyl) zirconium dichloride;
dimethylsilandiylbis(3-trimethylsiloxy-ethoxy-cyclopentadienyl) zirconium dichloride;
dimethylsilandiyl(2-trimethylsiloxy-ethoxy-cyclopentadienyl)(1-indenyl) zirconium dichloride;
dimethylsilandiy(3-trimethylsiloxy-ethoxy-cyclopentadienyl)(1-indenyl) zirconium dichloride;
dimethylsilandiyl(2-trimethylsiloxy-ethoxy-cyclopentadienyl)(1-(2-methyl-indenyl)) zirconium dichloride;
dimethylsilandiyl(3-trimethylsiloxy-ethoxy-cyclopentadienyl)(1-(2-methyl-indenyl)) zirconium dichloride;
dimethylsilandiyl(2-trimethylsiloxy-ethoxy-cyclopentadienyl)(9-fluorenyl) zirconium dichloride;
dimethylsilandiyl(3-trimethylsiloxy-ethoxy-cyclopentadienyl)(9-fluorenyl) zirconium dichloride;
dimethylsilandiyl(2-trimethylsiloxy-ethoxy-cyclopentadienyl)(9-(2-methyl-fluorenyl)) zirconium dichloride;
dimethylsilandiyl(3-trimethylsiloxy-ethoxy-cyclopentadienyl)(9-(2-methyl-fluorenyl)) zirconium dichloride;
dimethylsilandiylbis(2-(trimethylsiloxy-ethyl-(dimethyl)silyl)-cyclopentadienyl) zirconium dichloride;
dimethylsilandiylbis(3-(trimethylsiloxy-ethyl-(dimethyl)silyl)-cyclopentadienyl) zirconium dichloride;
dimethylsilandiyl(2-(trimethylsiloxy-ethyl-(dimethyl)silyl)-cyclopentadienyl)(1-indenyl) zirconium dichloride;
dimethylsilandiyl(3-(trimethylsiloxy-ethyl-(dimethyl)silyl)-cyclopentadienyl)(1-indenyl) zirconium dichloride;
dimethylsilandiyl(2-(trimethylsiloxy-ethyl-(dimethyl)silyl)-cyclopentadienyl)(1-(2-methyl-indenyl)) zirconium dichloride;
dimethylsilandiyl(3-(trimethylsiloxy-ethyl-(dimethyl)silyl)-cyclopentadienyl)(1-(2-methyl-indenyl)) zirconium dichloride;
dimethylsilandiyl(2-(trimethysiloxy-ethyl-(dimethyl)silyl)-cyclopentadienyl)(9-fluorenyl) zirconium dichloride;
dimethylsilandiyl(3-(trimethylsiloxy-ethyl-(dimethyl)silyl)-cyclopentadienyl)(9-fluorenyl) zirconium dichloride;
dimethylsilandiyl(2-trimethylsiloxy-ethyl-(dimethyl)silyl)-cyclopentadienyl(9-(2-methyl-fluorenyl)) zirconium dichloride;

dimethylsilandiyl(3-(trimethylsiloxy-ethyl-(dimethyl)silyl)-cyclopentadienyl)(9-(2-methyl-fluorenyl)) zirconium dichloride;
dimethylsilandiyl(3-(trimethylsiloxy-(dimethyl)silyl)-cyclopentadienyl)(1-indenyl) zirconium dichloride;
dimethylsilandiyl(3-(trimethylsiloxy-(dimethyl)silyl)-cyclopentadienyl)(1-(2-methylbenzoindenyl)) zirconium dichloride;
dimethylsilandiylbis(1-(3-trimethylsiloxy-(dimethyl)silyl)-indenyl) zirconium dichloride;
dimethylsilandiyl(1-(3-trimethylsiloxy-(dimethyl)silyl)-indenyl)(1-indenyl)zirconium dichloride;
isopropylidenebis(2-trimethylsiloxyethyl-cyclopentadienyl) zirconium dichloride;
isopropylidenebis(3-trimethylsiloxyethyl-cyclopentadienyl) zirconium dichloride;
isopropylidene(2-trimethylsiloxyethyl-cyclopentadienyl)(1-indenyl) zirconium dichloride;
isopropylidene(3-trimethylsiloxyethyl-cyclopentadienyl)(1-indenyl) zirconium dichloride;
isopropylidene(1-(3-trimethylsiloxyethyl-indenyl)(ciclopentadienyl) zirconium dichloride;
isopropylidene(2-trimethylsiloxyethyl-cyclopentadienyl)(1-(2-methyl-indenyl)) zirconium dichloride;
isopropylidene(3-trimethylsiloxyethyl-cyclopentadienyl)(1-(2-methyl-indenyl)) zirconium dichloride;
isopropylidene(2-trimethylsiloxyethyl-cyclopentadienyl)(9-fluorenyl) zirconium dichloride;
isopropylidene(3-trimethylsiloxyethyl-cyclopentadienyl)(9-fluorenyl) zirconium dichloride;
isopropylidene(2-trimethylsiloxyethyl-cyclopentadienyl)(9-(2-methyl-fluorenyl)) zirconium dichloride;
isopropylidene(3-trimethylsiloxyethyl-cyclopentadienyl)(9-(2-methyl-fluorenyl)) zirconium dichloride;
isopropylidene(3-trimethylsiloxyethyl-cyclopentadienyl)(1-(2methylbenzoindenyl)) zirconium dichloride;
isopropylidenebis(2-trimethylsiloxypropyl-cyclopentadienyl) zirconium dichloride;
isopropylidenebis(3-trimethylsiloxypropyl-cyclopentadienyl) zirconium dichloride;
isopropylidene(2-trimethylsiloxypropyl-cyclopentadienyl)(1-indenyl) zirconium dichloride;
isopropylidene(3-trimethylsiloxypropyl-cyclopentadienyl)(1-indenyl) zirconium dichloride;
isopropylidene(1-(3-trimethylsiloxypropyl-indenyl)(cicopentadienyl) zirconium dichloride;
isopropylidene(2-trimethylsiloxypropyl-cyclopentadienyl)(1-(2-methyl-indenyl)) zirconium dichloride;
isopropylidene(3-trimethylsiloxypropyl-cyclopentadienyl)(1-(2-methyl-indenyl)) zirconium dichloride;
isopropylidene(2-trimethylsiloxypropyl-cyclopentadienyl)(9-fluorenyl) zirconium dichloride;
isopropylidene(3-trimethylsiloxypropyl-cyclopentadienyl)(9-fluorenyl) zirconium dichloride;
isopropylidene(2-trimethylsiloxypropyl-cyclopentadienyl)(9-(2-methyl-fluorenyl) zirconium dichloride;
isopropylidene(3-trimethylsiloxypropyl-cyclopentadienyl)(9-(2-methyl-fluorenyl)) zirconium dichloride;
isopropylidene(3-trimethylsiloxypropyl-cyclopentadienyl)(1-(2methylbenzoindenyl)) zirconium dichloride;
isopropylidenebis(2-(trimethylsiloxy-methoxy)-cyclopentadienyl) zirconium dichloride;
isopropylidenebis(3-(trimethylsiloxy-methoxy)-cyclopentadienyl) zirconium dichloride;
isopropylidene(2-(trimethylsiloxy-methoxy)-cyclopentadienyl)(1-indenyl) zirconium dichloride;
isopropylidene(3-(trimethylsiloxy-methoxy)-cyclopentadienyl)(1-indenyl) zirconium dichloride;
isopropylidene(2-(trimethylsiloxy-methoxy)-cyclopentadienyl)(1-(2-methyl-indenyl)) zirconium dichloride;
isopropylidene(3-(trimethylsiloxy-methoxy)-cyclopentadienyl)(1-(2-methyl-indenyl)) zirconium dichloride;
isopropylidene(2-(trimethylsiloxy-methoxy)-cyclopentadienyl)(9-fluorenyl) zirconium dichloride;
isopropylidene(3-(trimethylsiloxy-methoxy)-cyclopentadienyl)(9-fluorenyl) zirconium dichloride;
isopropylidene(2-(trimethylsiloxy-methoxy)-cyclopentadienyl)(9-(2-methyl-fluorenyl)) zirconium dichloride;
isopropylidene(3-(trimethylsiloxy-methoxy)-cyclopentadienyl)(9-(2-methyl-fluorenyl)) zirconium dichloride;
isopropylidenebis(2-(trimethylsiloxy-ethoxy)-cyclopentadienyl) zirconium dichloride;
isopropylidenebis(3-(trimethylsiloxy-ethoxy)-cyclopentadienyl) zirconium dichloride;
isopropylidene(2-(trimethylsiloxy-ethoxy)-cyclopentadienyl)(1-indenyl) zirconium dichloride;
isopropylidene(3-(trimethylsiloxy-ethoxy)-cyclopentadienyl)(1-indenyl) zirconium dichloride;
isopropylidene(2-(trimethylsiloxy-ethoxy)-cyclopentadienyl)(1-(2-methyl-indenyl)) zirconium dichloride;
isopropylidene(3-(trimethylsiloxy-ethoxy)-cyclopentadienyl)(1-(2-methyl-indenyl)) zirconium dichloride;
isopropylidene(2-(trimethylsiloxy-ethoxy)-cyclopentadienyl)(9-fluorenyl) zirconium dichloride;
isopropylidene(3-(trimethylsiloxy-ethoxy)-cyclopentadienyl)(9-fiuorenyl) zirconium dichloride;
isopropylidene(2-(trimethylsiloxy-ethoxy)-cyclopentadienyl)(9-(2-methyl-fluorenyl)) zirconium dichloride;
isopropylidene(3-(trimethylsiloxy-ethoxy)-cyclopentadienyl)(9-(2-methyl-fluorenyl)) zirconium dichloride;
isopropylidenebis(2-(trimethylsiloxy-ethyl-(dimethyl)silyl)-cyclopentadienyl) zirconium dichloride;
isopropylidenebis(3-(trimethylsiloxy-ethyl-(dimethyl)silyl)-cyclopentadienyl) zirconium dichloride;
isopropylidene(2-(trimethylsiloxy-ethyl-(dimethyl)silyl)-cyclopentadienyl)(1-indenyl) zirconium dichloride;
isopropylidene(3-(trimethylsiloxy-ethyl-(dimethyl)silyl)-cyclopentadienyl)(1-indenyl) zirconium dichloride;
isopropylidene(2-(trimethylsiloxy-ethyl-(dimethyl)silyl)-cyclopentadienyl)(1-(2-methyl-indenyl)) zirconium dichloride;
isopropylidene(3-(trimethylsiloxy-ethyl-(dimethyl)silyl)-cyclopentadienyl)(1-(2-methyl-indenyl)) zirconium dichloride;
isopropylidene(2-(trimethylsiloxy-ethyl-(dimethyl)silyl)-cyclopentadienyl)(9-fluorenyl) zirconium dichloride;
isopropylidene(3-(trimethylsiloxy-ethyl-(dimethyl)silyl)-cyclopentadienyl)(9-fluorenyl) zirconium dichloride;
isopropylidene(2-(trimethylsiloxy-ethyl-(dimethyl)silyl)-cyclopentadienyl)(9-(2-methyl-fluorenyl)) zirconium dichloride;
isopropylidene(3-(trimethylsiloxy-ethyl-(dimethyl)silyl)-cyclopentadienyl)(9-(2-methyl-fluorenyl)) zirconium dichloride;
isopropylidene(3-(trimethylsiloxy-(dimethyl)silyl)-cyclopentadienyl)(1-indenyl) zirconium dichloride;
isopropylidene(3-(trimethylsiloxy-(dimethyl)silyl)-cyclopentadienyl)(1-(2-methylbenzoindenyl)) zirconium dichloride;
ethylidenebis(2-trimethylsiloxyethyl-cyclopentadienyl) zirconium dichloride;
ethylidenebis(3-trimethylsiloxyethyl-cyclopentadienyl) zirconium dichloride;

ethylidene(3-trimethylsiloxyethyl-cyclopentadienyl)(cyclopentadienyl) zirconium dichloride;
ethylidene(2-trimethylsiloxyethyl-cyclopentadienyl)(1-indenyl) zirconium dichloride;
ethylidene(3-trimethylsiloxyethyl-cyclopentadienyl)(1-indenyl) zirconium dichloride;
ethylidene(1-(3-trimethylsiloxyethyl-indenyl))(ciclopentadienyl) zirconium dichloride;
ethylidene(2-trimethylsiloxyethyl-cyclopentadienyl)(1-(2-methyl-indenyl)) zirconium dichloride;
ethylidene(3-trimethylsiloxyethyl-cyclopentadienyl)(1-(2-methyl-indenyl)) zirconium dichloride;
ethylidene(2-trimethylsiloxyethyl-cyclopentadienyl)(9-fluorenyl) zirconium dichloride;
ethylidene(3-trimethylsiloxyethyl-cyclopentadienyl)(9-fluorenyl) zirconium dichloride;
ethylidene(2-trimethylsiloxyethyl-cyclopentadienyl)(9-(2-methyl-fluorenyl)) zirconium dichloride;
ethylidene(3-trimethylsiloxyethyl-cyclopentadienyl)(9-(2-methyl-fluorenyl)) zirconium dichloride;
ethylidenebis(2-trimethylsiloxypropyl-cyclopentadienyl) zirconium dichloride;
ethylidenebis(3-trimethylsiloxypropyl-cyclopentadienyl) zirconium dichloride;
ethylidene(3-trimethylsiloxypropyl-cyclopentadienyl)(cyclopentadienyl) zirconium dichloride;
ethylidene(2-trimethylsiloxypropyl-cyclopentadienyl)(1-indenyl) zirconium dichloride;
ethylidene(3-trimethylsiloxypropyl-cyclopentadienyl)(1-indenyl) zirconium dichloride;
ethylidene(1-(3-trimethylsiloxypropyl-indenyl))(ciclopentadienyl) zirconium dichloride;
ethylidene(2-trimethylsiloxypropyl-cyclopentadienyl)(1-(2-methyl-indenyl)) zirconium dichloride;
ethylidene(3-trimethylsiloxypropyl-cyclopentadienyl)(1-(2-methyl-indenyl)) zirconium dichloride;
ethylidene(2-trimethylsiloxypropyl-cyclopentadienyl)(9-fluorenyl) zirconium dichloride;
ethylidene(3-trimethylsiloxypropyl-cyclopentadienyl)(9-fluorenyl) zirconium dichloride;
ethylidene(2-trimethylsiloxypropyl-cyclopentadienyl)(9-(2-methyl-fluorenyl)) zirconium dichloride;
ethylidene(3-trimethylsiloxypropyl-cyclopentadienyl)(9-(2-methyl-fluorenyl)) zirconium dichloride;
ethylidenebis(2-(trimethylsiloxy-methoxy)-cyclopentadienyl) zirconium dichloride;
ethylidenebis(3-(trimethylsiloxy-methoxy)-cyclopentadienyl) zirconium dichloride;
ethylidene(2-(trimethylsiloxy-methoxy)-cyclopentadienyl)(1-indenyl) zirconium dichloride;
ethylidene(3-(trimethylsiloxy-methoxy)-cyclopentadienyl)(1-indenyl) zirconium dichloride;
ethylidene(2-(trimethylsiloxy-methoxy)-cyclopentadienyl)(1-(2-methyl-indenyl)) zirconium dichloride;
ethylidene(3-(trimethylsiloxy-methoxy)-cyclopentadienyl)(1-(2-methyl-indenyl)) zirconium dichloride;
ethylidene(2-(trimethylsiloxy-methoxy)-cyclopentadienyl)(9-fluorenyl) zirconium dichloride;
ethylidene(3-(trimethylsiloxy-methoxy)-cyclopentadienyl)(9-fluorenyl) zirconium dichloride;
ethylidene(2-(trimethylsiloxy-methoxy)-cyclopentadienyl)(9-(2-methyl-fluorenyl)) zirconium dichloride;
ethylidene(3-(trimethylsiloxy-methoxy)-cyclopentadienyl)(9-(2-methyl-fluorenyl)) zirconium dichloride;
ethylidenebis(2-(trimethylsiloxy-ethoxy)-cyclopentadienyl) zirconium dichloride;
ethylidenebis(3-(trimethylsiloxy-ethoxy)-cyclopentadienyl) zirconium dichloride;
ethylidene(2-(trimethylsiloxy-ethoxy)-cyclopentadienyl)(1-indenyl) zirconium dichloride;
ethylidene(3-(trimethylsiloxy-ethoxy)-cyclopentadienyl)(1-indenyl) zirconium dichloride;
ethylidene(2-(trimethylsiloxy-ethoxy)-cyclopentadienyl)(1-(2-methyl-indenyl)) zirconium dichloride;
ethylidene(3-(trimethylsiloxy-ethoxy)-cyclopentadienyl)(1-(2-methyl-indenyl)) zirconium dichloride;
ethylidene(2-(trimethylsiloxy-ethoxy)-cyclopentadienyl)(9-fluorenyl) zirconium dichloride;
ethylidene(3-(trimethylsiloxy-ethoxy)-cyclopentadienyl)(9-fluorenyl) zirconium dichloride;
ethylidene(2-(trimethylsiloxy-ethoxy)-cyclopentadienyl)(9-(2-methyl-fluorenyl)) zirconium dichloride;
ethylidene(3-(trimethylsiloxy-ethoxy)-cyclopentadienyl)(9-(2-methyl-fluorenyl)) zirconium dichloride;
ethylidenebis(2-(trimethylsiloxy-ethyl-(dimethyl)silyl)-cyclopentadienyl) zirconium dichloride;
ethylidenebis(3-(trimethylsiloxy-ethyl-(dimethyl)silyl)-cyclopentadienyl) zirconium dichloride;
ethylidene(2-(trimethylsiloxy-ethyl-(dimethyl)silyl)-cyclopentadienyl)(1-indenyl) zirconium dichloride;
ethylidene(3-(trimethylsiloxy-ethyl-(dimethyl)silyl)-cyclopentadienyl)(1-indenyl) zirconium dichloride;
ethylidene(2-(trimethylsiloxy-ethyl-(dimethyl)silyl)-cyclopentadienyl)(1-(2-methyl-indenyl)) zirconium dichloride;
ethylidene(3-(trimethylsiloxy-ethyl-(dimethyl)silyl)-cyclopentadienyl)(1-(2-methyl-indenyl)) zirconium dichloride;
ethylidene(2-(trimethylsiloxy-ethyl-(dimethyl)silyl)-cyclopentadienyl)(9-fluorenyl) zirconium dichloride;
ethylidene(3-(trimethylsiloxy-ethyl-(dimethyl)silyl)-cyclopentadienyl)(9-fluorenyl) zirconium dichloride;
ethylidene(2-(trimethylsiloxy-ethyl-(dimethyl)silyl)-cyclopentadienyl)(9-(2-methyl-fluorenyl)) zirconium dichloride;
ethylidene(3-(trimethylsiloxy-ethyl-(dimethyl)silyl)-cyclopentadienyl)(9-(2-methyl-fluorenyl)) zirconium dichloride;
dimethylsilandiylbis(1-(2-trimethylsiloxyethyl-indenyl)) zirconium dichloride;
dimethylsilandiylbis(1-(3-trimethylsiloxyethyl-indenyl)) zirconium dichloride;
dimethylsilandiyl(1-(2-trimethylsiloxyethyl-indenyl))(1-indenyl) zirconium dichloride;
dimethylsilandiyl(1-(3-trimethylsiloxyethyl-indenyl))(1-indenyl) zirconium dichloride;
dimethylsilandiyl(1-(2-trimethylsiloxyethyl-indenyl))(1-(2-methyl-indenyl)) zirconium dichloride;
dimethylsilandiyi(1-(3-trimethylsiloxyethyl-indenyl))(1-(2-methyl-indenyl)) zirconium dichloride;
dimethylsilandiyl(1-(2-trimethylsiloxyethyl-indenyl))(9-fluorenyl) zirconium dichloride;
dimethylsilandiyl(1-(3-trimethylsiloxyethyl-indenyl))(9-fluorenyl) zirconium dichloride;
dimethylsilandiyl(1-(2-trimethylsiloxyethyl-indenyl))(9-(2-methyl-fluorenyl)) zirconium dichloride;
dimethylsilandiyl(1-(3-trimethylsiloxyethyl-indenyl))(9-(2-methyl-fluorenyl)) zirconium dichloride;
dimethylsilandiylbis(1-(2-trimethylsiloxypropyl-indenyl)) zirconium dichloride;
dimethylsilandiylbis(1-(3-trimethylsiloxypropyl-indenyl)) zirconium dichloride;

dimethylsilandiyl(1-(2-trimethylsiloxypropyl-indenyl))(1-indenyl) zirconium dichloride;
dimethylsilandiyl(1-(3-trimethylsiloxypropyl-indenyl))(1-indenyl) zirconium dichloride;
dimethylsilandiyl(1-(2-trimethylsiloxypropyl-indenyl))(1-(2-methyl-indenyl)) zirconium dichloride;
dimethylsilandiyl(1-(3-trimethylsiloxypropyl-indenyl))(1-(2-methyl-indenyl)) zirconium dichloride;
dimethylsilandiyl(1-(2-trimethylsiloxypropyl-indenyl))(9-fluorenyl) zirconium dichloride;
dimethylsilandiyl(1-(3-trimethylsiloxypropyl-indenyl))(9-fluorenyl) zirconium dichloride;
dimethylsilandiyl(1-(2-trimethylsiloxypropyl-indenyl))(9-(2-methyl-fluorenyl)) zirconium dichloride;
dimethylsilandiyl(1-(3-trimethylsiloxypropyl-indenyl))(9-(2-methyl-fluorenyl)) zirconium dichloride;
dimethylsilandiylbis(1-(2-trimethylsiloxy-methoxy-indenyl)) zirconium dichloride;
dimethylsilandiylbis(1-(3-trimethylsiloxy-methoxy-indenyl)) zirconium dichloride;
dimethylsilandiyl(1-(2-trimethylsiloxy-methoxy-indenyl))(1-indenyl) zirconium dichloride;
dimethylsilandiyl(1-(3-trimethylsiloxy-methoxy-indenyl))(1-indenyl) zirconium dichloride;
dimethylsilandiyl(1-(2-trimethylsiloxy-methoxy-indenyl))(1-(2-methyl-indenyl)) zirconium dichloride;
dimethylsilandiyl(1-(3-trimethylsiloxy-methoxy-indenyl))(1-(2-methyl-indenyl)) zirconium dichloride;
dimethylsilandiyl(1-(2-trimethylsiloxy-methoxy-indenyl))(9-fluorenyl) zirconium dichloride;
dimethylsilandiyl(1-(3-trimethylsiloxy-methoxy-indenyl))(9-fluorenyl) zirconium dichloride;
dimethylsilandiyl(1-(2-trimethylsiloxy-methoxy-indenyl))(9-(2-methyl-fluorenyl)) zirconium dichloride;
dimethylsilandiyl(1-(3-trimethylsiloxy-methoxy-indenyl))(9-(2-methyl-fluorenyl)) zirconium dichloride;
dimethylsilandiylbis(1-(2-trimethylsiloxy-ethoxy-indenyl)) zirconium dichloride;
dimethylsilandiylbis(1-(3-trimethylsiloxy-ethoxy-indenyl)) zirconium dichloride;
dimethylsilandiyl(1-(2-trimethylsiloxy-ethoxy-indenyl))(1-indenyl) zirconium dichloride;
dimethylsilandiyl(1-(3-trimethylsiloxy-ethoxy-indenyl))(1-indenyl) zirconium dichloride;
dimethylsilandiyl(1-(2-trimethylsiloxy-ethoxy-indenyl))(1-(2-methyl-indenyl)) zirconium dichloride;
dimethylsilandiyl(1-(3-trimethylsiloxy-ethoxy-indenyl))(1-(2-methyl-indenyl)) zirconium dichloride;
dimethylsilandiyl(1-(2-trimethylsiloxy-ethoxy-indenyl))(9-fluorenyl) zirconium dichloride;
dimethylsilandiyl(1-(3-trimethylsiloxy-ethoxy-indenyl))(9-fluorenyl) zirconium dichloride;
dimethylsilandiyl(1-(2-trimethylsiloxy-ethoxy-indenyl))(9-(2-methyl-fluorenyl)) zirconium dichloride;
dimethylsilandiyl(1-(3-trimethylsiloxy-ethoxy-indenyl))(9-(2-methyl-fluorenyl)) zirconium dichloride;
dimethylsilandiylbis(1-(2-trimethylsiloxy-ethyl-(dimethyl)silyl-indenyl)) zirconium dichloride;
dimethylsilandiylbis(1-(3-trimethylsiloxy-ethyl-(dimethyl)silyl-indenyl)) zirconium dichloride;
dimethylsilandiyl(1-(2-trimethylsiloxy-ethyl-(dimethyl)silyl-indenyl))(1-indenyl) zirconium dichloride;
dimethylsilandiyl(1-(3-trimethylsiloxy-ethyl-(dimethyl)silyl-indenyl))(1-indenyl) zirconium dichloride;
dimethylsilandiyl(1-(2-trimethylsiloxy-ethyl-(dimethyl)silyl-indenyl))(1-(2-methyl-indenyl)) zirconium dichloride;
dimethylsilandiyl(1-(3-trimethylsiloxy-ethyl-(dimethyl)silyl-indenyl))(1-(2-methyl-indenyl)) zirconium dichloride;
dimethylsilandiyl(1-(2-trimethylsiloxy-ethyl-(dimethyl)silyl-indenyl))(9-fluorenyl) zirconium dichloride;
dimethylsilandiyl(1-(3-trimethylsiloxy-ethyl-(dimethyl)silyl-indenyl))(9-fluorenyl) zirconium dichloride;
dimethylsilandiyl(1-(2-trimethylsiloxy-ethyl-(dimethyl)silyl-indenyl))(9-(2-methyl-fluorenyl)) zirconium dichloride;
dimethylsilandiyl(1-(3-trimethylsiloxy-ethyl-(dimethyl)silyl-indenyl))(9-(2-methyl-fluorenyl)) zirconium dichloride;
isopropylidenebis(1-(2-trimethylsiloxyethyl-indenyl)) zirconium dichloride;
isopropylidenebis(1-(3-trimethylsiloxyethyl-indenyl)) zirconium dichloride;
isopropylidene(1-(2-trimethylsiloxyethyl-indenyl))(1-indenyl) zirconium dichloride;
isopropylidene(1-(3-trimethylsiloxyethyl-indenyl))(1-indenyl) zirconium dichloride;
isopropylidene(1-(2-trimethylsiloxyethyl-indenyl))(1-(2-methyl-indenyl)) zirconium dichloride;
isopropylidene(1-(3-trimethylsiloxyethyl-indenyl))(1-(2-methyl-indenyl)) zirconium dichloride;
isopropylidene(1-(2-trimethylsiloxyethyl-indenyl))(9-fluorenyl) zirconium dichloride;
isopropylidene(1-(3-trimethylsiloxyethyl-indenyl))(9-fluorenyl) zirconium dichloride;
isopropylidene(1-(2-trimethylsiloxyethyl-indenyl))(9-(2-methyl-fluorenyl)) zirconium dichloride;
isopropylidene(1-(3-trimethylsiloxyethyl-indenyl))(9-(2-methyl-fluorenyl)) zirconium dichloride;
isopropylidenebis(1-(2-trimethylsiloxypropyl-indenyl)) zirconium dichloride;
isopropylidenebis(1-(3-trimethylsiloxypropyl-indenyl)) zirconium dichloride;
isopropylidene(1-(2-trimethylsiloxypropyl-indenyl))(1-indenyl) zirconium dichloride;
isopropylidene(1-(3-trimethylsiloxypropyl-indenyl))(1-indenyl) zirconium dichloride;
isopropylidene(1-(2-trimethylsiloxypropyl-indenyl))(1-(2-methyl-indenyl)) zirconium dichloride;
isopropylidene(1-(3-trimethylsiloxypropyl-indenyl))(1-(2-methyl-indenyl)) zirconium dichloride;
isopropylidene(1-(2-trimethylsiloxypropyl-indenyl))(9-fluorenyl) zirconium dichloride;
isopropylidene(1-(3-trimethylsiloxypropyl-indenyl))(9-fluorenyl) zirconium dichloride;
isopropylidene(1-(2-trimethylsiloxypropyl-indenyl))(9-(2-methyl-fluorenyl)) zirconium dichloride;
isopropylidene(1-(3-trimethylsiloxypropyl-indenyl))(9-(2-methyl-fluorenyl)) zirconium dichloride;
isopropylidenebis(1-(2-trimethylsiloxy-methoxy-indenyl)) zirconium dichloride;
isopropylidenebis(1-(3-trimethylsiloxy-methoxy-indenyl)) zirconium dichloride;
isopropylidene(1-(2-trimethylsiloxy-methoxy-indenyl))(1-indenyl) zirconium dichloride;
isopropylidene(1-(3-trimethylsiloxy-methoxy-indenyl))(1-indenyl) zirconium dichloride;
isopropylidene(1-(2-trimethylsiloxy-methoxy-indenyl))(1-(2-methyl-indenyl)) zirconium dichloride;
isopropylidene(1-(3-trimethylsiloxy-methoxy-indenyl))(1-(2-methyl-indenyl)) zirconium dichloride;
isopropylidene(1-(2-trimethylsiloxy-methoxy-indenyl))(9-fluorenyl) zirconium dichloride;

isopropylidene(1-(3-trimethylsiloxy-methoxy-indenyl))(9-fluorenyl) zirconium dichloride;
isopropylidene(1-(2-trimethylsiloxy-methoxy-indenyl))(9-(2-methyl-fluorenyl)) zirconium dichloride;
isopropylidene(1-(3-trimethylsiloxy-methoxy-indenyl))(9-(2-methyl-fluorenyl)) zirconium dichloride;
isopropylidenebis(1-(2-trimethylsiloxy-ethoxy-indenyl)) zirconium dichloride;
isopropylidenebis(1-(3-trimethylsiloxy-ethoxy-indenyl)) zirconium dichloride;
isopropylidene(1-(2-trimethylsiloxy-ethoxy-indenyl))(1-indenyl) zirconium dichloride;
isopropylidene(1-(3-trimethylsiloxy-ethoxy-indenyl))(1-indenyl) zirconium dichloride;
isopropylidene(1-(2-trimethylsiloxy-ethoxy-indenyl))(1-(2-methyl-indenyl)) zirconium dichloride;
isopropylidene(1-(3-trimethylsiloxy-ethoxy-indenyl))(1-(2-methyl-indenyl)) zirconium dichloride;
isopropylidene(1-(2-trimethylsiloxy-ethoxy-indenyl))(9-fluorenyl) zirconium dichloride;
isopropylidene(1-(3-trimethylsiloxy-ethoxy-indenyl))(9-fluorenyl) zirconium dichloride;
isopropylidene(1-(2-trimethylsiloxy-ethoxy-indenyl))(9-(2-methyl-fluorenyl)) zirconium dichloride;
isopropylidene(1-(3-trimethylsiloxy-ethoxy-indenyl))(9-(2-methyl-fluorenyl)) zirconium dichloride;
isopropylidenebis(1-(2-trimethylsiloxy-ethyl-(dimethyl)silyl-indenyl)) zirconium dichloride;
isopropylidenebis(1-(3-trimethylsiloxy-ethyl-(dimethyl)silyl-indenyl)) zirconium dichloride;
isopropylidene(1-(2-trimethylsiloxy-ethyl-(dimethyl)silyl-indenyl))(1-indenyl) zirconium dichloride;
isopropylidene(1-(3-trimethylsiloxy-ethyl-(dimethyl)silyl-indenyl))(1-indenyl) zirconium dichloride;
isopropylidene(1-(2-trimethylsiloxy-ethyl-(dimethyl)silyl-indenyl))(1-(2-methyl-indenyl)) zirconium dichloride;
isopropylidene(1-(3-trimethylsiloxy-ethyl-(dimethyl)silyl-indenyl))(1-(2-methyl-indenyl)) zirconium dichloride;
isopropylidene(1-(2-trimethylsiloxy-ethyl-(dimethyl)silyl-indenyl))(9-fluorenyl) zirconium dichloride;
isopropylidene(1-(3-trimethylsiloxy-ethyl-(dimethyl)silyl-indenyl))(9-fluorenyl) zirconium dichloride;
isopropylidene(1-(2-trimethylsiloxy-ethyl-(dimethyl)silyl-indenyl))(9-(2-methyl-fluorenyl)) zirconium dichloride;
isopropylidene(1-(3-trimethylsiloxy-ethyl-(dimethyl)silyl-indenyl))(9-(2-methyl-fluorenyl)) zirconium dichloride;
ethylidenebis(1-(2-trimethylsiloxyethyl-indenyl)) zirconium dichloride;
ethylidenebis(1-(3-trimethylsiloxyethyl-indenyl)) zirconium dichloride;
ethylidene(1-(2-trimethylsiloxyethyl-indenyl))(1-indenyl) zirconium dichloride;
ethylidene(1-(3-trimethylsiloxyethyl-indenyl))(1-indenyl) zirconium dichloride;
ethylidene(1-(2-trimethylsiloxyethyl-indenyl))(1-(2-methyl-indenyl)) zirconium dichloride;
ethylidene(1-(3-trimethylsiloxyethyl-indenyl))(1-(2-methyl-indenyl)) zirconium dichloride;
ethylidene(1-(2-trimethylsiloxyethyl-indenyl))(9-fluorenyl) zirconium dichloride;
ethylidene(1-(3-trimethylsiloxyethyl-indenyl))(9-fluorenyl) zirconium dichloride;
ethylidene(1-(2-trimethylsiloxyethyl-indenyl))(9-(2-methyl-fluorenyl)) zirconium dichloride;
ethylidene(1-(3-trimethylsiloxyethyl-indenyl))(9-(2-methyl-fluorenyl)) zirconium dichloride;
ethylidenebis(1-(2-trimethylsiloxypropyl-indenyl)) zirconium dichloride;
ethylidenebis(1-(3-trimethylsiloxypropyl-indenyl)) zirconium dichloride;
ethylidene(1-(2-trimethylsiloxypropyl-indenyl))(1-indenyl) zirconium dichloride;
ethylidene(1-(3-trimethylsiloxypropyl-indenyl))(1-indenyl) zirconium dichloride;
ethylidene(1-(2-trimethylsiloxypropyl-indenyl))(1-(2-methyl-indenyl)) zirconium dichloride;
ethylidene(1-(3-trimethylsiloxypropyl-indenyl))(1-(2-methyl-indenyl)) zirconium dichloride;
ethylidene(1-(2-trimethylsiloxypropyl-indenyl))(9-fluorenyl) zirconium dichloride;
ethylidene(1-(3-trimethylsiloxypropyl-indenyl))(9-fluorenyl) zirconium dichloride;
dichloride;
ethylidene(1-(2-trimethylsiloxypropyl-indenyl))(9-(2-methyl-fluorenyl) zirconium dichloride;
ethylidene(1-(3-trimethylsiloxypropyl-indenyl))(9-(2-methyl-fluorenyl) zirconium dichloride;
dichloride;
ethylidenebis(1-(2-trimethylsiloxy-methoxy-indenyl)) zirconium dichloride;
ethylidenebis(1-(3-trimethylsiloxy-methoxy-indenyl)) zirconium dichloride;
ethylidene(1-(2-trimethylsiloxy-methoxy-indenyl))(1-indenyl) zirconium dichloride;
ethylidene(1-(3-trimethylsiloxy-methoxy-indenyl))(1-indenyl) zirconium dichloride;
ethylidene(1-(2-trimethylsiloxy-methoxy-indenyl))(1-(2-methyl-indenyl)) zirconium dichloride;
ethylidene(1-(3-trimethylsiloxy-methoxy-indenyl))(1-(2-methyl-indenyl)) zirconium dichloride;
ethylidene(1-(2-trimethylsiloxy-methoxy-indenyl))(9-fluorenyl) zirconium dichloride;
ethylidene(1-(3-trimethylsiloxy-methoxy-indenyl))(9-fluorenyl) zirconium dichloride;
ethylidene(1-(2-trimethylsiloxy-methoxy-indenyl))(9-(2-methyl-fluorenyl)) zirconium dichloride;
ethylidene(1-(3-trimethylsiloxy-methoxy-indenyl))(9-(2-methyl-fluorenyl)) zirconium dichloride;
ethylidenebis(1-(2-trimethylsiloxy-ethoxy-indenyl)) zirconium dichloride;
ethylidenebis(1-(3-trimethylsiloxy-ethoxy-indenyl)) zirconium dichloride;
ethylidene(1-(2-trimethylsiloxy-ethoxy-indenyl))(1-indenyl) zirconium dichloride;
ethylidene(1-(3-trimethylsiloxy-ethoxy-indenyl))(1-indenyl) zirconium dichloride;
ethylidene(1-(2-trimethylsiloxy-ethoxy-indenyl))(1-(2-methyl-indenyl)) zirconium dichloride;
ethylidene(1-(3-trimethylsiloxy-ethoxy-indenyl))(1-(2-methyl-indenyl)) zirconium dichloride;
ethylidene(1-(2-trimethylsiloxy-ethoxy-indenyl))(9-fluorenyl) zirconium dichloride;
ethylidene(1-(3-trimethylsiloxy-ethoxy-indenyl))(9-fluorenyl) zirconium dichloride;
ethylidene(1-(2-trimethylsiloxy-ethoxy-indenyl))(9-(2-methyl-fluorenyl)) zirconium dichloride;
ethylidene(1-(3-trimethylsiloxy-ethoxy-indenyl))(9-(2-methyl-fluorenyl)) zirconium dichloride;

ethylidenebis(1-(2-trimethylsiloxy-ethyl-(dimethyl)silyl-indenyl)) zirconium dichloride;
ethylidenebis(1-(3-trimethylsiloxy-ethyl-(dimethyl)silyl-indenyl)) zirconium dichloride;
ethylidene(1-(2-trimethylsiloxy-ethyl-(dimethyl)silyl-indenyl))(1-indenyl) zirconium dichloride;
ethylidene(1-(3-trimethylsiloxy-ethyl-(dimethyl)silyl-indenyl))(1-indenyl) zirconium dichloride;
ethylidene(1-(2-trimethylsiloxy-ethyl-(dimethyl)silyl-indenyl))(1-(2-methyl-indenyl)) zirconium dichloride;
ethylidene(1-(3-trimethylsiloxy-ethyl-(dimethyl)silyl-indenyl))(1-(2-methyl-indenyl)) zirconium dichloride;
ethylidene(1-(2-trimethylsiloxy-ethyl-(dimethyl)silyl-indenyl))(9-fluorenyl) zirconium dichloride;
ethylidene(1-(3-trimethylsiloxy-ethyl-(dimethyl)silyl-indenyl))(9-fluorenyl) zirconium dichloride;
ethylidene(1-(2-trimethylsiloxy-ethyl-(dimethyl)silyl-indenyl))(9-(2-methyl-fluorenyl)) zirconium dichloride;
ethylidene(1-(3-trimethylsiloxy-ethyl-(dimethyl)silyl-indenyl))(9-(2-methyl-fluorenyl)) zirconium dichloride;
dimethylsilylenebis(9-(1-trimethylsiloxyethyl-fluorenyl)) zirconium dichloride;
dimethylsilylene(9-(1-trimethylsiloxyethyl-fluorenyl))(cyclopentadienyl) zirconium dichloride;
dimethylsilylene(9-(1-trimethylsiloxyethyl-fluorenyl))(1-(2-methyl-indenyl)) zirconium dichloride;
dimethylsilylene(9-(1-trimethylsiloxyethyl-fluorenyl))(1-indenyl) zirconium dichloride;
dimethylsilylene(9-(1-trimethylsiloxyethyl-fluorenyl))(9-(2-methyl-fluorenyl)) zirconium dichloride;
dimethylsilylenebis(9-(1-trimethylsiloxypropyl-fluorenyl)) zirconium dichloride;
dimethylsilylene(9-(1-trimethylsiloxypropyl-fluorenyl))(9-fluorenyl) zirconium dichloride;
dimethylsilylene(9-(1-trimethylsiloxypropyl-fluorenyl))(1-(2-methyl-indenyl)) zirconium dichloride;
dimethylsilylene(9-(1-trimethylsiloxypropyl-fluorenyl))(1-indenyl) zirconium dichloride;
dimethylsilylene(9-(1-trimethylsiloxypropyl-fluorenyl))(9-(2-methyl-fluorenyl)) zirconium dichloride;
dimethylsilylenebis(9-(1-trimethylsiloxy-methoxy-fluorenyl)) zirconium dichloride;
dimethylsilylene(9-(1-trimethylsiloxy-methoxy-fluorenyl))(9-fluorenyl) zirconium dichloride;
dimethylsilylene(9-(1-trimethylsiloxy-methoxy-fluorenyl))(1-(2-methyl-indenyl)) zirconium dichloride;
dimethylsilylene(9-(1-trimethylsiloxy-methoxy-fluorenyl))(1-indenyl) zirconium dichloride;
dimethylsilylene(9-(1-trimethylsiloxy-methoxy-fluorenyl))(9-(2-methyl-fluorenyl)) zirconium dichloride;
dimethylsilylenebis(9-(1-trimethylsiloxy-ethoxy-fluorenyl)) zirconium dichloride;
dimethylsilylene(9-(1-trimethylsiloxy-ethoxy-fluorenyl))(9-fluorenyl) zirconium dichloride;
dimethylsilylene(9-(1-trimethylsiloxy-ethoxy-fluorenyl))(1-(2-methyl-indenyl)) zirconium dichloride;
dimethylsilylene(9-(1-trimethylsiloxy-ethoxy-fluorenyl))(1-indenyl) zirconium dichloride;
dimethylsilylene(9-(1-trimethylsiloxy-ethoxy-fluorenyl))(9-(2-methyl-fluorenyl)) zirconium dichloride;
dimethylsilylenebis(9-(1-trimethylsiloxy-ethyl-(dimethyl)silyl-fluorenyl)) zirconium dichloride;
dimethylsilylene(9-(1-trimethylsiloxy-ethyl-(dimethyl)silyl-fluorenyl))(9-fluorenyl) zirconium dichloride;
dimethylsilylene(9-(1-trimethylsiloxy-ethyl-(dimethyl)silyl-fluorenyl))(1-(2-methyl-indenyl)) zirconium dichloride;
dimethylsilylene(9-(1-trimethylsiloxy-ethyl-(dimethyl)silyl-fluorenyl))(1-indenyl) zirconium dichloride;
dimethylsilylene(9-(1-trimethylsiloxy-ethyl-(dimethyl)silyl-fluorenyl))(9-(2-methyl-fluorenyl)) zirconium dichloride;
isopropylidenebis(9-(1-trimethylsiloxyethyl-fluorenyl)) zirconium dichloride;
isopropylidene(9-(1-trimethylsiloxyethyl-fluorenyl))(9-fluorenyl) zirconium dichloride;
isopropylidene(9-(1-trimethylsiloxyethyl-fluorenyl))(9-(2-methyl-indenyl)) zirconium dichloride;
isopropylidene(9-(1-trimethylsiloxyethyl-fluorenyl))(1-indenyl) zirconium dichloride;
isopropylidene(9-(1-trimethylsiloxyethyl-fluorenyl))(9-(2-methyl-fluorenyl)) zirconium dichloride;
isopropylidenebis(9-(1-trimethylsiloxypropyl-fluorenyl)) zirconium dichloride;
isopropylidene(9-(1-trimethylsiloxypropyl-fluorenyl))(9-fluorenyl) zirconium dichloride;
isopropylidene(9-(1-trimethylsiloxypropyl-fluorenyl))(1-(2-methyl-indenyl)) zirconium dichloride;
isopropylidene(9-(1-trimethylsiloxypropyl-fluorenyl))(1-indenyl) zirconium dichloride;
isopropylidene(9-(1-trimethylsiloxypropyl-fluorenyl))(9-(2-methyl-fluorenyl)) zirconium dichloride;
isopropylidenebis(9-(1-trimethylsiloxy-methoxy-fluorenyl)) zirconium dichloride;
isopropylidene(9-(1-trimethylsiloxy-methoxy-fluorenyl))(9-fluorenyl) zirconium dichloride;
isopropylidene(9-(1-trimethylsiloxy-methoxy-fluorenyl))(1-(2-methyl-indenyl)) zirconium dichloride;
isopropylidene(9-(1-trimethylsiloxy-methoxy-fluorenyl))(1-indenyl) zirconium dichloride;
isopropylidene(9-(1-trimethylsiloxy-methoxy-fluorenyl))(9-(2-methyl-fluorenyl)) zirconium dichloride;
isopropylidenebis(9-(1-trimethylsiloxy-ethoxy-fluorenyl)) zirconium dichloride;
isopropylidene(9-(1-trimethylsiloxy-ethoxy-fluorenyl))(9-fluorenyl) zirconium dichloride;
isopropylidene(9-(1-trimethylsiloxy-ethoxy-fluorenyl))(1-(2-methyl-indenyl)) zirconium dichloride;
isopropylidene(9-(1-trimethylsiloxy-ethoxy-fluorenyl))(1-indenyl) zirconium dichloride;
isopropylidene(9-(1-trimethylsiloxy-ethoxy-fluorenyl))(9-(2-methyl-fluorenyl)) zirconium dichloride;
isopropylidenebis(9-(1-trimethylsiloxy-ethyl-(dimethyl)silyl-fluorenyl)) zirconium dichloride;
isopropylidene(9-(1-trimethylsiloxy-ethyl-(dimethyl)silyl-fluorenyl))(9-fluorenyl) zirconium dichloride;
isopropylidene(9-(1-trimethylsiloxy-ethyl-(dimethyl)silyl-fluorenyl))(1-(2-methyl-indenyl)) zirconium dichloride;
isopropylidene(9-(1-trimethylsiloxy-ethyl-(dimethyl)silyl-fluorenyl))(1-indenyl) zirconium dichloride;
isopropylidene(9-(1-trimethylsiloxy-ethyl-(dimethyl)silyl-fluorenyl))(9-(2-methyl-fluorenyl)) zirconium dichloride;
ethylidenebis(9-(1-trimethylsiloxyethyl-fluorenyl)) zirconium dichloride;
ethylidene(9-(1-trimethylsiloxyethyl-fluorenyl))(9-fluorenyl) zirconium dichloride;
ethylidene(9-(1-trimethylsiloxyethyl-fluorenyl))(1-(2-methyl-indenyl)) zirconium dichloride;
ethylidene(9-(1-trimethylsiloxyethyl-fluorenyl))(1-indenyl) zirconium dichloride;
ethylidene(9-(1-trimethylsiloxyethyl-fluorenyl))(9-(2-methyl-fluorenyl)) zirconium dichloride;

ethylidenebis(9-(1-trimethylsiloxypropyl-fluorenyl)) zirconium dichloride;
ethylidene(9-(1-trimethylsiloxypropyl-fluorenyl))(9-fluorenyl) zirconium dichloride;
ethylidene(9-(1-trimethylsiloxypropyl-fluorenyl))(1-(2-methyl-indenyl)) zirconium dichloride;
ethylidene(9-(1-trimethylsiloxypropyl-fluorenyl))(1-indenyl) zirconium dichloride;
ethylidene(9-(1-trimethylsiloxypropyl-fluorenyl))(9-(2-methyl-fluorenyl)) zirconium dichloride;
ethylidenebis(9-(1-trimethylsiloxy-methoxy-fluorenyl)) zirconium dichloride;
ethylidene(9-(1-trimethylsiloxy-methoxy-fluorenyl))(9-fluorenyl) zirconium dichloride;
ethylidene(9-(1-trimethylsiloxy-methoxy-fluorenyl))(1-(2-methyl-indenyl)) zirconium dichloride;
ethylidene(9-(1-trimethylsiloxy-methoxy-fluorenyl))(1-indenyl) zirconium dichloride;
ethylidene(9-(1-trimethylsiloxy-methoxy-fluorenyl))(9-(2-methyl-fluorenyl)) zirconium dichloride;
ethylidenebis(9-(1-trimethylsiloxy-ethoxy-fluorenyl)) zirconium dichloride;
ethylidene(9-(1-trimethylsiloxy-ethoxy-fluorenyl))(9-fluorenyl) zirconium dichloride;
ethylidene(9-(1-trimethylsiloxy-ethoxy-fluorenyl))(1-(2-methyl-indenyl)) zirconium dichloride;
ethylidene(9-(1-trimethylsiloxy-ethoxy-fluorenyl))(1-indenyl) zirconium dichloride;
ethylidene(9-(1-trimethylsiloxy-ethoxy-fluorenyl))(9-(2-methyl-fluorenyl)) zirconium dichloride;
ethylidenebis(9-(1-trimethylsiloxy-ethyl-(dimethyl)silyl-fluorenyl)) zirconium dichloride;
ethylidene(9-(1-trimethylsiloxy-ethyl-(dimethyl)silyl-fluorenyl))(9-fluorenyl) zirconium dichloride;
ethylidene(9-(1-trimethylsiloxy-ethyl-(dimethyl)silyl-fluorenyl))(1-(2-methyl-indenyl)) zirconium dichloride;
ethylidene(9-(1-trimethylsiloxy-ethyl-(dimethyl)silyl-fluorenyl))(1-indenyl) zirconium dichloride;
ethylidene(9-(1-trimethylsiloxy-ethyl-(dimethyl)silyl-fluorenyl))(9-(2-methyl-fluorenyl)) zirconium dichloride;
trimethylsiloxyethyl(methyl)silandiylbis(cyclopentadienyl) zirconium dichloride;
trimethylsiloxyethyl(methyl)silandiylbis(9-fluorenyl) zirconium dichloride;
trimethylsiloxyethyl(methyl)silandiyl(cyclopentadienyl)(1-indenyl) zirconium dichloride;
trimethylsiloxyethyl(methyl)silandiyl(cyclopentadienyl)(1-(2-methyl-indenyl)) zirconium dichloride;
trimethylsiloxyethyl(methyl)silandiyl(cyclopentadienyl)(9-fluorenyl) zirconium dichloride;
trimethylsiloxyethyl(methyl)silndiyl(cyclopentadienyl)(9-(2-methyl-fluorenyl)) zirconium dichloride;
trimethylsiloxyethyl(methyl)silandiylbis(1-indenyl) zirconium dichloride;
trimethylsiloxyethyl(methyl)silandiyl(cyclopentadienyl)(1-(2-methylbenzoindenyl)) zirconium dichloride;
trimethylsiloxyethyl(methyl)silandiylbis(1-(2-methyl-benzoindenyl)) zirconium dichloride;
trimethylsiloxypropyl(methyl)silandiylbis(cyclopentadienyl) zirconium dichloride;
trimethylsiloxypropyl(methyl)silandiylbis(9-fluorenyl) zirconium dichloride;
trimethylsiloxypropyl(methyl)silandiyl(cyclopentadienyl)(1-indenyl) zirconium dichloride;
trimethylsiloxypropyl(methyl)silandiyl(cyclopentadienyl)(1-(2-methyl-indenyl)) zirconium dichloride;
trimethylsiloxypropyl(methyl)silandiyl(cyclopentadienyl)(9-fluorenyl) zirconium dichloride;
trimethylsiloxypropyl(methyl)silandiyl(cyclopentadienyl)(9-(2-methyl-fluorenyl)) zirconium dichloride;
trimethylsiloxypropyl(methyl)silandiylbis(1-indenyl) zirconium dichloride;
trimethylsiloxypropyl(methyl)silandiyl(cyclopentadienyl)(1-(2-methylbenzoindenyl)) zirconium dichloride;
trimethylsiloxy-methoxy(methyl)silandiylbis(cyclopentadienyl) zirconium dichloride;
trimethylsiloxy-methoxy(methyl)silandiyl(cyclopentadienyl)(1-indenyl) zirconium dichloride;
trimethylsiloxy-methoxy(methyl)silandiyl(cyclopentadienyl)(1-(2-methyl-indenyl)) zirconium dichloride;
trimethylsiloxy-methoxy(methyl)silandiyl(cyclopentadienyl)(9-fluorenyl) zirconium dichloride;
trimethylsiloxy-methoxy(methyl)silandiyl(cyclopentadienyl)(9-(2-methyl-fluorenyl)) zirconium dichloride;
trimethylsiloxy-ethoxy(methyl)silandiylbis(cyclopentadienyl) zirconium dichloride;
trimethylsiloxy-ethoxy(methyl)silandiyl(cyclopentadienyl)(1-indenyl) zirconium dichloride;
trimethylsiloxy-ethoxy(methyl)silandiyl(cyclopentadienyl)(1-(2-methyl-indenyl)) zirconium dichloride;
trimethylsiloxy-ethoxy(methyl)silandiyl(cyclopentadienyl)(9-fluorenyl) zirconium dichloride;
trimethylsiloxy-ethoxy(methyl)silandiyl(cyclopentadienyl)(9-(2-methyl-fluorenyl)) zirconium dichloride;
trimethylsiloxy-ethyl-(dimethyl)silyl-(methyl)silandiylbis(cyclopentadienyl) zirconium dichloride;
trimethylsiloxy-ethyl-(dimethyl)silyl-(methyl)silandiyl(cyclopentadienyl)(1-indenyl) zirconium dichloride;
trimethylsiloxy-ethyl-(dimethyl)silyl-(methyl)silandiyl(cyclopentadienyl)(1-(2-methyl-indenyl)) zirconium dichloride;
trimethylsiloxy-ethyl-(dimethyl)silyl-(methyl)silandiyl(cyclopentadienyl)(9-fluorenyl) zirconium dichloride;
trimethylsiloxy-ethyl-(dimethyl)silyl-(methyl)silandiyl(cyclopentadienyl)(9-(2-methyl-fluorenyl)) zirconium dichloride;
trimethylsiloxy-methoxy(methyl)methylidenebis(cyclopentadienyl) zirconium dichloride;
trimethylsiloxy-methoxy(methyl)methylidene(cyclopentadienyl)(1-indenyl) zirconium dichloride;
trimethylsiloxy-methoxy(methyl)methylidene(cyclopentadienyl)(1-(2-methyl-indenyl)) zirconium dichloride;
trimethylsiloxy-methoxy(methyl)methylidene(cyclopentadienyl)(9-fluorenyl) zirconium dichloride;
trimethylsiloxy-methoxy(methyl)methylidene(cyclopentadienyl)(9-(2-methyl-fluorenyl)) zirconium dichloride;
trimethylsiloxy-ethoxy-(methyl)methylidenebis(cyclopentadienyl) zirconium dichloride;
trimethylsiloxy-ethoxy-(methyl)methylidene(cyclopentadienyl)(1-indenyl) zirconium dichloride;
trimethylsiloxy-ethoxy-(methyl)methylidene(cyclopentadienyl)(1-(2-methyl-indenyl)) zirconium dichloride;
trimethylsiloxy-ethoxy-(methyl)methylidene(cyclopentadienyl)(9-fluorenyl) zirconium dichloride;
trimethylsiloxy-ethoxy-(methyl)methylidene(cyclopentadienyl)(9-(2-methyl-fluorenyl)) zirconium dichloride;
trimethylsiloxy-ethyl-(dimethyl)silyl-(methyl)methylidenebis(cyclopentadienyl) zirconium dichloride;

trimethylsiloxy-ethyl-(dimethyl)silyl-(methyl)methylidene(cyclopentadienyl)(1-indenyl) zirconium dichloride;
trimethylsiloxy-ethyl-(dimethyl)silyl-(methyl)methylidene(cyclopentadienyl)(1-(2-methyl-indenyl)) zirconium dichloride;
trimethylsiloxy-ethyl-(dimethyl)silyl-(methyl)methylidene(cyclopentadienyl)(9-fluorenyl) zirconium dichloride;
trimethylsiloxy-ethyl-(dimethyl)silyl-(methyl)methylidene(cyclopentadienyl)(9-(2-methyl-fluorenyl)) zirconium dichloride;
trimethylsiloxy-ethyl-(dimethyl)silyl-(methyl)methylidenebis(1-indenyl) zirconium dichloride;
1-trimethylsiloxyethyl-ethylidenebis(cyclopentadienyl) zirconium dichloride;
1-trimethylsiloxyethyl-ethylidene-1-(cyclopentadienyl)-2-(1-indenyl) zirconium dichloride;
1-trimethylsiloxyethyl-ethylidene-1-(cyclopentadienyl)-2-(1-(2-methyl-indenyl)) zirconium dichloride;
1-trimethylsiloxyethyl-ethylidene-1-(cyclopentadienyl)-2-(9-fluorenyl) zirconium dichloride;
1-trimethylsiloxyethyl-ethylidene-1-(cyclopentadienyl)-2-(9-(2-methyl-fluorenyl)) zirconium dichloride;
1-trimethylsiloxyethyl-ethylidenebis(1-indenyl) zirconium dichloride;
1-trimethylsiloxypropyl-ethylidenebis(cyclopentadienyl) zirconium dichloride;
1-trimethylsiloxypropyl-ethylidene-1-(cyclopentadienyl)-2-(1-indenyl) zirconium dichloride;
1-trimethylsiloxypropyl-ethylidene-1-(cyclopentadienyl)-2-(1-(2-methyl-indenyl)) zirconium dichloride;
1-trimethylsiloxypropyl-ethylidene-1-(cyclopentadienyl)-2-(9-fluorenyl) zirconium dichloride;
1-trimethylsiloxypropyl-ethylidene-1-(cyclopentadienyl)-2-(9-(2-methyl-fluorenyl)) zirconium dichloride;
1-trimethylsiloxypropyl-ethylidenebis(1-indenyl) zirconium dichloride;
1-trimethylsiloxy-methoxy-ethylidenebis(cyclopentadienyl) zirconium dichloride;
1-trimethylsiloxy-methoxy-ethylidene-1-(cyclopentadienyl)-2-(1-indenyl) zirconium dichloride;
1-trimethylsiloxy-methoxy-ethylidene-1-(cyclopentadienyl)-2-(1-(2-methyl-indenyl)) zirconium dichloride;
1-trimethylsiloxy-methoxy-ethylidene-1-(cyclopentadienyl)-2-(9-fluorenyl) zirconium dichloride;
1-trimethylsiloxy-methoxy-ethylidene-1-(cyclopentadienyl)-2-(9-(2-methyl-fluorenyl)) zirconium dichloride;
1-trimethylsiloxy-ethoxy-ethylidenebis(cyclopentadienyl) zirconium dichloride;
1-trimethylsiloxy-ethoxy-ethylidene-1-(cyclopentadienyl)-2-(1-indenyl) zirconium dichloride;
1-trimethylsiloxy-ethoxy-ethylidene-1-(cyclopentadienyl)-2-(1-(2-methyl-indenyl)) zirconium dichloride;
1-trimethylsiloxy-ethoxy-ethylidene-1-(cyclopentadienyl)-2-(9-fluorenyl) zirconium dichloride;
1-trimethylsiloxy-ethoxy-ethylidene-1-(cyclopentadienyl)-2-(9-(2-methyl-fluorenyl)) zirconium dichloride;
1-trimethylsiloxy-ethyl-(dimethyl)silyl ethylidenebis(cyclopentadienyl) zirconium dichloride;
1-trimethylsiloxy-ethyl-(dimethyl)silyl ethylidene-1-(cyclopentadienyl)-2-(1-indenyl) zirconium dichloride;
1-trimethylsiloxy-ethyl-(dimethyl)silyl ethylidene-1-(cyclopentadienyl)-2-(1-(2-methyl-indenyl)) zirconium dichloride
1-trimethylsiloxy-ethyl-(dimethyl)silyl ethylidene-1-(cyclopentadienyl)-2-(9-fluorenyl) zirconium dichloride;
1-trimethylsiloxy-ethyl-(dimethyl)silyl ethylidene-1-(cyclopentadienyl)-2-(9-(2-methyl-fluorenyl)) zirconium dichloride;
trimethylsiloxyethyl(methyl)silandiyl-(tertbutylamido)(cylopentadienyl) titanium dichloride;
trimethylsiloxyethyl(methyl)silandiyl-(tertbutylamido)(tetramethylcylopentadienyl) titanium dichloride;
trimethylsiloxyethyl(methyl)silandiyl-(tertbutylamido)(1-indenyl) titanium dichloride;
trimethylsiloxyethyl(methyl)silandiyl-(tertbutylamido)(1-(2-methyl-indenyl)) titanium dichloride;
trimethylsiloxyethyl(methyl)silandiyl-(tertbutylamido)(9-fluorenyl) titanium dichloride;
trimethylsiloxyethyl(methyl)silandiyl-(tertbutylamido)(9-(2-methyl-fluorenyl)) titanium dichloride;
trimethylsiloxyethyl(methyl)silandiyl-(tertbutylamido)(1-(2-methylbenzoindenyl) titanium dichloride;
(dimethyl)silandiyl-(tertbutylamido)(3-trimethylsiloxyethylcylopetadenyl) titanium dichloride;
(dimethyl)silandiyl-(tertbutylamido)(1-(3-trimethylsiloxyethylindenyl) titanium dichloride;
(dimethyl)silandiyl-(2-trimethylsiloxyethylamido)(cylopentadienyl) titanium dichloride;
(dimethyl)silandiyl-(2-trimethylsiloxyethylamido)(tetramethylcylopentadienyl) titanium dichloride;
(dimethyl)silandiyl-(2-trimethylsiloxyethylamido)(1-indenyl) titanium dichloride;
(dimethyl)silandiyl-(2-trimethylsiloxyethylamido)(9-fluorenyl) titanium dichloride;
(dimethyl)silandiyl-(2-trimethylsiloxyethylamido)(1-(2-methylbenzoindenyl) titanium dichloride;
trimethylsiloxypropyl(methyl)silandiyl(tertbutylamido)-(cylopentadienyl) titanium dichloride;
trimethylsiloxypropyl(methyl)silandiyl-(tertbutylamido)(tetramethylcyclopentadienyl) titanium dichloride;
trimethylsiloxypropyl(methyl)silandiyl-(tertbutylamido)(1-indenyl) titanium dichloride;
trimethylsiloxypropyl(methyl)silandiyl-(tertbutylamido)(1-(2-methyl-indenyl)) titanium dichloride;
trimethylsiloxypropyl(methyl)silandiyl-(tertbutylamido)(9-fluorenyl) titanium dichloride;
trimethylsiloxypropyl(methyl)silandiyl-(tertbutylamido)(9-(2-methyl-fluorenyl)) titanium dichloride;
trimethylsiloxypropyl(methyl)silandiyl(tertbutylamido)-(1-(2-methylbenzoindenyl) titanium dichloride;
(dimethyl)silandiyl-(tertbutylamido)(3-(trimethylsiloxypropylcylopentadienyl) titanium dichloride;
(dimethyl)silandiyl-(tertbutylamido)(1-(3-trimethylsiloxypropylindenyl) titanium dichloride;
(dimethyl)silandiyl-(3-trimethylsiloxypropylamido)(cylopentadienyl) titanium dichloride;
(dimethyl)silandiyl-(3-trimethylsiloxypropylamido)(tetramethylcylopentadienyl) titanium dichloride;
(dimethyl)silandiyl-(3-trimethylsiloxypropylamido)(1-indenyl) titanium dichloride;
(dimethyl)silandiyl-(3-trimethylsiloxypropylamido)(9-fluorenyl) titanium dichloride;
(dimethyl)silandiyl-(3-trimethylsiloxypropylamido)(1-(2-methylbenzoindenyl) titanium dichloride;
trimethylsiloxy-methoxy(methyl)silandiyl-(tertbutylamido)(cylopentadienyl) titanium dichloride;
trimethylsiloxy-methoxy(methyl)silandiyl-(tertbutylamido)(tetramethylcyclopentadienyl) titanium dichloride;
trimethylsiloxy-methoxy(methyl)silandiyl-(tertbutylamido)(1-indenyl) titanium dichloride;

trimethylsiloxy-methoxy(methyl)silandiyl-(tertbutylamido)(1-(2-methyl-indenyl)) titanium dichloride;
trimethylsiloxy-methoxy(methyl)silandiyl-(tertbutylamido)(9-fluorenyl) titanium dichloride;
trimethylsiloxy-methoxy(methyl)silandiyl-(tertbutylamido)(9-(2-methyl-fluorenyl)) titanium dichloride;
trimethylsiloxy-ethoxy(methyl)silandiyl-(tertbutylamido)(cylopentadienyl) titanium dichloride;
trimethylsiloxy-ethoxy(methyl)silandiyl-(tertbutylamido)(tetramethylcyclopentadienyl) titanium dichloride;
trimethylsiloxy-ethoxy(methyl)silandiyl-(tertbutylamido)(1-indenyl) titanium dichloride;
trimethylsiloxy-ethoxy(methyl)silandiyl-(tertbutylamido)(1-(2-methyl-indenyl)) titanium dichloride;
trimethylsiloxy-ethoxy(methyl)silandiyl-(tertbutylamido)(9-fluorenyl) titanium dichloride;
trimethylsiloxy-ethoxy(methyl)silandiyl-(tertbutylamido)(9-(2-methyl-fluorenyl)) titanium dichloride;
trimethylsiloxy-ethyl-(dimethyl)silyl-(methyl)silandiyl(tertbutylamido)-(cylopentadienyl) titanium dichloride;
trimethylsiloxy-ethyl-(dimethyl)silyl-(methyl)silandiyl-(tertbutylamido)(tetramethylcyclopentadienyl) titanium dichloride;
trimethylsiloxy-ethyl-(dimethyl)silyl-(methyl)silandiyl-(tertbutylamido)(1-indenyl) titanium dichloride;
trimethylsiloxy-ethyl-(dimethyl)silyl-(methyl)silandiyl-(tertbutylamido)(1-(2-methyl-indenyl)) titanium dichloride;
trimethylsiloxy-ethyl-(dimethyl)silyl-(methyl)silandiyl-(tertbutylamido)(9-fluorenyl) titanium dichloride;
trimethylsiloxy-ethyl-(dimethyl)silyl-(methyl)silandiyl-(tertbutylamido)(9-(2-methyl-fluorenyl)) titanium dichloride;
trimethylsiloxyethyl-(methyl)methylene(tertbutylamido)(cylopentadienyl) titanium dichloride;
trimethylsiloxyethyl-(methyl)methylene(tertbutylamido)(tetramethylcyclopentadienyl) titanium dichloride;
trimethylsiloxyethyl-(methyl)methylene(tertbutylamido)(1-indenyl) titanium dichloride;
trimethylsiloxyethyl-(methyl)methylene(tertbutylamido)(1-(2-methyl-indenyl)) titanium dichloride;
trimethylsiloxyethyl-(methyl)methylene(tertbutylamido)(9-fluorenyl) titanium dichloride;
trimethylsiloxyethyl-(methyl)methylene(tertbutylamido)(9-(2-methyl-fluorenyl)) titanium dichloride;
trimethylsiloxypropyl-(methyl)methylene(tertbutylamido)(cylopentadienyl) titanium dichloride;
trimethylsiloxypropyl-(methyl)methylene(tertbutylamido)(tetramethylcyclopentadienyl) titanium dichloride;
trimethylsiloxypropyl-(methyl)methylene(tertbutylamido)(indenyl) titanium dichloride;
trimethylsiloxypropyl-(methyl)methylene(tertbutylamido)(2-methyl-indenyl) titanium dichloride;
trimethylsiloxypropyl-(methyl)methylene(tertbutylamido)(9-fluorenyl) titanium dichloride;
trimethylsiloxypropyl-(methyl)methylene(tertbutylamido)(2-methyl-fluorenyl) titanium dichloride;
trimethylsiloxy-methoxy(methyl)methylene(tertbutylamido)(cylopentadienyl) titanium dichloride;
trimethylsiloxy-methoxy(methyl)methylene(tertbutylamido)(tetramethylcyclopentadienyl) titanium dichloride;
trimethylsiloxy-methoxy(methyl)methylene(tertbutylamido)(1-indenyl) titanium dichloride;
trimethylsiloxy-methoxy(methyl)methylen(-tertbutylamido)(1-(2-methyl-indenyl)) titanium dichloride;
trimethylsiloxy-methoxy(methyl)methylen(-tertbutylamido)(9-fluorenyl) titanium dichloride;
trimethylsiloxy-methoxy(methyl)methylen(-tertbutylamido)(9-(2-methyl-fluorenyl)) titanium dichloride;
trimethylsiloxy-ethoxy-(methyl)methylene(tertbutylamido)(cylopentadienyl) titanium dichloride;
trimethylsiloxy-ethoxy-(methyl)methylene(tertbutylamido)(tetramethylcyclopentadienyl) titanium dichloride;
trimethylsiloxy-ethoxy-(methyl)methylen(tertbutylamido)(1-indenyl) titanium dichloride;
trimethylsiloxy-ethoxy-(methyl)methylen(tertbutylamido)(1-(2-methyl-indenyl)) titanium dichloride;
trimethylsiloxy-ethoxy-(methyl)methylen(tertbutylamido)(9-fluorenyl) titanium dichloride;
trimethylsiloxy-ethoxy-(methyl)methylen(tertbutylamido)(9-(2-methyl-fluorenyl)) titanium dichloride;
trimethylsiloxy-ethyl-(dimethyl)silyl-(methyl)methylene(tertbutylamido)(cylopentadienyl) titanium dichloride;
trimethylsiloxy-ethyl-(dimethyl)silyl(methyl)methylene(tertbutylamido) (tetramethylcyclopentadienyl) titanium dichloride;
trimethylsiloxy-ethyl-(dimethyl)silyl-(methyl)methilene(tertbutylamido)(1-indenyl) titanium dichloride;
trimethylsiloxy-ethyl-(dimethyl)silyl-(methyl)methilene(tertbutylamido)(1-(2-methyl-indenyl)) titanium dichloride;
trimethylsiloxy-ethyl-(dimethyl)silyl-(methyl)methilene(tertbutylamido)(9-fluorenyl) titanium dichloride;
trimethylsiloxy-ethyl-(dimethyl)silyl-(methyl)methilene(tertbutylamido)(9-(2-methyl-fluorenyl)) titanium dichloride;
trimethylsiloxyethyl(methyl)silandiyl-(tertbutylamido)(cylopentadienyl) zirconium dichloride;
trimethylsiloxyethyl(methyl)silandiyl-(tertbutylamido)(tetramethylcylopentadienyl) zirconium dichloride;
trimethylsiloxyethyl(methyl)silandiyl-(tertbutylamido)(1-indenyl) zirconium dichloride;
trimethylsiloxyethyl(methyl)silandiyl-(tertbutylamido)(1-(2-methyl-indenyl)) zirconium dichloride;
trimethylsiloxyethyl(methyl)silandiyl-(tertbutylamido)(9-fluorenyl) zirconium dichloride;
trimethylsiloxyethyl(methyl)silandiyl-(tertbutylamido)(9-(2-methyl-fluorenyl)) zirconium dichloride;
trimethylsiloxyethyl(methyl)silandiyl-(tertbutylamido)(1-(2-methylbenzoindenyl) zirconium dichloride;
(dimethyl)silandiyl-(tertbutylamido)(3-(trimethylsiloxyethylcyclopentadienyl) zirconium dichloride;
(dimethyl)silandiyl-(tertbutylamido)(1-(3-trimethylsiloxyethylindenyl) zirconium dichloride;
(dimethyl)silandiyl-(2-trimethylsiloxyethylamido)(cylopentadienyl) zirconium dichloride;
(dimethyl)silandiyl-(2-trimethylsiloxyethylamido)(tetramethylcyclopentadienyl) zirconium dichloride;
(dimethyl)silandiyl-(2-trimethylsiloxyethylamido)(1-indenyl) zirconium dichloride;
(dimethyl)silandiyl-(2-trimethylsiloxyethylamido)(9-fluorenyl) zirconium dichloride;
(dimethyl)silandiyl-(2-trimethylsiloxyethylamido)(1-(2-methylbenzoindenyl) zirconium dichloride;
trimethylsiloxypropyl(methyl)silandiyl(tertbutylamido)-(cylopentadienyi) zirconium dichloride;
trimethylsiloxypropyl(methyl)silandiyl-(tertbutylamido)(tetramethylcyclopentadienyl) zirconium dichloride;
trimethylsiloxypropyl(methyl)silandiyl-(tertbutylamido)(1-indenyl) zirconium dichloride;

trimethylsiloxypropyl(methyl)silandiyl-(tertbutylamido)(1-(2-methyl-indenyl)) zirconium dichloride;
trimethylsiloxypropyl(methyl)silandiyl-(tertbutylamido)(9-fluorenyl) zirconium dichloride;
trimethylsiloxypropyl(methyl)silandiyl-(tertbutylamido)(9-(2-methyl-fluorenyl)) zirconium dichloride;
trimethylsiloxypropyl(methyl)silandiyl(tertbutylamido)-(1-(2-methylbenzoindenyl) zirconium dichloride;
(dimethyl)silandiyl-(tertbutylamido)(3-(trimethylsioxypropylcylopentadienyl) zirconium dichloride;
(dimethyl)silandiyl-(tertbutylamido)(1-(3-trimethylsiloxypropylindenyl) zirconium dichloride;
(dimethyl)silandiyl-(3-trimethylsiloxypropylamido)(cylopentadienyl) zirconium dichloride;
(dimethyl)silandiyl-(3-trimethylsiloxypropylamido)(tetramethylcylopentadienyl) zirconium dichloride;
(dimethyl)silandiyl-(3-trimethylsiloxypropylamido)(1-indenyl) zirconium dichloride;
(dimethyl)silandiyl-(3-trimethylsiloxypropylamido)(9-fluorenyl) zirconium dichloride;
(dimethyl)silandiyl-(3-trimethylsiloxypropylamido)(1-(2-methylbenzoindenyl) zirconium dichloride;
trimethylsiloxy-methoxy(methyl)silandiyl-(tertbutylamido)(cylopentadienyl) zirconium dichloride;
trimethylsiloxy-methoxy(methyl)silandiyl-(tertbutylamido)(tetramethylcyclopentadienyl) zirconium dichloride;
trimethylsiloxy-methoxy(methyl)silandiyl-(tertbutylamido)(1-indenyl) zirconium dichloride;
trimethylsiloxy-methoxy(methyl)silandiyl-(tertbutylamido)(1-(2-methyl-indenyl)) zirconium dichloride;
trimethylsiloxy-methoxy(methyl)silandiyl-(tertbutylamido)(9-fluorenyl) zirconium dichlonide;
trimethylsiloxy-methoxy(methyl)silandiyl-(tertbutylamido)(9-(2-methyl-fluorenyl)) zirconium dichloride;
trimethylsiloxy-ethoxy(methyl)silandiyl-(tertbutylamido)(cylopentadienyl) zirconium dichloride;
trimethylsiloxy-ethoxy(methyl)silandiyl-(tertbutylamido)(tetramethylcyclopentadienyl) zirconium dichloride;
trimethylsiloxy-ethoxy(methyl)silandiyl-(tertbutylamido)(1-indenyl) zirconium dichloride;
trimethylsiloxy-ethoxy(methyl)silandiyl-(tertbutylamido)(1-(2-methyl-indenyl)) zirconium dichloride;
trimethylsiloxy-ethoxy(methyl)silandiyl-(tertbutylamido)(9-fluorenyl) zirconium dichloride;
trimethylsiloxy-ethoxy(methyl)silandiyl-(tertbutylamido)(9-(2-methyl-fluorenyl)) zirconium dichloride;
trimethylsiloxy-ethyl-(dimethyl)silyl-(methyl)silandiyl(tertbutylamido)-(cylopentadienyl) zirconium dichloride;
trimethylsiloxy-ethyl-(dimethyl)silyl-(methyl)silandiyl-(tertbutylamido)(tetramethylcyclopentadienyl) zirconium dichloride;
trimethylsiloxy-ethyl-(dimethyl)silyl-(methyl)silandiyl-(tertbutylamido)(1-indenyl) zirconium dichloride;
trimethylsiloxy-ethyl-(dimethyl)silyl-(methyl)silandiyl-(tertbutylamido)(1-(2-methyl-indenyl)) zirconium dichloride;
trimethylsiloxy-ethyl-(dimethyl)silyl-(methyl)silandiyl-(tertbutylamido)(9-fluorenyl) zirconium dichloride;
trimethylsiloxy-ethyl-(dimethyl)silyl-(methyl)silandiyl-(tertbutylamido)(9-(2-methyl-fluorenyl)) zirconium dichloride;
trimethylsiloxyethyl-(methyl)methylene(tertbutylamido)(cylopentadienyl) zirconium dichloride;
trimethylsiloxyethyl-(methyl)methylene(tertbutylamido)(tetramethylcyclopentadienyl) zirconium dichloride;
trimethylsiloxyethyl-(methyl)methylene(tertbutylamido)(1-indenyl) zirconium dichloride;
trimethylsiloxyethyl-(methyl)methylene(tertbutylamido)(1-(2-methyl-indenyl)) zirconium dichloride;
trimethylsiloxyethyl-(methyl)methylene(tertbutylamido)(9-fluorenyl) zirconium dichloride;
trimethylsiloxyethyl-(methyl)methylene(tertbutylamido)(9-(2-methyl-fluorenyl)) zirconium dichloride;
trimethylsiloxypropyl-(methyl)methylene(tertbutylamido)(cylopentadienyl) zirconium dichloride;
trimethylsiloxypropyl-(methyl)methylene(tertbutylamido)(tetramethylcyclopentadienyl) zirconium dichloride;
trimethylsiloxypropyl-(methyl)methylene(tertbutylamido)(indenyl) zirconium dichloride;
trimethylsiloxypropyl-(methyl)methylene(tertbutylamido)(2-methyl-indenyl) zirconium dichloride;
trimethylsiloxypropyl-(methyl)methylene(tertbutylamido)(9-fluorenyl) zirconium dichloride;
trimethylsiloxypropyl-(methyl)methylene(tertbutylamido)(2-methyl-fluorenyl) zirconium dichloride;
trimethylsiloxy-methoxymmethyl)methylene(tertbutylamido)(cylopentadienyl) zirconium dichloride;
trimethylsiloxy-methoxy(methyl)methylene(tertbutylamido)(tetramethylcyclopentadienyl) zirconium dichloride;
trimethylsiloxy-methoxy(methyl)methylen(tertbutylamido)(1-indenyl) zirconium dichloride;
trimethylsiloxy-methoxy(methyl)methylen(-tertbutylamido)(1-(2-methyl-indenyl)) zirconium dichloride;
trimethylsiloxy-methoxy(methyl)methylen(-tertbutylamido)(9-fluorenyl) zirconium dichloride;
trimethylsiloxy-methoxy(methyl)methylen(-tertbutylamido)(9-(2-methyl-fluorenyl)) zirconium dichloride;
trimethylsiloxy-ethoxy-(methyl)methylene(tertbutylamido)(cylopentadienyl) zirconium dichloride;
trimethylsiloxy-ethoxy-(methyl)methylene(tertbutylamido)(tetramethylcyclopentadienyl) zirconium dichloride;
trimethylsiloxy-ethoxy-(methyl)methylen(tertbutylamido2)(1-indenyl) zirconium dichloride;
trimethylsiloxy-ethoxy-(methyl)methylen(tertbutylamido)(1-(2-methyl-indenyl)) zirconium dichloride;
trimethylsiloxy-ethoxy-(methyl)methylen(tertbutylamido)(9-fluorenyl) zirconium dichloride;
trimethylsiloxy-ethoxy-(methyl)methylen(tertbutylamido)(9-(2-methyl-fluorenyl)) zirconium dichloride;
trimethylsiloxy-ethyl-(dimethyl)silyl-(methyl)methylene(tertbutylamido)(cylopentadienyl) zirconium dichloride;
trimethylsiloxy-ethyl-(dimethyl)silyl(methyl)methylene(tertbutylamido)(tetramethylcyclopentadienyl) zirconium dichloride;
trimethylsiloxy-ethyl-(dimethyl)silyl-(methyl)methilene(tertbutylamido)(1-indenyl) zirconium dichloride;
trimethylsiloxy-ethyl-(dimethyl)silyl-(methyl)methilene(tertbutylamido)(1-(2-methyl-indenyl)) zirconium dichloride;
trimethylsiloxy-ethyl-(dimethyl)silyl-(methyl)methylene(tertbutylamido)(9-fluorenyl) zirconium dichloride;
trimethylsiloxy-ethyl-(dimethyl)silyl-(methyl)methylene(tertbutylamido)(9-(2-methyl-fluorenyl)) zirconium dichloride;
trimethylsiloxyethyl(methyl)silandiyl-oxo(cylopentadienyl) titanium dichloride;
trimethylsiloxyethyl(methyl)silandiyl-oxo-(tetramethylcyclopentadienyl) titanium dichloride;

trimethylsiloxyethyl(methyl)silandiyl-oxo(1-indenyl) titanium dichloride;
trimethylsiloxyethyl(methyl)silandiyl-oxo(1-(2-methyl-indenyl)) titanium dichloride;
trimethylsiloxyethyl(methyl)silandiyl-oxo(9-fluorenyl) titanium dichloride;
trimethylsiloxyethyl(methyl)silandiyl-oxo(9-(2-methyl-fluorenyl)) titanium dichloride;
trimethylsiloxypropyl(methyl)silandiyl-oxo(cylopentadienyl) titanium dichloride;
trimethylsiloxypropyl(methyl)silandiyl-oxo(tetramethylcyclopentadienyl) titanium dichloride;
trimethylsiloxypropyl(methyl)silandiyl-oxo(1-indenyl) titanium dichloride;
trimethylsiloxypropyl(methyl)silandiyl-oxo(1-(2-methyl-indenyl)) titanium dichloride;
trimethylsiloxypropyl(methyl)silandiyl-oxo(9-fluorenyl) titanium dichloride;
trimethylsiloxypropyl(methyl)silandiyl-oxo(9-(2-methyl-fluorenyl)) titanium dichloride;
trimethylsiloxy-methoxy(methyl)silandiyl-oxo(cylopentadienyl) titanium dichloride;
trimethylsiloxy-methoxy(methyl)silandiyl-oxo(tetramethylcyclopentadienyl) titanium dichloride;
trimethylsiloxy-methoxy(methyl)silandiyl-oxo(1-indenyl) titanium dichloride;
trimethylsiloxy-methoxy(methyl)silandiyl-oxo(1-(2-methyl-indenyl)) titanium dichloride;
trimethylsiloxy-methoxy(methyl)silandiyl-oxo(9-fluorenyl) titanium dichloride;
trimethylsiloxy-methoxy(methyl)silandiyl-oxo(9-(2-methyl-fluorenyl)) titanium dichloride;
trimethylsiloxy-ethoxy(methyl)silandiyl-oxo(cylopentadienyl) titanium dichloride;
trimethylsiloxy-ethoxy(methyl)silandiyl-oxo(tetramethylcyclopentadienyl) titanium dichloride;
trimethylsiloxy-ethoxy(methyl)silandiyl-oxo(1-indenyl) titanium dichloride;
trimethylsiloxy-ethoxy(methyl)silandiyl-oxo(1-(2-methyl-indenyl)) titanium dichloride;
trimethylsiloxy-ethoxy(methyl)silandiyl-oxo(9-fluorenyl) titanium dichloride;
trimethylsiloxy-ethoxy(methyl)silandiyl-oxo(9-(2-methyl-fluorenyl)) titanium dichloride;
trimethylsiloxy-ethyl-(dimethyl)silyl-(methyl)silandiyl-oxo(cylopentadienyl) titanium dichloride;
trimethylsiloxy-ethyl-(dimethyl)silyl-(methyl)silandiyl-oxo(tetramethylcyclopentadienyl) titanium dichloride;
trimethylsiloxy-ethyl-(dimethyl)silyl-(methyl)silandiyl-oxo(1-indenyl) titanium dichloride;
trimethylsiloxy-ethyl-(dimethyl)silyl-(methyl)silandiyl-oxo(1-(2-methyl-indenyl)) titanium dichloride;
trimethylsiloxy-ethyl-(dimethyl)silyl-(methyl)silandiyl-oxo(fluorenyl) titanium dichloride; and
trimethylsiloxy-ethyl-(dimethyl)silyl-(methyl)silandiyl-oxo(9-methylfluorenyl) titanium dichloride.

29. The heterogeneous catalytic system claimed in claim 26, wherein m is equal to 1.

30. The heterogeneous catalytic system claimed in claim 20, wherein the supported metallocene compound is defined by the formula II or the formula III.

31. The heterogeneous catalytic system claimed in claim 20, wherein each $R^I$ in the formula I is a divalent or aromatic hydrocarbon group containing from 1 to 20 carbon atoms and optionally containing boron.

32. The heterogeneous catalytic system claimed in claim 30, wherein m is equal to 1.

33. The heterogeneous catalytic system claimed in claim 31, wherein m is equal to 1.

* * * * *